(12) United States Patent
Murakami

(10) Patent No.: US 10,893,532 B2
(45) Date of Patent: Jan. 12, 2021

(54) TRANSMISSION METHOD, TRANSMISSION CONTROL METHOD, AND COMMUNICATION APPARATUS

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/816,121

(22) Filed: Mar. 11, 2020

(65) Prior Publication Data

US 2020/0214021 A1 Jul. 2, 2020

Related U.S. Application Data

(63) Continuation of application No. 15/672,823, filed on Aug. 9, 2017, now Pat. No. 10,631,314, which is a
(Continued)

(30) Foreign Application Priority Data

Apr. 27, 2015 (JP) ................................ 2015-090388

(51) Int. Cl.
*H04W 52/16* (2009.01)
*H04W 72/12* (2009.01)
(Continued)

(52) U.S. Cl.
CPC ........... *H04W 72/1215* (2013.01); *H04L 5/06* (2013.01); *H04W 16/14* (2013.01); *H04W 52/16* (2013.01);
(Continued)

(58) Field of Classification Search
CPC ... H04W 52/16; H04W 52/244; H04W 52/04; H04W 52/24; H04L 27/2613;
(Continued)

(56) References Cited

U.S. PATENT DOCUMENTS

2005/0207351 A1 9/2005 Inagawa
2013/0272262 A1* 10/2013 Li ......................... H04L 5/0064
370/330
2016/0081100 A1* 3/2016 Du ........................ H04W 76/10
370/329

FOREIGN PATENT DOCUMENTS

| CN | 104184702 A | 12/2014 |
|---|---|---|
| JP | 2010-524346 A | 7/2010 |
| WO | 2018/124434 A1 | 10/2008 |

OTHER PUBLICATIONS

English Translation of Chinese Search Report dated Apr. 22, 2020 for the related Chinese Patent Application No. 201680007238.4, 2 pages.
(Continued)

*Primary Examiner* — Jae Y Lee
*Assistant Examiner* — Axia A Guadalupe Cruz
(74) *Attorney, Agent, or Firm* — Seed IP Law Group LLP

(57) ABSTRACT

A transmission method is provided for a communication system in which communications using a plurality of communication methods having different transmission parameters are performed at the same frequency (in frequency bands that at least partially overlap with each other). The transmission method includes: generating a first symbol group that includes a control symbol for causing a communication partner apparatus to recognize that communication using a first communication method is to be performed and a second symbol group that includes a data symbol for the first communication method; transmitting the first symbol group at a first transmit power; and transmitting the second
(Continued)

symbol group at a second transmit power that is smaller than the first transmit power.

7 Claims, 25 Drawing Sheets

Related U.S. Application Data continuation of application No. PCT/JP2016/002077, filed on Apr. 19, 2016.

(51) Int. Cl.
    *H04W 16/14*     (2009.01)
    *H04L 5/06*     (2006.01)
    *H04W 72/04*     (2009.01)
    *H04L 5/00*     (2006.01)
    *H04L 27/34*     (2006.01)
    *H04J 11/00*     (2006.01)
    *H04L 27/26*     (2006.01)

(52) U.S. Cl.
    CPC ........ *H04W 72/0453* (2013.01); *H04J 11/003* (2013.01); *H04L 5/0048* (2013.01); *H04L 27/2662* (2013.01); *H04L 27/2676* (2013.01); *H04L 27/34* (2013.01)

(58) Field of Classification Search
    CPC ............. H04L 27/2666; H04L 27/2601; H04L 27/2662; H04L 27/2676; H04L 27/2691
    See application file for complete search history.

(56) References Cited

OTHER PUBLICATIONS

International Search Report, dated Jul. 19, 2016, for International Application No. PCT/JP2016/002077, 2 pages.

* cited by examiner

TRANSMISSION METHOD, TRANSMISSION CONTROL METHOD, AND COMMUNICATION APPARATUS

BACKGROUND

1. Technical Field

The present disclosure relates to a transmission method, a transmission control method, and a communication apparatus.

2. Description of the Related Art

In recent years, an environment is expected where appliances that use various wireless communication methods share the same frequency band and co-exist in the same area. There have been proposed technologies for avoiding mutual interference of such appliances that use various wireless communication methods. For co-existence of WiMAX® and Bluetooth®, Japanese Patent Application Publication (Translation of PCT Application) No. 2010-524346 (hereinafter referred to as "Patent Document 1") discloses arranging transmission/reception in one wireless frame and transmission/reception in another wireless frame so that they do not temporally overlap each other by adjusting a wireless frame to an associated time reference.

However, in Patent Document 1, no consideration has been given to a co-existing system for realizing, for example, both short-range communication (such as a near field communication (NFC) or personal area network (PAN)) in which the transmit power is relatively low and long-range communication (such as a wireless local area network (LAN) or cellular communication) in which the transmit power is relatively high by using the same frequency (frequency bands that at least partially overlap each other).

Since the transmit power set for short-range communication is lower than the transmit power set for long-range communication, there is a high possibility that, at the same frequency, an appliance that performs short-range communication is one-sidedly affected by interference due to a signal from an appliance that performs long-range communication. Hence, when long-range communication is performed, short-range communication cannot be performed, thus resulting in a decrease in the data transmission size of the entire communication system.

SUMMARY

One non-limiting and exemplary embodiment provides a transmission method, a transmission control method, and a communication apparatus that can suppress a reduction in a data transmission size even when short-range communication and long-range communication are made to co-exist at the same frequency (frequency bands that at least partially overlap with each other).

In one general aspect, the techniques disclosed here feature a transmission method for a communication system in which communications using a plurality of communication methods having different transmission parameters are performed in frequency bands that at least partially overlap with each other. The transmission method includes: generating a first symbol group that includes a control symbol for causing a communication partner apparatus to recognize that communication using a first communication method is to be performed, and a second symbol group that includes a data symbol for the first communication method; transmitting the first symbol group at a first transmit power; and transmitting the second symbol group at a second transmit power that is smaller than the first transmit power.

It should be noted that general or specific embodiments may be implemented as a system, an apparatus, a device, a method, an integrated circuit, a computer program, or a storage medium, or any selective combination thereof.

According to one aspect of the present disclosure, it is possible to suppress a reduction in a data transmission size even when short-range communication and long-range communication are made to co-exist at the same frequency (frequency bands that at least partially overlap each other).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described below in detail with reference to the accompanying drawings.

First Embodiment

[Overview of Communication System]

Figure 1:
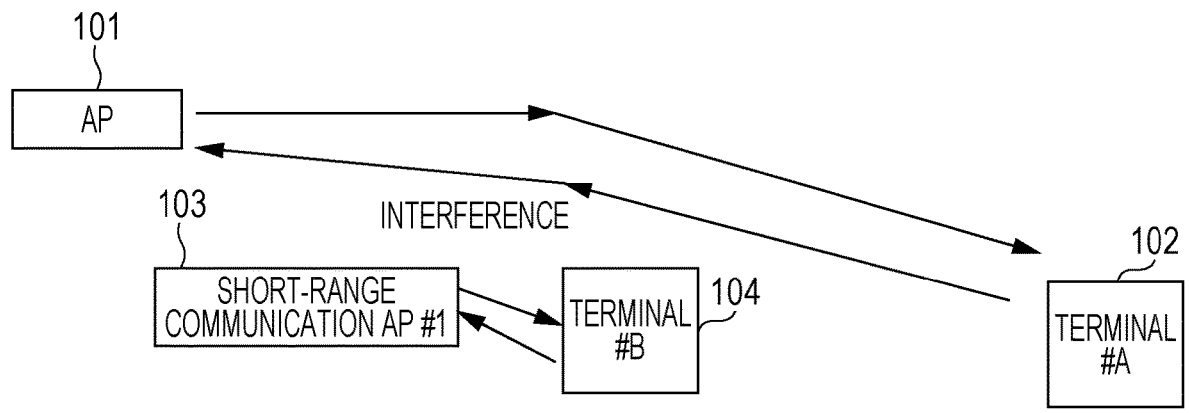
FIG. 1 is a diagram illustrating an example configuration of a communication system including appliances that perform short-range communication and appliances that perform long-range communication according to a first embodiment.

FIG. 1 illustrates an example configuration of a communication system according to a first embodiment. In the communication system illustrated in FIG. 1, short-range communication and long-range communication are performed using the same frequency (frequency band). The expression "using the same frequency (frequency band)" as used herein means that a frequency band used in short-range communication and a frequency band used in long-range communication at least partially overlap with each other.

Specifically, in FIG. 1, an access point (AP) 101 and a terminal #A (102) perform long-range communication, and a short-range communication AP #1 (103) and a terminal #B (104) perform short-range communication.

As described above, the short-range communication is communication, such as NFC or PAN, in which the transmit power is relatively low, and the long-range communication is communication, such as wireless LAN communication or cellular communication, in which the transmit power is relatively high. Details of the relative relationship between the transmit power in the short-range communication and the transmit power in the long-range communication are described later.

Also, in FIG. 1, the short-range communication and the long-range communication are performed using the same frequency (frequency bands that at least partially overlap each other). Communication parameters used in the short-range communication and communication parameters used in the long-range communication differ from each other.

The AP may also be referred to as a "base station", a "transmitter station", or the like, and each terminal may also be referred to as a "receiver station", "user equipment (UE)", or the like.

[Configuration of Terminal]

Figure 2:
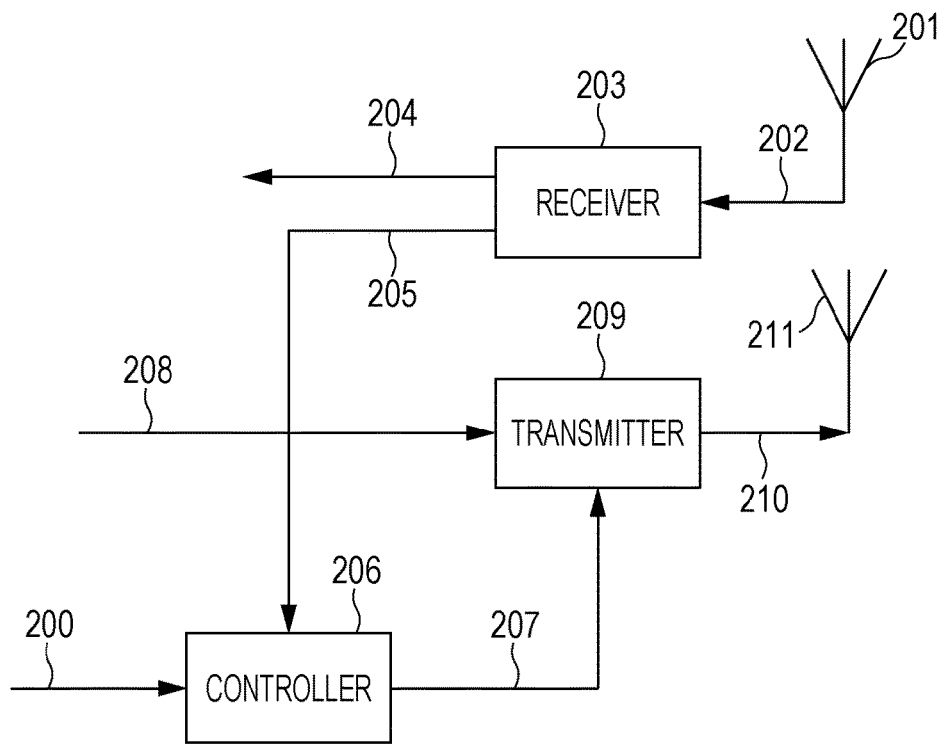
FIG. 2 is a block diagram illustrating the configuration of a terminal according to the first embodiment.

FIG. 2 is a block diagram illustrating the configuration of a terminal that operates in the communication system according to the present embodiment.

A terminal 20 illustrated in FIG. 2 operates as, for example, the terminal #A (102) or the terminal #B (104) illustrated in FIG. 1.

The terminal 20 illustrated in FIG. 2 has a configuration including a receiving antenna 201, a receiver 203, a controller 206, a transmitter 209, and a transmitting antenna 211.

The receiver 203 in the terminal 20 operates when a modulated signal transmitted from a communication partner is present. A received signal 202 received via the antenna 201 is input to the receiver 203. The receiver 203 performs reception processing, such as frequency conversion, frequency and time synchronization, demodulation, and error correction decoding, on the received signal 202 and outputs received data 204 and/or control information 205. The control information 205 includes, for example, information regarding a communication method (short-range communication or long-range communication) or information indicating a communication start.

Upon receiving an instruction signal 200 including information indicating a communication start, the controller 206 generates a control signal 207 related to the communication start and outputs the control signal 207 to the transmitter 209. The control signal 207 includes, for example, information regarding a communication method (short-range communication or long-range communication), information regarding a modulation system, and information regarding an error correction system.

The control information 205 is one of inputs to the controller 206, and the controller 206 may switch the communication method on the basis of the control information 205. The controller 206 may output the control signal 207 related to the communication start to the transmitter 209, based on the information included in the control information 205 and indicating the communication start.

Data 208 and the control signal 207 are input to the transmitter 209. The transmitter 209 generates a data symbol by performing processing, such as error-correction encoding and modulation (mapping), on the data 208 and the control signal 207. The transmitter 209 also generates a symbol for synchronizing in a time domain or a frequency domain, a symbol for signal detection in a receiving apparatus, a pilot symbol (reference symbol) for estimating a propagation path, a symbol for automatic gain control (AGC) (i.e., a symbol for adjusting the level of a signal in a receiving apparatus), a control symbol, and so on and outputs a modulated signal 210 corresponding to the symbols.

The modulated signal 210 is output from the antenna 211 over a radio wave. A communication system in this case may be an Orthogonal Frequency Division Multiplexing (OFDM) system, a single carrier transmission system, or a spread-spectrum communication system.

The controller 206 also sets a transmit power for the data symbol and control symbol, based on a communication method (short-range communication or long-range communication) that can be executed by the terminal 20. For example, an average transmit power of modulated signals for short-range communication is denoted by Pa, and an average transmit power of modulated signals for long-range communication is denoted by Pb. In this case, Pa<Pb (Pb is larger than Pa) is satisfied.

[Structure of Transmission Frame of Terminal 20]

The terminal 20 can take the communication form of (1) a terminal that can perform both short-range communication and long-range communication, (2) a terminal that can perform only short-range communication, or (3) a terminal that can perform only long-range communication.

The following description will be given of one example structure of a transmission frame transmitted by the terminal 20 in each communication form described above.

Figure 3:
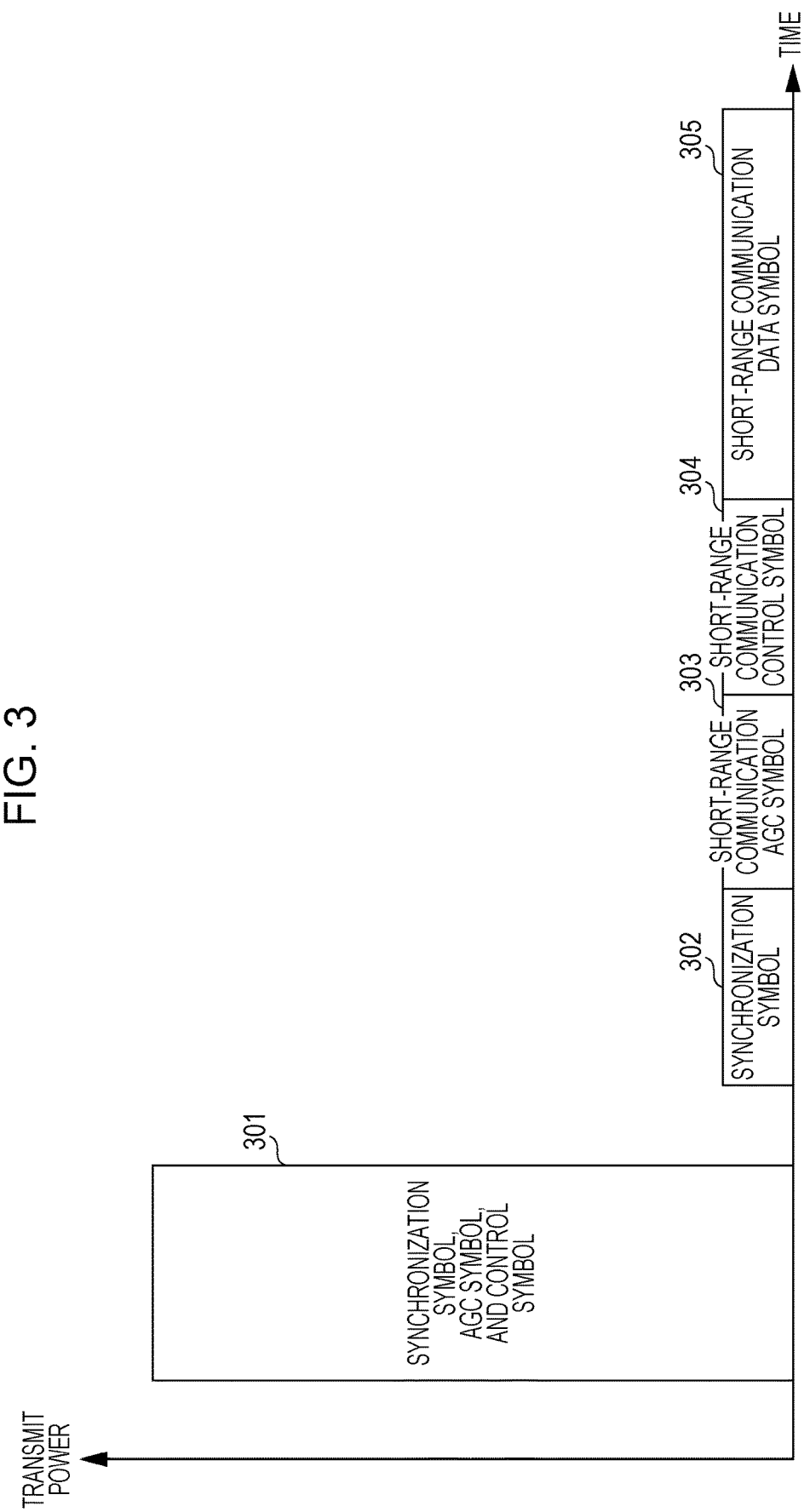
FIG. 3 illustrates an example frame structure when a terminal that can support both short-range communication and long-range communication according to the first embodiment transmits a modulated signal.

(1) The structure of a frame transmitted by the terminal 20 that can perform both short-range communication and long-range communication FIG. 3 illustrates one example frame structure of a modulated signal when the terminal 20 that can transmit both a short-range communication modulated signal and a long-range communication modulated signal transmits short-range communication data.

That is, FIG. 3 illustrates an example frame structure when the terminal #B (104) illustrated in FIG. 1 transmits short-range communication data to the short-range communication AP #1 (103).

In FIG. 3, the horizontal axis represents time, and the vertical axis represents a transmit power.

First, the terminal 20 transmits large-transmit-power symbols 301.

The structure of the symbols 301 illustrated in FIG. 3 is an example structure of large-transmit-power symbols. The symbols 301 are, for example, a symbol group including a synchronization symbol (i.e., a symbol for achieving frequency synchronization and/or time synchronization in a receiving apparatus), a symbol for AGC (i.e., a symbol for adjusting the level of a signal in a receiving apparatus), a control symbol, and so on. The symbols 301 may further include a symbol for signal detection.

Symbols 302, 303, 304, and 305 are symbols for short-range communication. The symbol 302 is a synchronization symbol for short-range communication (i.e., a symbol for achieving frequency synchronization and/or time synchronization in a receiving apparatus). When the terminal 20 transmits the modulated signal illustrated in FIG. 3, a short-range communication AP that is a receiving apparatus performs frequency synchronization and/or time synchronization by using the synchronization symbol 302. The short-range communication AP may perform signal detection by detecting the synchronization symbol 302. Another possible method is that a symbol (not illustrated) for signal detection in the short-range communication AP exists prior to the synchronization symbol 302.

The symbol 303 is a symbol for AGC for short-range communication (hereinafter may be referred to as a "short-range communication AGC symbol"). When the terminal 20 transmits the modulated signal illustrated in FIG. 3, the short-range communication AP that is a receiving apparatus adjusts the signal level of the received signal by using the AGC symbol 303.

The symbol 304 is a control symbol for short-range communication (hereinafter may be referred to as a "short-range communication control symbol"). [0036] The data symbol 305 is a data symbol for short-range communication (hereinafter may be referred to as a "short-range communication data symbol") and for transmitting data to a receiving apparatus that is a communication partner. The control symbol 304 is, for example, a symbol for notifying a communication partner about information regarding an error-correction-coding method (e.g., a coding rate of error correction coding, a code length (a block length) of error correction coding, and so on) used for generating the short-range communication data symbol 305, a modulation system, and so on.

In FIG. 3, the large-transmit-power symbols 301 are transmitted from the terminal #B by using a transmit power at a level with which they can also be received by the AP (101) and the terminal #A (102) illustrated in FIG. 1. That is, when the terminal 20 in FIG. 2 supports both short-range communication and long-range communication, the transmitter 209 in FIG. 2 transmits the large-transmit-power symbols 301 by using a transmit power set for the long-range communication, and transmits the symbols 302 to 305 for the short-range communication by using a transmit power set for the short-range communication.

The control symbol included in the large-transmit-power symbols 301 in FIG. 3 also includes information indicating whether the terminal 20 in FIG. 2 is performing short-range communication or long-range communication. For example, the control symbol may include bit c0, in which case, when the terminal 20 transmits a short-range communication data symbol, c0 may be set to "0", and when the terminal 20 transmits a long-range communication data symbol, c0 may be set to "1". In FIG. 3, since the terminal 20 transmits the short-range communication data symbols, c0 is set to "0".

In contrast, the synchronization symbol 302, the AGC symbol 303, the control symbol 304, and the data symbol 305 illustrated in FIG. 3 are symbols (a symbol group) for short-range communication. That is, these short-range communication symbols are symbols for the terminal #B (104) to perform transmission to the short-range communication AP #1 (103) illustrated in FIG. 1. As illustrated in FIG. 3, these short-range communication symbols are small-transmit-power symbols relative to the large-transmit-power symbols 301.

Detailed descriptions of the large-transmit-power symbols 301 and the small-transmit-power symbols 302 to 305 are given later.

Also, characteristic points in the frame structure illustrated in FIG. 3 are that the large-transmit-power symbols 301 include an AGC symbol (a first AGC symbol), and another AGC symbol 303 (a second AGC symbol) exists in the short-range communication symbols 302 to 305.

Specifically, in FIG. 1, when the terminal #B (104) transmits the first AGC symbol included in the large-transmit-power symbols 301, the AP (101), the terminal #A (102), and the short-range communication AP #1 (103) can easily adjust the level of received signals (large-transmit-power symbols) in accordance with the transmit power in the long-range communication. Thus, the AP (101) and the terminal #A (102) can demodulate the information in the large-transmit-power symbols 301.

Also, in FIG. 1, when the terminal #B (104) transmits the second AGC symbol 303, the short-range communication AP #1 (103) can easily adjust the level of a received signal (small-transmit-power symbols) in accordance with the transmit power in the short-range communication. Thus, the short-range communication AP #1 (103) can demodulate the short-range communication control symbol 304 and the short-range communication data symbol 305.

As described above, by using the first AGC symbol included in the large-transmit-power symbols 301 and the second AGC symbol included in the short-range communication symbols 302 to 305, as illustrated in FIG. 3, the short-range communication AP #1 (103) can accurately adjust the reception-signal levels of both of the symbol groups transmitted using the different transmit powers.

The operations of the AP (101), the short-range communication AP #1 (103), and the terminal #A (102), illustrated in FIG. 1, when the frame illustrated in FIG. 3 is received are described below in detail.

Also, the frame structure illustrated in FIG. 3 is one example and may include a symbol other than the symbols illustrated in FIG. 3. Examples of such a symbol include a pilot symbol (a reference symbol) for a receiving apparatus to estimate a channel change.

Figure 4:
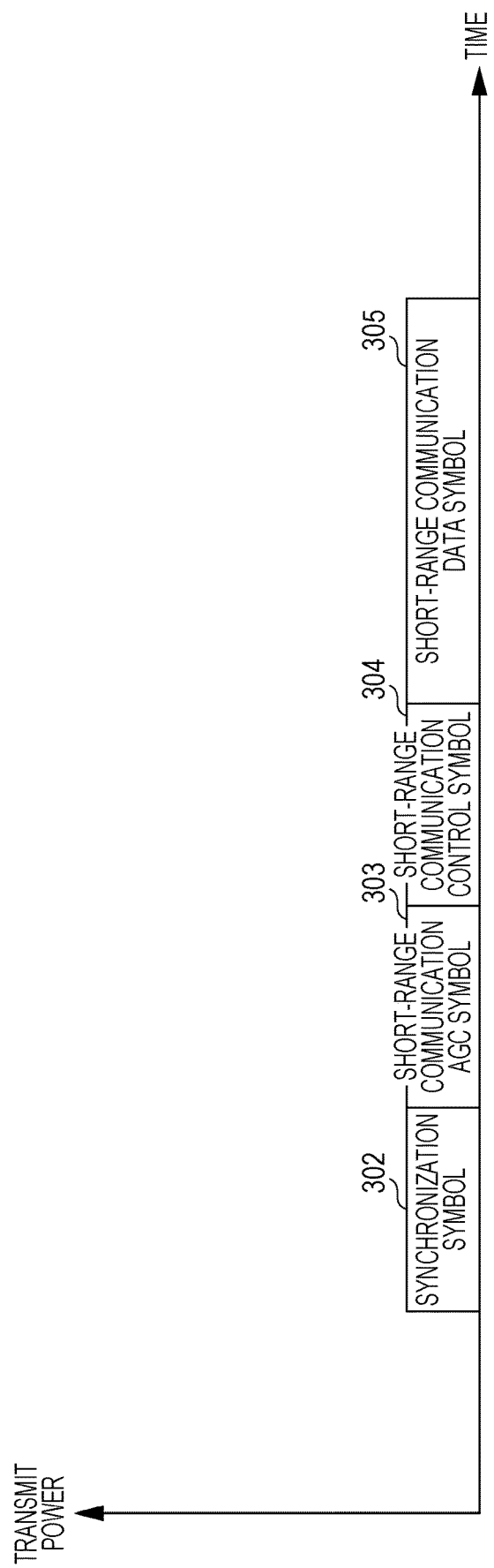
FIG. 4 illustrates an example frame structure when a terminal that supports short-range communication according to the first embodiment transmits a modulated signal.

(2) The structure of a frame transmitted by the terminal 20 that can perform only short-range communication FIG. 4 illustrates one example frame structure of a modulated signal transmitted by the terminal 20 that can transmit a short-range communication modulated signal.

That is, FIG. 4 illustrates an example frame structure when the terminal #B (104) illustrated in FIG. 1 transmits short-range communication data to the short-range communication AP #1 (103).

In FIG. 4, the horizontal axis represents time, and the vertical axis represents a transmit power. In the frame structure illustrated in FIG. 4, substantially the same structure as the frame structure illustrated in FIG. 3 is denoted by the same reference numerals, and a description thereof is not given hereinafter.

Specifically, the frame structure illustrated in FIG. 4 differs from the frame structure illustrated in FIG. 3 in that large-transmit-power symbols do not exist.

A synchronization symbol 302, an AGC symbol 303, a control symbol 304, and a data symbol 305 illustrated in FIG. 4 are short-range communication symbols. That is, these short-range communication symbols are symbols for the terminal #B (104) to perform transmission to the short-range communication AP #1 (103) illustrated in FIG. 1.

The operation of the short-range communication AP #1 (103), illustrated in FIG. 1, when the frame illustrated in FIG. 4 is received is described later in detail.

Also, the frame structure illustrated in FIG. 4 is one example and may include a symbol other than the symbols illustrated in FIG. 4. Examples of such a symbol include a pilot symbol (a reference symbol) for a receiving apparatus to estimate a channel change.

Figure 5:
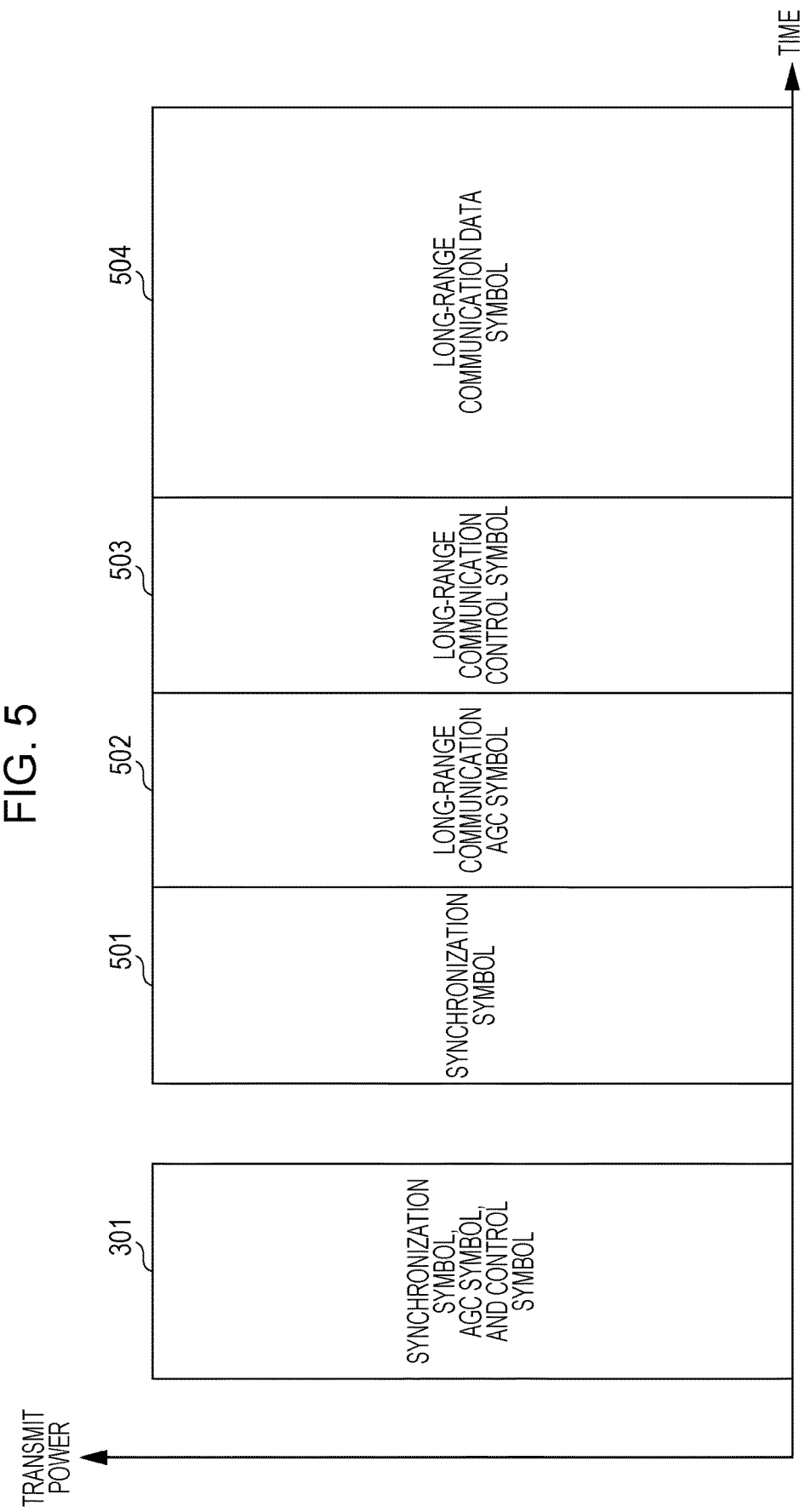
FIG. 5 illustrates an example frame structure when a terminal that supports long-range communication according to the first embodiment transmits a modulated signal.

(3) The structure of a frame transmitted by the terminal 20 that can perform only long-range communication FIG. 5 illustrates one example frame structure of a modulated signal transmitted by the terminal 20 that can transmit a long-range communication modulated signal.

That is, FIG. 5 illustrates an example frame structure when the terminal #A (102) illustrated in FIG. 1 transmits long-range communication data to the AP (101).

In FIG. 5, the horizontal axis represents time, and the vertical axis represents a transmit power. In the frame structure illustrated in FIG. 5, substantially the same structure as the frame structure illustrated in FIG. 3 is denoted by the same reference numerals, and a description thereof is not given hereinafter.

Specifically, the frame structure illustrated in FIG. 5 differs from the frame structure illustrated in FIG. 3 in that symbols 501 to 504 are arranged instead of the symbols 302 to 305. In the frame structure illustrated in FIG. 5, large-transmit-power symbols 301 are provided, as in the frame structure illustrated in FIG. 3.

The symbol 501 illustrated in FIG. 5 is a synchronization symbol for long-range communication (i.e., a symbol for achieving frequency synchronization and/or time synchronization in a receiving apparatus). When the terminal 20 in FIG. 2 transmits the modulated signal illustrated in FIG. 5, the AP (101) that is a receiving apparatus performs frequency synchronization and/or time synchronization by using the synchronization symbol 501. The AP (101) may perform signal detection by detecting the synchronization symbol 501. Another possible method is that a symbol (not illustrated) for signal detection in the AP exists prior to the synchronization symbol 501.

A symbol 502 is an AGC symbol for long-range communication. When the terminal 20 transmits the modulated signal illustrated in FIG. 5, the AP (101) that is a receiving apparatus adjusts the signal level of a received signal by using the AGC symbol 502.

The symbol 503 is a control symbol for long-range communication.

The symbol 504 is a data symbol for long-range communication and for transmitting data to a communication partner. The control symbol 503 is, for example, a symbol for notifying a communication partner about information regarding an error-correction-coding method (e.g., a coding rate of error correction coding, a code length (a block length) of error correction coding, and so on) used for generating the long-range communication data symbol 504, a modulation system, and so on.

In FIG. 5, the large-transmit-power symbols 301 are transmitted from the terminal #A (102) by using a transmit power at a level with which they can be received by the AP (101), the terminal #B (104), and the short-range communication AP #1 (103), which are illustrated in FIG. 1.

The control symbol included in the large-transmit-power symbols 301 includes information indicating whether the terminal 20 is performing short-range communication or long-range communication. For example, the control symbol may include bit c0, in which case, when the terminal 20 transmits a short-range communication data symbol, c0 may be set to "0", and when the terminal 20 transmits a long-range communication data symbol, c0 may be set to "1". In FIG. 5, since the terminal 20 transmits the long-range communication data symbols, c0 is set to "1".

Also, in FIG. 5, the synchronization symbol 501, the AGC symbol 502, the control symbol 503, and the data symbol 504 are symbols (a symbol group) for long-range communication. That is, these long-range communication symbols are symbols for the terminal #A (102) illustrated in FIG. 1 to perform transmission to the AP (101). As illustrated in FIG. 5, these long-range communication symbols are transmitted from the terminal #A (102) by using a transmit power at a level with which they can be received by at least the AP (101) illustrated in FIG. 1 (i.e., a transmit power that is equivalent to that of the large-transmit-power symbols 301).

A detailed description of the large-transmit-power symbols 301 is given later.

The operations of the AP (101), the short-range communication AP #1 (103), and the terminal #A (102), illustrated in FIG. 1, when the frame illustrated in FIG. 5 is received are described below in detail.

Also, the frame structure illustrated in FIG. 5 is one example and may include a symbol other than the symbols illustrated in FIG. 5. Examples of such a symbol include a pilot symbol (a reference symbol) for a receiving apparatus to estimate a channel change.

The above description has been given of one example structure of the transmission frame corresponding to each communication form of the terminal 20.

[Large-Transmit-Power Symbols and Small-Transmit-Power Symbols]

Next, the large-transmit-power symbols 301 and the small-transmit-power symbols (short-range communication symbols) 302 to 305 will be described in detail.

Figure 6:
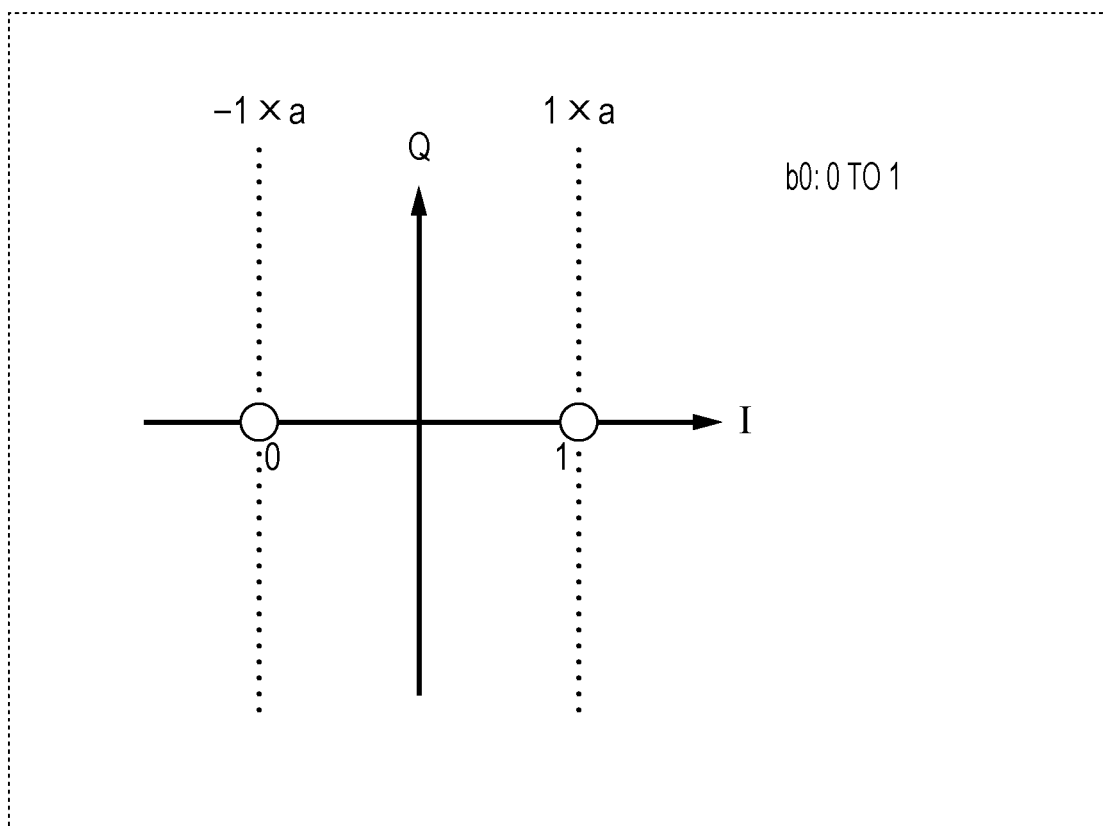
FIG. 6 illustrates one example of arrangement of BPSK signal points in an I-Q plane for large-transmit-power symbols according to the first embodiment.

Now, a case in which binary phase-shift keying (BPSK) is applied to a large-transmit-power symbol will be described as one example. FIG. 6 illustrates an example of arrangement of BPSK signal points in an in-phase/quadrature-phase plane (I-Q plane) for a larger-transmit-power symbol.

As illustrated in FIG. 6, a signal point for data b0="0" is arranged at an in-phase component I=−1×a and a quadrature component Q=0. A signal point for data b0="1" is arranged at an in-phase component I=−1×a and a quadrature component Q=0. In this case, a is the absolute value of the in-phase component of the signal point of a large-transmit-power symbol and is a real number larger than 0.

Figure 7:
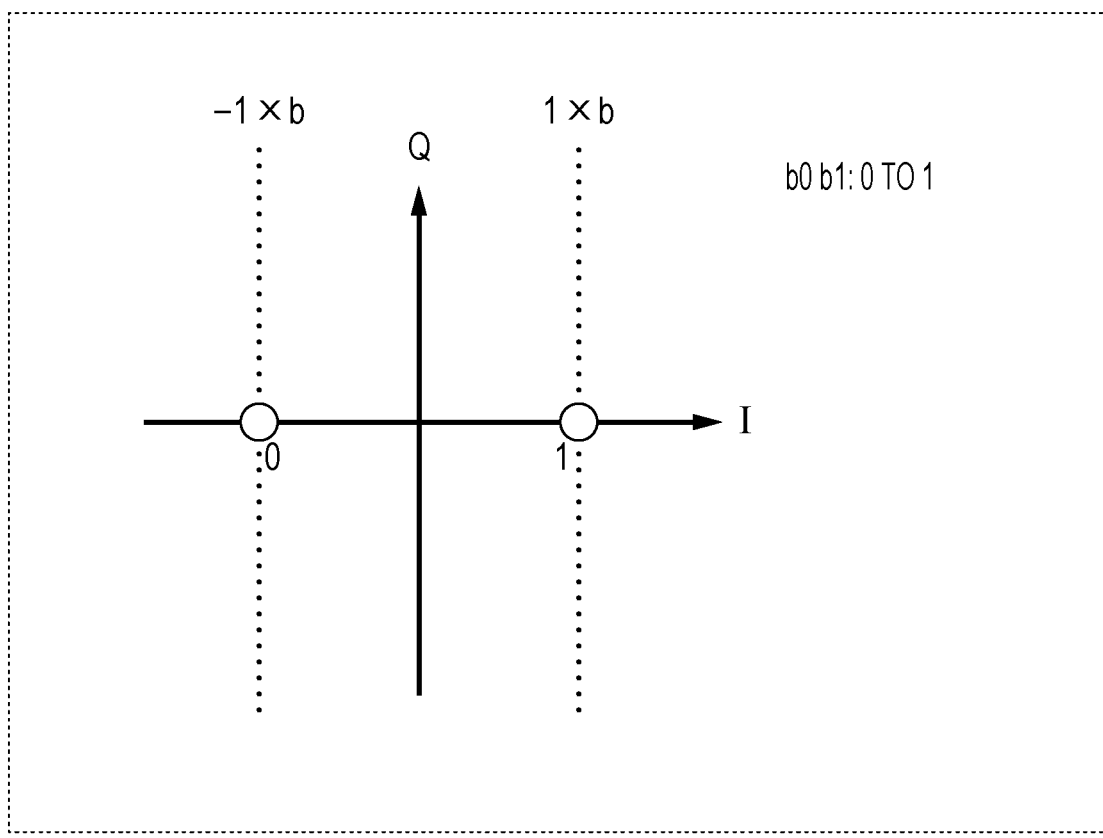
FIG. 7 illustrates one example of arrangement of BPSK signal points in the I-Q plane for small-transmit-power symbols according to the first embodiment.

FIG. 7 illustrates one example of arrangement of BPSK signal points in the I-Q plane when BPSK is applied to each short-range communication symbol (the synchronization symbol 302, the AGC symbol 303, the control symbol 304, or the data symbol 305) illustrated in FIG. 3 or 4.

As illustrated in FIG. 7, a signal point for data b0="0" is arranged at an in-phase component I=−1×b and a quadrature component Q=0. Also, a signal point for data b0="1" is arranged at an in-phase component I=1×b and a quadrature component Q=0. In this case, b is the absolute value of the in-phase component of the signal point of a short-range communication symbol and is a real number larger than 0.

In this case, since a is larger than b (a>b) at signal points arranged in the I-Q plane, the large-transmit-power symbols 301 and the short-range communication symbols (i.e., the small-transmit-power symbols) 302 to 305, as illustrated in FIG. 3, hold true.

Figure 8:
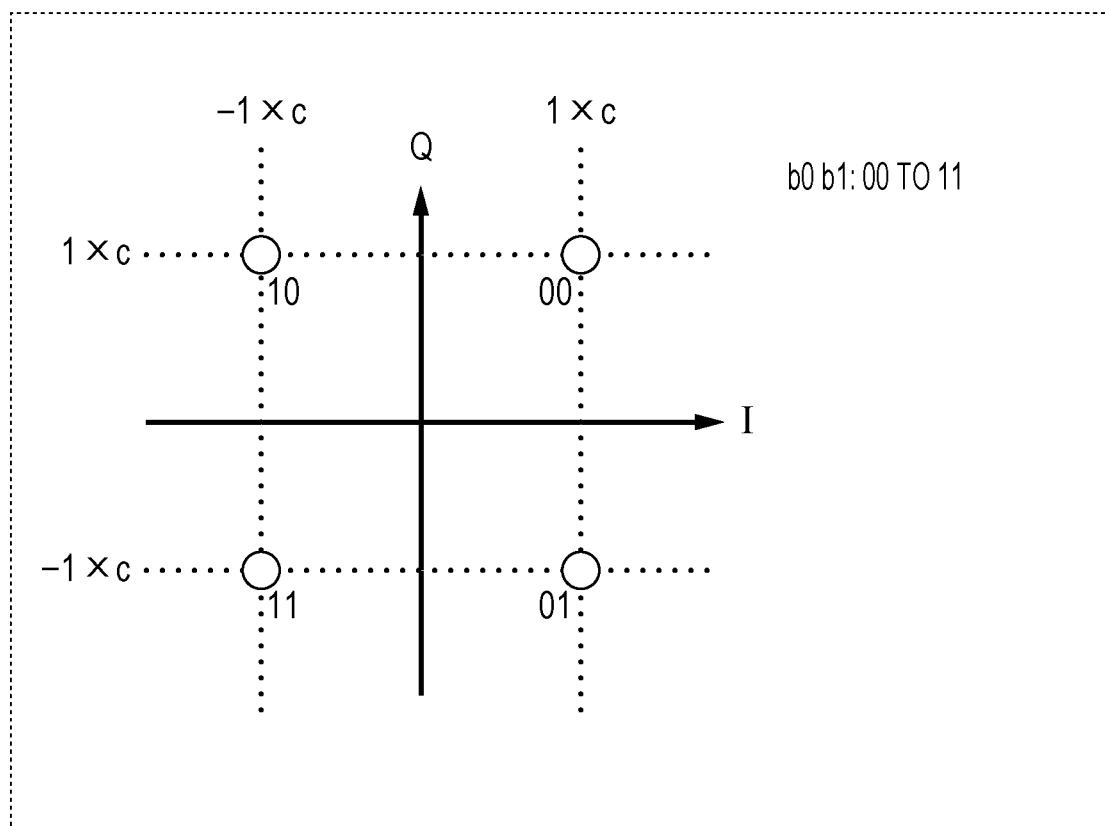
FIG. 8 illustrates one example of arrangement of QPSK signal points in the I-Q plane for small-transmit-power symbols according to the first embodiment.

FIG. 8 illustrates one example of arrangement of quadrature phase-shift keying (QPSK) signal points in an I-Q plane when QPSK is applied to each short-range communication symbol (the synchronization symbol 302, the AGC symbol 303, the control symbol 304, or the data symbol 305) illustrated in FIG. 3 or 4.

As illustrated in FIG. 8, signal points for data b0="0" and data b1="0" are arranged at an in-phase component I=1×c and a quadrature component Q=1×c. Also, signal points for data b0="0" and data b1="1" are arranged at an in-phase component I=1×c and a quadrature component Q=−1×c.

Signal points for data b0="1" and data b1="0" are arranged at an in-phase component I=−1×c and a quadrature component Q=1×c. Signal point for data b0="1" and data b1="1" are arranged at an in-phase component I=−1×c and a quadrature component Q=−1×c. In this case, c is the absolute value of the in-phase component and the quadrature component of the signal point of a short-range communication symbol and is a real number larger than 0.

In this case, with respect to the signal points arranged in the I-Q plane, the relationship given by expression (1) below is satisfied between the large-transmit-power symbols illustrated in FIG. 6 and the short-range communication symbols (i.e., the small-transmit-power symbols) illustrated in FIG. 8.

$$a > c \times \sqrt{2} \qquad (1)$$

Figure 9:
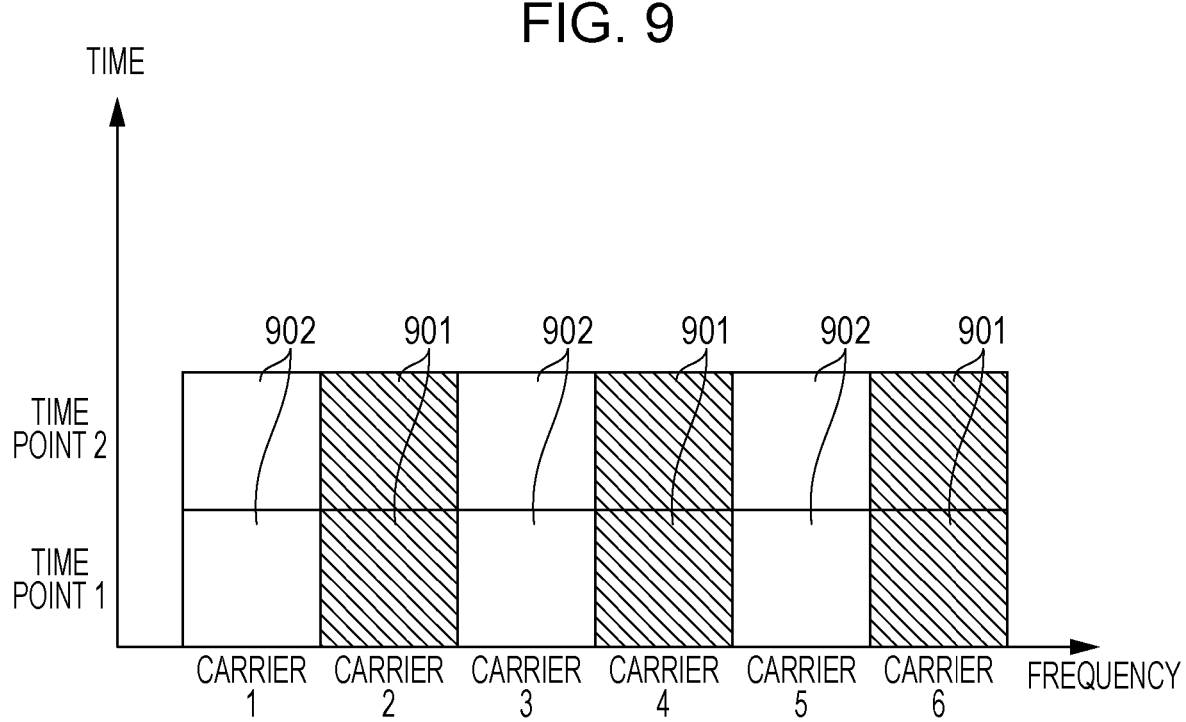
FIG. 9 illustrates one example of arrangement of symbols along frequency-time axes for large-transmit-power symbols according to the first embodiment.
Figure 10:
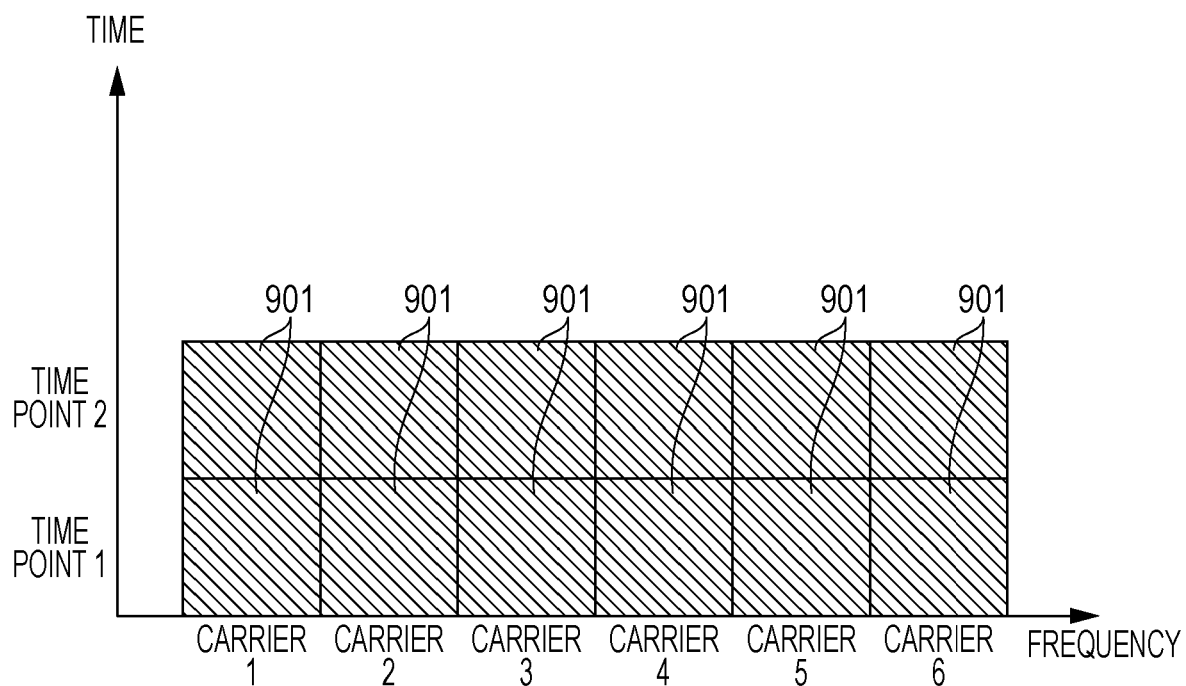
FIG. 10 illustrates one example of arrangement of symbols along frequency-time axes for large-transmit-power symbols according to the first embodiment.

Next, FIGS. 9 and 10 each illustrate one example of symbol arrangement in a frequency-time domain for large-transmit-power symbols when a multi-carrier system, such as an OFDM system, is used.

FIG. 9 illustrates an example of arrangement of symbols when the horizontal axis represents a frequency and the vertical axis represents time. In FIG. 9, the frequency-axis direction is constituted by carriers 1 to 6, and the time-axis direction is constituted by frames of time points 1 and 2.

Symbols 901 illustrated in FIG. 9 represent symbols that are arranged in the carriers 2, 4, and 6 and that include large-transmit-power symbols. For example, when the mapping illustrated in FIG. 6 is performed, the symbols 901 are BPSK symbols.

Symbols 902 illustrated in FIG. 9 are symbols that are arranged in the carriers 1, 3, and 5 and that do not include large-transmit-power symbols. Thus, for example, the symbols 902 are symbols for the in-phase component I=0 and the quadrature component Q=0.

The symbol arrangement in the frequency-time axes is not limited to FIG. 9. A symbol other than the symbols 901 and 902 illustrated in FIG. 9 may be included in the same time period.

FIG. 10 illustrates an example of symbol arrangement when the horizontal axis represents a frequency and the vertical axis represents time. FIG. 10 illustrates an example of symbol arrangement that is different from that in FIG. 9. In FIG. 10, the frequency-axis direction is constituted by carriers 1 to 6, and the time-axis direction is constituted by frames of time points 1 and 2.

In FIG. 10, symbols 901 including large-transmit-power symbols are arranged at time points 1 and 2 and carriers 1 to 6. For example, when the mapping illustrated in FIG. 6 is performed, the symbols 901 are BPSK symbols.

The frame structure in the frequency-time axes is not limited to the frame structure illustrated in FIG. 10. Also, a symbol other than the symbols 901 illustrated in FIG. 10 may be included in the same time domain.

Figure 11:
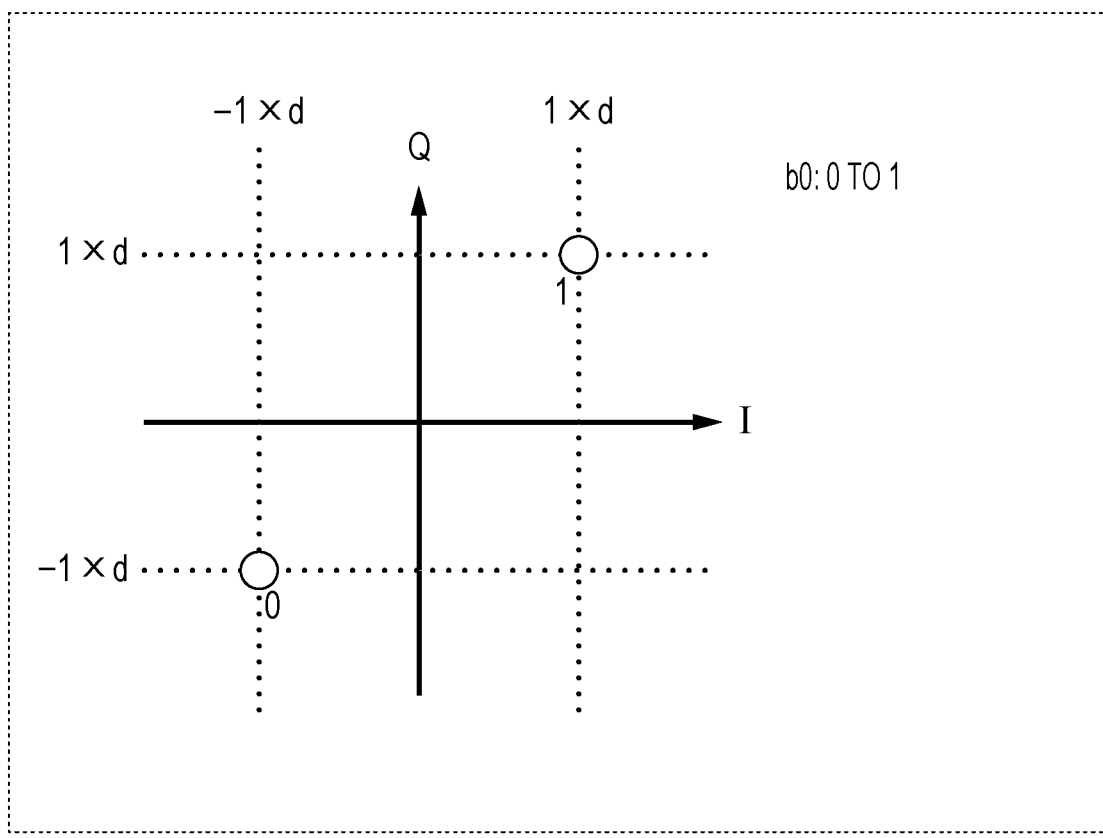
FIG. 11 illustrates one example of arrangement of BPSK signal points in the I-Q plane for large-transmit-power symbols according to the first embodiment.

Also, BPSK using mapping that is different from the mapping illustrated in FIG. 6 may also be performed on the large-transmit-power symbols 301. FIG. 11 illustrates an example of arrangement of BPSK signal points in an I-Q plane, the example being different from that illustrated in FIG. 6.

As illustrated in FIG. 11, a signal point for data b0="0" is arranged at an in-phase component I=−1×d and a quadrature component Q=−1×d. Also, a signal point for data b0="1" is arranged at an in-phase component I=1×d and a quadrature component Q=1×d. In this case, d is the absolute value of the in-phase component and the quadrature component of a signal point of a large-transmit-power symbol and is a real number larger than 0.

In this case, with respect to signal points arranged in the I-Q plane, the relationship given by expression (2) below is satisfied between the large-transmit-power symbols illustrated in FIG. 11 and the short-range communication symbols (i.e., the small-transmit-power symbols) illustrated in FIG. 7.

$$d \times \sqrt{2} > b \tag{2}$$

Similarly, with respect to signal points arranged in the I-Q plane, the relationship given by expression (3) is satisfied between the large-transmit-power symbols illustrated in FIG. 11 and the short-range communication symbols (i.e., the small-transmit-power symbols) illustrated in FIG. 8.

$$d > c \tag{3}$$

The relationship between the large-transmit-power symbols 301 and the small-transmit-power symbols (the short-range communication symbols) 302 to 305, which are described above, will be described below using a general expression.

When the number of signal points in the I-Q plane in the modulation system for the large-transmit-power symbols 301 is represented by M, the in-phase component of each signal point is represented by Ia,j, and the quadrature component thereof is represented by Qa,j, the average electric power is given by:

$$\frac{1}{M} \sum_{j=1}^{M} (I_{a,j}^2 + Q_{a,j}^2) \tag{4}$$

Also, when the number of signal points in the I-Q plane in the modulation system for the short-range communication data symbol 305 illustrated in FIG. 3 or 4 is represented by N, the in-phase component of each signal point is represented by Ib,j, and the quadrature component thereof is represented by Qb,j, the average electric power is given by:

$$\frac{1}{N} \sum_{j=1}^{N} (I_{b,j}^2 + Q_{b,j}^2) \tag{5}$$

In this case, the relationship given by expression (6) below is satisfied between the average electric power of the signal points in the I-Q plane for the large-transmit-power symbols 301 and the average electric power of the signal points in the I-Q plane for the short-range communication data symbol 305.

$$\frac{1}{M} \sum_{j=1}^{M} (I_{a,j}^2 + Q_{a,j}^2) > \frac{1}{N} \sum_{j=1}^{N} (I_{b,j}^2 + Q_{b,j}^2) \tag{6}$$

Expression (6) is also satisfied when the average electric power of the synchronization symbol 302, the AGC symbol 303, or the control symbol 304 illustrated in FIG. 3 or 4 is given by expression (5) noted above.

[Configuration of Short-Range Communication AP #1 (103)]

Figure 12:
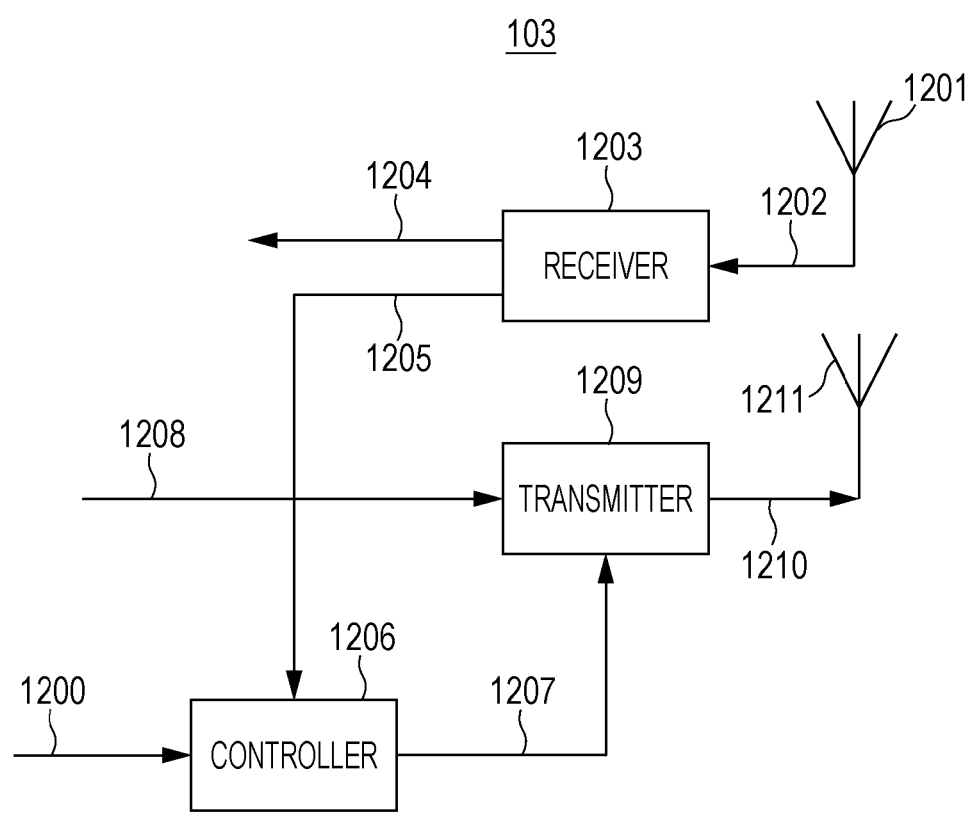
FIG. 12 is a block diagram illustrating the configuration of a short-range communication AP according to the first embodiment.

FIG. 12 is a block diagram illustrating the configuration of the short-range communication AP #1 (103) that operates in the communication system according to the present embodiment.

The short-range communication AP #1 (103) illustrated in FIG. 12 has a configuration including a receiving antenna 1201, a receiver 1203, a controller 1206, a transmitter 1209, and a transmitting antenna 1211.

The receiver 1203 in the short-range communication AP #1 (103) operates when a modulated signal transmitted from a communication partner is present. A received signal 1202 received by the antenna 1201 is input to the receiver 1203. The receiver 1203 performs reception processing, such as frequency conversion, frequency and time synchronization, demodulation, and error correction decoding, on the received signal 1202 and outputs received data 1204 and/or control information 1205. the control information 1205 includes, for example, information regarding a communication method (short-range communication or long-range communication) or information indicating a communication start.

In response to an instruction signal 1200 including information indicating a communication start, the controller 1206 generates a control signal 1207 related to the communication start, and outputs the control signal 1207 to the transmitter 1209. The control signal 1207 includes, for example, information regarding a communication method (short-range communication or long-range communication), information regarding a modulation system, and information regarding an error correction system.

The control information 1205 is one of inputs to the controller 1206, and the controller 1206 may switch the communication method on the basis of the control information 1205. The controller 1206 may also output the control signal 1207 related to a communication start to the transmitter 1209, based on information included in the control information 1205 and indicating the communication start.

Data 1208 and the control signal 1207 are input to the transmitter 1209. The transmitter 1209 performs processing, such as error-correction encoding and modulation (mapping), on the data 1208 and the control signal 1207 to generate a data symbol. The transmitter 1209 also generates a symbol for synchronization in a time domain or frequency domain, a symbol for signal detection in a receiving apparatus, a pilot symbol (reference symbol) for estimating a propagation path, an AGC symbol (i.e., a symbol for adjusting the level of a signal in a receiving apparatus), a control symbol, and so on and outputs a modulated signal 1210 corresponding to these symbols.

The modulated signal 1210 is output from the antenna 1211 over a radio wave. A communication system in this case may be an OFDM system, a single carrier transmission system, or a spread-spectrum communication system.

Also, during transmission of a short-range communication modulated signal, the controller 1206 performs control so that a long-range communication modulated signal is also transmitted together therewith. During the control, the controller 1206 sets a transmit power for each modulated signal in the short-range communication and the long-range communication. For example, an average transmit power of short-range communication modulated signals is denoted by Pa, and an average transmit power of long-range communication modulated signals is denoted by Pb. In this case, Pa<Pb (Pb is larger than Pa) is satisfied.

[Structure of Transmission Frame of Short-Range Communication AP #1 (103)]

The following description will be given of one example structure of a transmission frame transmitted by the short-range communication AP #1 (103) described above and illustrated in FIG. 12.

Figure 13:
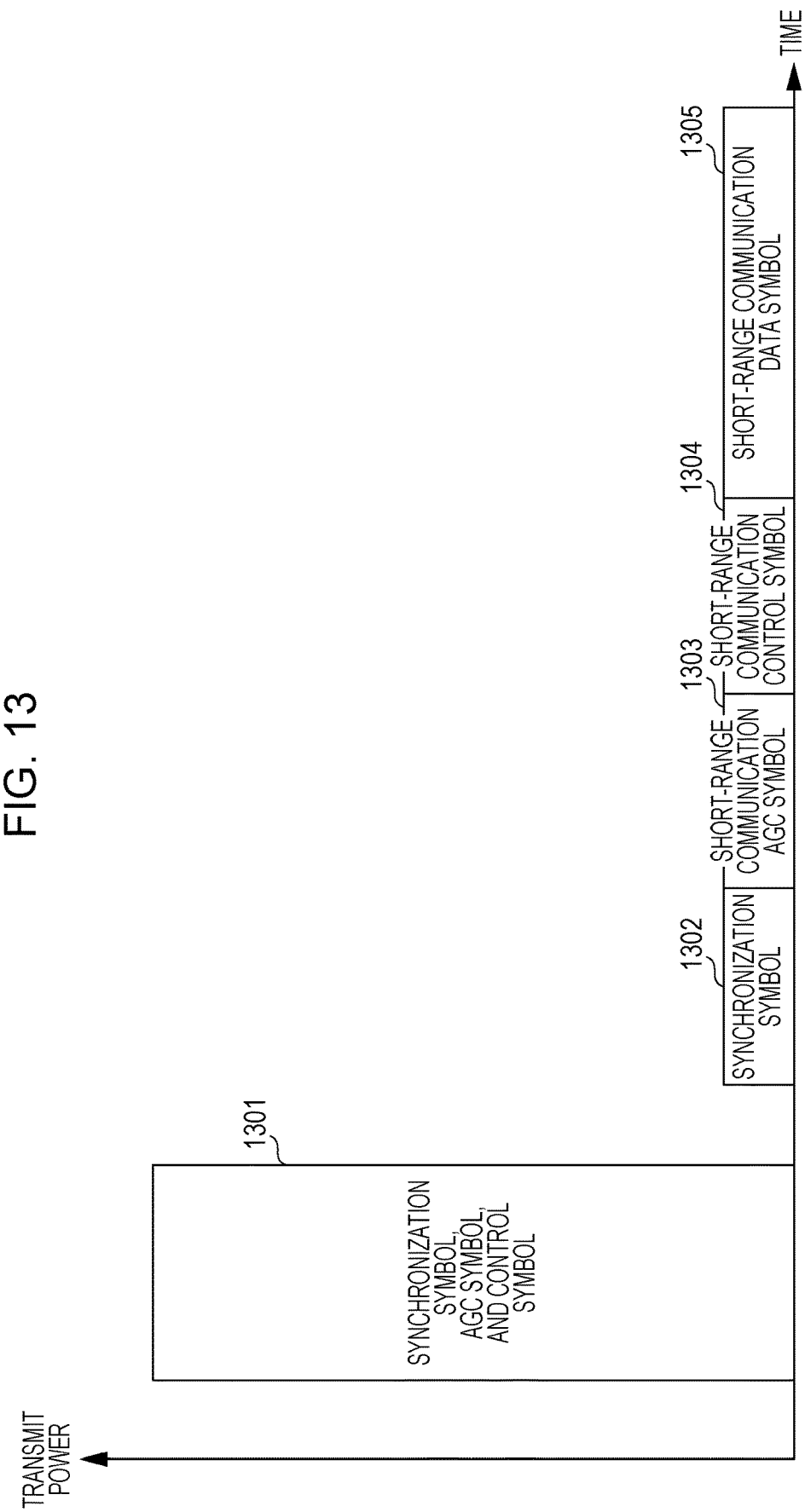
FIG. 13 illustrates an example frame structure when the short-range communication AP according to the first embodiment transmits a modulated signal.

FIG. 13 illustrates one example frame structure of a modulated signal when the short-range communication AP #1 (103) transmits short-range communication data.

That is, FIG. 13 illustrates an example frame structure when the short-range communication AP #1 (103) illustrated in FIG. 1 transmits short-range communication data to the terminal #B (104).

In FIG. 13, the horizontal axis represents time, and the vertical axis represents a transmit power.

The short-range communication AP #1 (103) in FIG. 12 first transmits large-transmit-power symbols 1301. In this case, the possibility that the short-range communication AP #1 (103) can receive power supplied from a power outlet is high, unlike terminals. In this respect, there is a possibility that a restriction of the short-range communication AP #1 (103) regarding the power consumption required to transmit the large-transmit-power symbols 1301 is lower than that of terminals.

The structure of the symbols 1301 illustrated in FIG. 13 is an example structure of large-transmit-power symbols. The symbols 1301 are, for example, a symbol group including a synchronization symbol (i.e., a symbol for achieving frequency synchronization and/or time synchronization in a receiving apparatus), an AGC symbol (i.e., a symbol for adjusting the level of a signal in a receiving apparatus), a control symbol, and so on. Also, the symbols 1301 may further include a symbol for signal detection.

Symbols 1302, 1303, 1304, and 1305 are short-range communication symbols. The symbol 1302 is a synchronization symbol for short-range communication (i.e., a symbol for achieving frequency synchronization and/or time synchronization in a receiving apparatus). When the short-range communication AP #1 (103) transmits the modulated signal illustrated in FIG. 13, a terminal that is a receiving apparatus performs frequency synchronization and/or time synchronization by using the synchronization symbol 1302. The terminal may also perform signal detection by detecting the synchronization symbol 1302. Another possible method is that a symbol (not illustrated) for signal detection in the terminal exists prior to the synchronization symbol 1302.

A symbol 1303 is an AGC symbol for short-range communication. When the short-range communication AP #1 (103) transmits a modulated signal, as illustrated in FIG. 13, the terminal that is a receiving apparatus adjusts the signal level of a received signal by using the AGC symbol 1303.

The symbol 1304 is a short-range communication control symbol. The control symbol 1304 is, for example, a symbol for notifying a communication partner about information regarding an error-correction-coding method (e.g., a coding rate of error correction coding, a code length (a block length) of error correction coding, and so on) used for generating the short-range communication data symbol 1305, a modulation system, and so on.

The symbol 1305 is a data symbol for short-range communication and for transmitting data to a receiving apparatus that is a communication partner.

In FIG. 13, the large-transmit-power symbols 1301 are transmitted from the short-range communication AP #1 (103) by using a transmit power at a level with which they can be received by the AP (101) and the terminal #A (102) illustrated in FIG. 1. That is, the transmitter 1209 in the short-range communication AP transmits the large-transmit-powersymbols by using a transmit power set for the long-range communication and transmits the short-range communication symbols 1302 to 1305 by using a transmit power set for the short-range communication.

Also, the control symbol included in the large-transmit-power symbols 1301 includes information indicating whether the short-range communication AP #1 (103) is performing short-range communication or long-range communication. For example, the control symbol may include bit c0, in which case, when a short-range communication data symbol is to be transmitted, c0 may be set to "0", and when a long-range communication data symbol is to be transmitted, c0 may be set to "1". In FIG. 13, since the short-range communication AP #1 (103) transmits the short-range communication data symbols, c0 is set to "0".

In contrast, the synchronization symbol 1302, the AGC symbol 1303, the control symbol 1304, and the data symbol 1305 illustrated in FIG. 13 are symbols (a symbol group) for short-range communication. That is, these short-range communication symbols are symbols for the short-range communication AP #1 (103) illustrated in FIG. 1 to perform transmission to the terminal #B (104). As illustrated in FIG. 13, these short-range communication symbols are small-transmit-power symbols relative to the large-transmit-power symbols 1301.

Since the relationship between the large-transmit-power symbols 1301 and the small-transmit-power symbols (the short-range communication symbols) 1302 to 1305 is substantially the same as the relationship between the large-transmit-power symbols 301 and the small-transmit-power symbols described above using FIGS. 6 to 10, expressions (1) to (6), and so on, descriptions thereof are not given hereinafter.

Characteristic points in the frame structure illustrated in FIG. 13 are that the large-transmit-power symbols 1301 include an AGC symbol (a first AGC symbol) and another AGC symbol 1303 (a second AGC symbol) exists in the short-range communication symbols 1302 to 1305.

Specifically, in FIG. 1, when the short-range communication AP #1 (103) transmits the first AGC symbol included in the large-transmit-power symbols 1301, the AP (101), the terminal #A (102), or the terminal #B (104) can easily adjust the levels of signals (large-transmit-power symbols) that are received. Thus, the AP (101) and the terminal #A (102) can demodulate the information in the large-transmit-power symbols 1301.

Also, in FIG. 1, when the short-range communication AP #1 (103) transmits the second AGC symbol 1303, the terminal #B (104) can easily adjust the level of a signal (small-transmit-power symbols) that is received. Thus, the terminal #B (104) can demodulate the short-range communication control symbol 1304 and the short-range communication data symbol 1305.

As described above, by using the first AGC symbol included in the large-transmit-power symbols 1301 and the second AGC symbol included in the short-range communication symbols 1302 to 1305, as illustrated in FIG. 13, the terminal #B (104) can accurately adjust the reception-signal levels of both of the symbol groups transmitted using the different transmit powers.

The operations of the AP (101) and the terminal #A (102), illustrated in FIG. 1, when the frame illustrated in FIG. 13 is received are described later in detail.

Also, the frame structure illustrated in FIG. 13 is one example and may include a symbol other than the symbols illustrated in FIG. 13. Examples of such a symbol include a pilot symbol (a reference symbol) for a receiving apparatus to estimate a channel change.

[Configuration of AP (101)]

Figure 14:
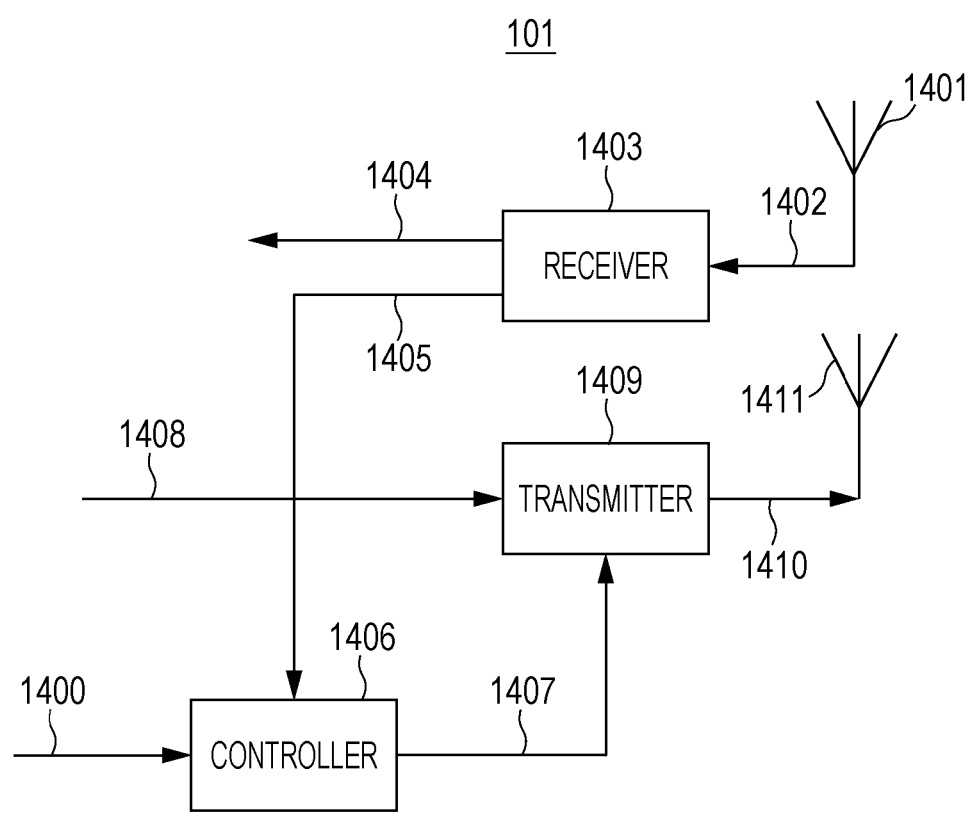
FIG. 14 is a block diagram illustrating the configuration of the long-range communication AP according to the first embodiment.

FIG. 14 is a block diagram illustrating the configuration of the AP (101) that operates in the communication system according to the present embodiment.

The AP (101) illustrated in FIG. 14 has a configuration including a receiving antenna 1401, a receiver 1403, a controller 1406, a transmitter 1409, and a transmitting antenna 1411.

The receiver 1403 in the AP (101) operates when a modulated signal transmitted from a communication partner is present. A received signal 1402 received by the antenna 1401 is input to the receiver 1403. The receiver 1403 performs reception processing, such as frequency conversion, frequency and time synchronization, demodulation, and error correction decoding, on the received signal 1402 and outputs received data 1404 and/or control information 1405. The control information 1405 includes, for example, information regarding a communication method (short-range communication or long-range communication) or information indicating a communication start.

In response to an instruction signal 1400 including information indicating a communication start, the controller 1406 generates a control signal 1407 related to the communication start and outputs the control signal 1407 to the transmitter 1409. The control signal 1407 includes, for example, information regarding a communication method (short-range communication or long-range communication), information regarding a modulation system, and information regarding an error correction system.

The control information 1405 is one of inputs to the controller 1406, and the controller 1406 may switch the communication method on the basis of the control information 1405. Also, on the basis of information included in the control information 1405 and indicating a communication start, the controller 1406 may output the control signal 1407 related to the communication start to the transmitter 1409.

Data 1408 and the control signal 1407 are input to the transmitter 1409. The transmitter 1409 performs processing, such as error-correction encoding and modulation (mapping), on the data 1408 and the control signal 1407 to generate a data symbol. The transmitter 1409 also generates a symbol for synchronization in a time domain or frequency domain, a symbol for signal detection in a receiving apparatus, a pilot symbol (reference symbol) for estimating a propagation path, an AGC symbol (i.e., a symbol for adjusting the level of a signal in a receiving apparatus), a control symbol, and so on and outputs a modulated signal 1410 corresponding to these symbols.

The modulated signal 1410 is output from the antenna 1411 over a radio wave. A communication system in this case may be an OFDM system, a single carrier transmission system, or a spread-spectrum communication system.

The controller 1406 also sets a transmit power for long-range communication modulated signals. For example, an average transmit power of short-range communication modulated signals is denoted by Pa, and an average transmit power of long-range communication modulated signals is denoted by Pb. In this case, Pa<Pb (Pb is larger than Pa) is satisfied.

[Structure of Transmission Frame of AP (101)]

The description below will be given of one example structure of a transmission frame transmitted by the above-described AP (101).

Figure 15:
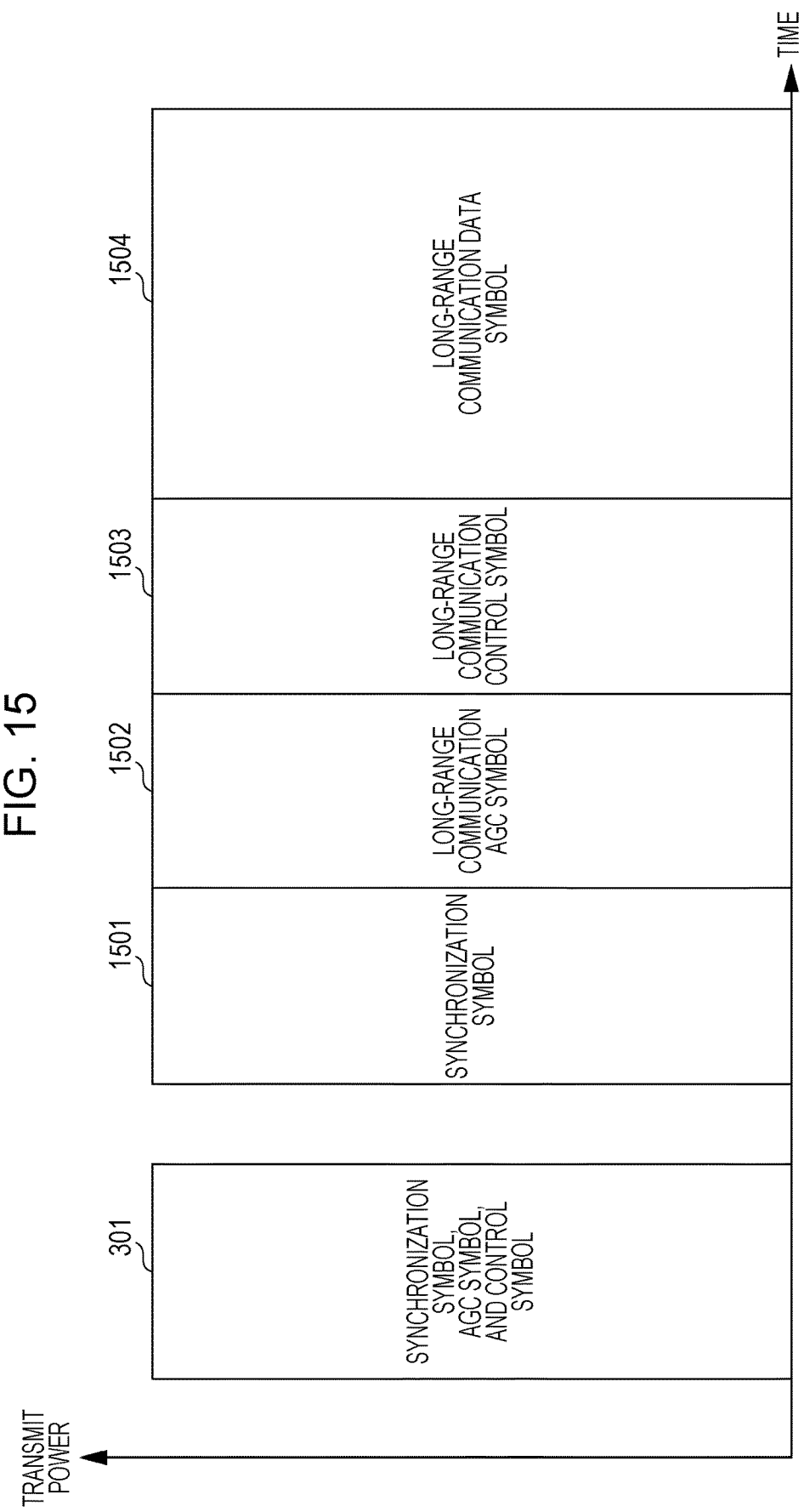
FIG. 15 illustrates an example frame structure when a long-range communication AP according to the first embodiment transmits a modulated signal.

FIG. 15 illustrates one example frame structure of a modulated signal when the AP (101) transmits long-range communication data.

That is, FIG. 15 illustrates an example frame structure when the AP (101) illustrated in FIG. 1 transmits long-range communication data to the terminal #A (102).

In FIG. 15, the horizontal axis represents time, and the vertical axis represents a transmit power. In the frame structure illustrated in FIG. 15, substantially the same structure as the frame structure illustrated in FIG. 3 is denoted by the same reference numerals, and a description thereof are not given hereinafter.

Specifically, in the frame structure illustrated in FIG. 15, the AP (101) first transmits large-transmit-power symbols 301, as in the frame structure illustrated in FIG. 3.

A symbol 1501 illustrated in FIG. 15 is a synchronization symbol for long-range communication (i.e., a symbol for achieving frequency synchronization and/or time synchronization in a receiving apparatus). When the AP (101) transmits the modulated signal illustrated in FIG. 15, the terminal #A (102) that is a receiving apparatus performs frequency synchronization and/or time synchronization by using the synchronization symbol 1501. The terminal #A (102) may perform signal detection by detecting the synchronization symbol 1501. Another possible method is that a symbol (not illustrated) for signal detection in the terminal #A (102) exists prior to the synchronization symbol 1501.

A symbol 1502 is an AGC symbol for long-range communication. When the AP (101) transmits the modulated signal illustrated in FIG. 15, the terminal #A (102) that is a receiving apparatus adjusts the signal level of a received signal by using the AGC symbol 1502.

A symbol 1503 is a control symbol for long-range communication.

A symbol 1504 is a data symbol for long-range communication and for transmitting data to a communication partner. The control symbol 1503 is, for example, a symbol for notifying a communication partner about information regarding an error-correction-coding method (e.g., a coding rate of error correction coding, a code length (a block length) of error correction coding, and so on) used for generating the long-range communication data symbol 1504, a modulation system, and so on.

In FIG. 15, the large-transmit-power symbols 301 are transmitted from the AP (101) by using a transmit power at a level with which they can be received by the terminal #A (102), the terminal #B (104), and the short-range communication AP #1 (103), which are illustrated in FIG. 1.

The control symbol included in the large-transmit-power symbols 301 includes information indicating that the AP (101) is performing long-range communication. For example, the control symbol may include bit c0, in which case, when a short-range communication data symbol is to be transmitted, c0 may be set to "0", and when a long-range communication data symbol is to be transmitted, c0 may be set to "1". In FIG. 15, since the AP (101) transmits the long-range communication data symbols, c0 is set to "1".

Also, in FIG. 15, the synchronization symbol 1501, the AGC symbol 1502, the control symbol 1503, and the data symbol 1504 are symbols (a symbol group) for long-range communication. That is, these long-range communication symbols are symbols for the AP (101) illustrated in FIG. 1 to perform transmission to the terminal #A (102). As illustrated in FIG. 15, these long-range communication symbols are transmitted from the AP (101) by using a transmit power at a level with which they can be received by at least the terminal #A (102) illustrated in FIG. 1 (i.e., a transmit power that is equivalent to that of the large-transmit-power symbols 301).

Since the large-transmit-power symbols 301 are substantially the same as those described above using FIGS. 6 to 10, expressions (1) to (6), and so on, descriptions thereof are not given hereinafter.

Also, the frame structure illustrated in FIG. 15 is one example and may include a symbol other than the symbols illustrated in FIG. 15. Examples of such a symbol include a pilot symbol (a reference symbol) for a receiving apparatus to estimate a channel change.

[Operation of Each Appliance]

As described above, the frame structures illustrated in FIGS. 3, 5, 13, and 15 include the large-transmit-power symbols 301 or 1301. The description below will be given of an operation when each appliance receives the large-transmit-power symbols 301.

<Operation of AP (101)>

The AP (101) performs operations (101-1) to (101-3) described below.

Operation (101-1): When the receiver 1403 in the AP (101) cannot detect (receive) the large-transmit-power symbols 301 (i.e., when no appliance transmits the large-transmit-power symbols 301) in a certain time period, the AP (101) determines that a modulated signal (e.g., see FIG. 15) can be transmitted.

Operation (101-2): When the receiver 1403 in the AP (101) detects the large-transmit-power symbols 301 in a certain period, demodulates the control symbol (c0) included in the large-transmit-power symbols 301, and determines that the received signal includes a short-range communication data symbol (determines that c0 is 0), the AP (101) determines that a modulated signal (e.g., see FIG. 15) is not to be transmitted. In this case, the AP (101) does not have to perform an operation for demodulating short-range communication data symbols.

Operation (101-3): When the receiver 1403 in the AP (101) detects the large-transmit-power symbols 301 in a certain time period, demodulates the control symbol (c0) included in the large-transmit-power symbols 301, and determines that the received signal includes a long-range communication data symbol (determines that c0 is 1), the AP (101) determines that a modulated signal (e.g., see FIG. 15) may be transmitted (in a next frame). Upon determining that the long-range communication data symbol is a symbol addressed to the AP (101), the AP (101) demodulates the long-range communication data symbol.

As described above, by using the large-transmit-power symbols 301, the AP (101) determines whether or not an appliance that is performing short-range communication is present. Upon determining that an appliance that is performing short-range communication is present, the AP (101) stops transmission of a long-range communication modulated signal so as not to interfere with other appliances, and upon determining that an appliance that is performing short-range communication is not present, the AP (101) executes transmission of a long-range communication modulated signal.

<Operation of Terminal #A (102)>

The terminal #A (102) performs operations (102-1) to (102-3) described below.

Operation (102-1): When the receiver 203 in the terminal #A (102) cannot detect (receive) the large-transmit-power symbols 301 (i.e., when no appliance transmits the large-transmit-power symbols 301) in a certain time period, the terminal #A (102) determines that a long-range communication modulated signal (e.g., see FIG. 5) can be transmitted.

Operation (102-2): When the receiver 203 in the terminal #A (102) detects the large-transmit-power symbols 301 in a certain period, demodulates the control symbol (c0) included in the large-transmit-power symbols 301, and determines that the received signal includes a short-range communication data symbol (determines that c0 is 0), the terminal #A (102) determines that a long-range communication modulated signal (e.g., a modulated signal for the AP (101); see FIG. 5) is not to be transmitted. In this case, the terminal #A (102) does not have to perform an operation for demodulating short-range communication data symbols.

Operation (102-3): When the receiver 203 in the terminal #A (102) detects the large-transmit-power symbols 301 in a certain time period, demodulates the control symbol (c0) included in the large-transmit-power symbols 301, and determines that the received signal includes a long-range communication data symbol (determines that c0 is 1), the terminal #A (102) determines that a long-range communication modulated signal (e.g., a modulated signal for the AP (101); see FIG. 5) may be transmitted (in a next frame). Upon determining that the long-range communication data symbol is a symbol addressed to the terminal #A (102), the terminal #A (102) demodulates the long-range communication data symbol.

As described above, by using the large-transmit-power symbols 301, the terminal #A (102) determines whether or not an appliance that is performing short-range communication is present. Upon determining that an appliance that is performing short-range communication is present, the terminal #A (102) stops transmission of a long-range communication modulated signal so as not to interfere with other appliances, and upon determining that an appliance that is performing short-range communication is not present, the terminal #A (102) executes transmission of a long-range communication modulated signal.

<Operation of Short-Range Communication AP #1 (103)>

The short-range communication AP #1 (103) performs operations (103-1) to (103-3) described below.

Operation (103-1): When the receiver 1203 in the short-range communication AP #1 (103) cannot detect (receive) the large-transmit-power symbols 301 (i.e., when no appliance transmits the large-transmit-power symbols 301) in a certain time period, the short-range communication AP #1 (103) determines that a modulated signal (e.g., see FIG. 13) can be transmitted.

Operation (103-2): When the receiver 1203 in the short-range communication AP #1 (103) detects the large-transmit-power symbols 301 in a certain period, demodulates the control symbol (c0) included in the large-transmit-power symbols 301, and determines that the received signal includes a short-range communication data symbol (determines that c0 is 0), the short-range communication AP #1 (103) determines that a short-range communication modulated signal (e.g., see FIG. 13; a modulated signal for the terminal #B (104)) may be transmitted (in a next frame). Upon determining that the short-range communication data symbol is a symbol addressed to the short-range communication AP #1 (103), the short-range communication AP #1 (103) demodulates the short-range communication data symbol.

Operation (103-3): When the receiver 1203 in the short-range communication AP #1 (103) detects the large-transmit-power symbols 301 in a certain time period, demodulates the control symbol (c0) included in the large-transmit-power symbols 301, and determines that the received signal includes a long-range communication data symbol (determines that c0 is 1), the short-range communication AP #1 (103) determines that a short-range communication modulated signal (e.g., see FIG. 13; a modulated signal for the terminal #B (104)) is not to be transmitted. In this case, the AP (101) does not have to perform an operation for demodulating long-range communication data symbols.

As described above, by using the large-transmit-power symbols 301, the short-range communication AP #1 (103) determines whether or not an appliance that is performing long-range communication is present. When the short-range communication AP #1 (103) determines that an appliance that is performing long-range communication is present, there is a possibility that interference occurs, and thus the short-range communication AP #1 (103) stops transmission of a short-range communication modulated signal. Upon determining that an appliance that is performing long-range communication is not present, the short-range communication AP #1 (103) executes transmission of a short-range communication modulated signal.

<Operation of Terminal #B (104)>

The terminal #B (104) performs operations (104-1) to (104-3) described below.

Operation (104-1): When the receiver 203 in the terminal #B (104) cannot (receive) detect the large-transmit-power symbols 301 (i.e., when no appliance transmits the large-transmit-power symbols 301) in a certain time period, the terminal #B (104) determines that a modulated signal (e.g., see FIG. 3 or 4) can be transmitted.

Operation (104-2): When the receiver 203 in the terminal #B (104) detects the large-transmit-power symbols 301 in a certain period, demodulates the control symbol (c0) included in the large-transmit-power symbols 301, and determines that the received signal includes a short-range communication data symbol (determines that c0 is 0), the terminal #B (104) determines that a short-range communication modulated signal (e.g., see FIG. 3 or 4; a modulated signal for the short-range communication AP #1 (103)) may be transmitted (in a next frame). Upon determining that the short-range communication data symbol is a symbol addressed to the terminal #B (104), the terminal #B (104) demodulates the short-range communication data symbol.

Operation (104-3): When the receiver 203 in the terminal #B (104) detects the large-transmit-power symbols 301 in a certain time period, demodulates the control symbol (c0) included in the large-transmit-power symbols 301, and determines that the received signal includes a long-range communication data symbol (determines that c0 is 1), the terminal #B (104) determines that a short-range communication modulated signal (e.g., see FIG. 3 or 4; a modulated signal for the short-range communication AP #1 (103)) is not to be transmitted. In this case, the terminal #B (104) does not have to perform an operation for demodulating long-range communication data symbols.

As described above, by using the large-transmit-power symbols 301, the terminal #B (104) determines whether or not an appliance that is performing long-range communication is present. When the terminal #B (104) determines that an appliance that is performing long-range communication is present, there is a possibility that interference occurs, and thus the terminal #B (104) stops transmission of a short-range communication modulated signal. Upon determining that an appliance that is performing long-range communication is not present, the terminal #B (104) executes transmission of a short-range communication modulated signal.

The above description has been given of an operation when each appliance receives the large-transmit-power symbols 301.

As described above, each of the appliances (e.g., the short-range communication AP #1 (103) and the terminal #B (104) in FIG. 1) that perform short-range communication transmits large-transmit-power symbols (a control symbol) that are also to arrive at appliances (e.g., the AP (101) and the terminal #A (102) illustrated in FIG. 1) that performs long-range communication.

Each of communication apparatuses (the AP and the terminal) that perform long-range communication receives the modulated signals transmitted from any of the communication apparatuses (the short-range communication AP and the terminal) that perform short-range communication. The communication apparatus that performs long-range communication stops the long-range communication when the received modulated signal includes a large-transmit-power symbol, and executes the long-range communication when the received modulated signal does not include a large-transmit-power symbol.

That is, by transmitting the large-transmit-power symbols, the appliance that performs short-range communication issues, to the appliance that performs long-range communication, a notification indicating that short-range communication is to be performed. That is, the appliance that performs short-range communication reserves transmission resources for short-range communication, by transmitting large-transmit-power symbols. This allows the appliance that performs long-range communication to determine whether or not an appliance that performs short-range communication is present. Then, upon determining that an appliance that performs short-range communication is present, the appliance that performs long-range communication performs transmission control so as not to cause interference. This provides an advantage that it is possible to perform data communication with high reliability. Hence, according to the present embodiment, even when short-range communication and long-range communication are made to co-exist at the same frequency (in frequency bands that at least partially overlap each other), it is possible to suppress a reduction in the data transmission capacity.

[Data Transmission Efficiency]

Next, a description will be given of a communication method for further improving the data transmission efficiency.

First, a description will be given of problems about the data transmission efficiency.

As described above, an appliance that performs short-range communication transmits a large-transmit-power (control) symbol that is also to arrive at an appliance that performs long-range communication. This allows the appliance that performs long-range communication to determine whether or not an appliance that performs short-range communication is present. Upon determining that an appliance that performs short-range communication is present, the appliance that performs long-range communication performs operation control so as not to cause interference (i.e., determines that no modulated signal is to be transmitted).

In this case, if another short-range communication appliance also receives the large-transmit-power (control) symbol transmitted by the appliance that performs short-range communication and stops transmission of a short-range communication modulated signal, the data transmission efficiency in the system decreases significantly.

Figure 16:
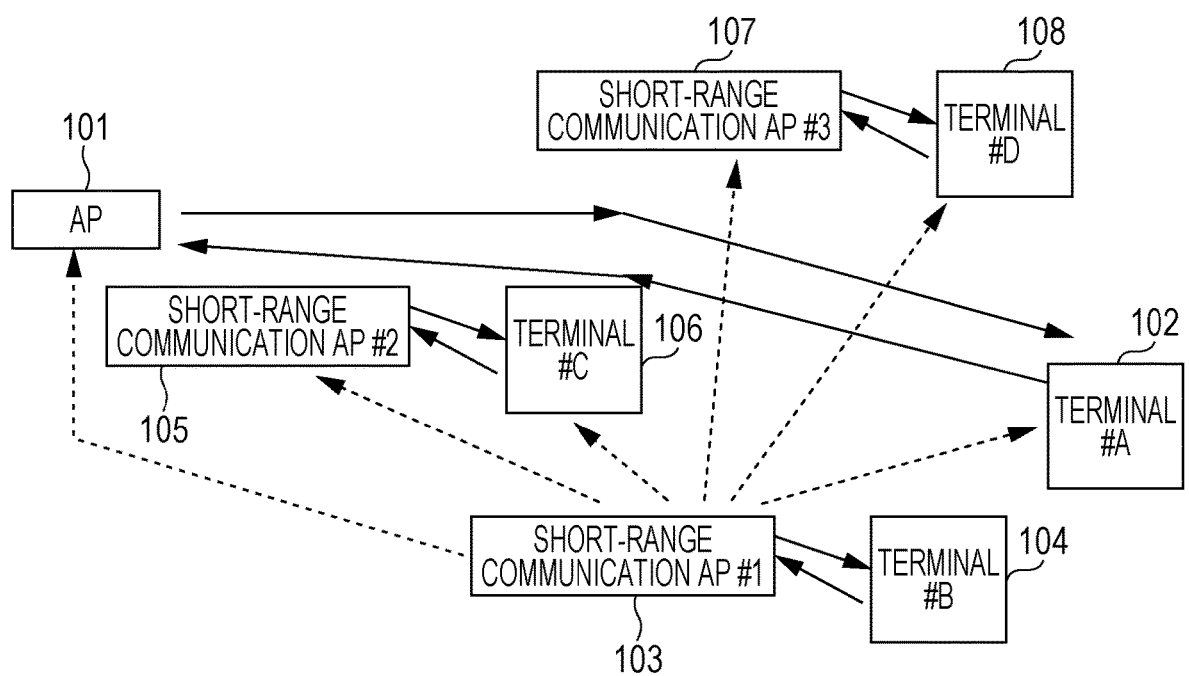
FIG. 16 illustrates an example configuration of a communication system including appliances that perform short-range communication and appliances that perform long-range communication according to the first embodiment.

Now, consider a case in which short-range communication and long-range communication co-exist at the same frequency (frequency band), as illustrated in FIG. 16, by way of example.

In FIG. 16, appliances that perform substantially the same operations as those in FIG. 1 are denoted by the same reference numbers. FIG. 16 illustrates a configuration in which a short-range communication AP #2 (105), a short-range communication AP #3 (107), a terminal #C (106), and a terminal D (108) are further added to the configuration illustrated in FIG. 1.

In FIG. 16, a communication partner of the AP (101) is the terminal #A (102), a communication partner of the short-range communication AP #1 (103) is the terminal #B (104), a communication partner of the short-range communication AP #2 (105) is the terminal #C (106), and a communication partner of the short-range communication AP #3 (107) is the terminal D (108).

Now, consider a case in which the terminal #B (104) and the short-range communication AP #1 (103) communicate with each other.

In this case, as described above, each of the terminal #B (104) and the short-range communication AP #1 (103) transmits large-transmit-power symbols and short-range communication symbols (e.g., see FIGS. 3 and 13).

In this case, when the AP (101), the terminal #A (102), the short-range communication AP #2 (105), the terminal #C (106), the short-range communication AP #3 (107), or the terminal #D (108) transmits a modulated signal in a time period in which the terminal #B (104) or the short-range communication AP #1 (103) transmits a modulated signal including large-transmit-power symbols, the modulated signals interfere with each other. Consequently, the data reception quality decreases, and thus, when the data transmission efficiency is considered, there is a high possibility that it is desirable not to transmit a modulated signal in the time period in which the modulated signal including the large-transmit-power symbols is transmitted.

Also, even when the short-range communication AP #2 (105), the terminal #C (106), the short-range communication AP #3 (107), or the terminal #D (108) transmits a short-range communication symbol in a time period in which the terminal #B (104) and the short-range communication AP #1 (103) are transmitting other short-range communication symbols, the possibility that the modulated signals interfere with each other is low, when the spatial distance reached by the short-range communication symbols is considered.

Thus, there is a high possibility that when data is efficiently transmitted using the time period in which the short-range communication symbol is present, the data transmission efficiency in the communication system can be improved.

A communication method for improving the data transmission efficiency in the communication system will be described below in detail.

The communication state of each appliance after the terminal #B (104) and the short-range communication AP #1 (103) start communicating with each other will now be described as one example with reference to FIG. 17.

Figure 17:
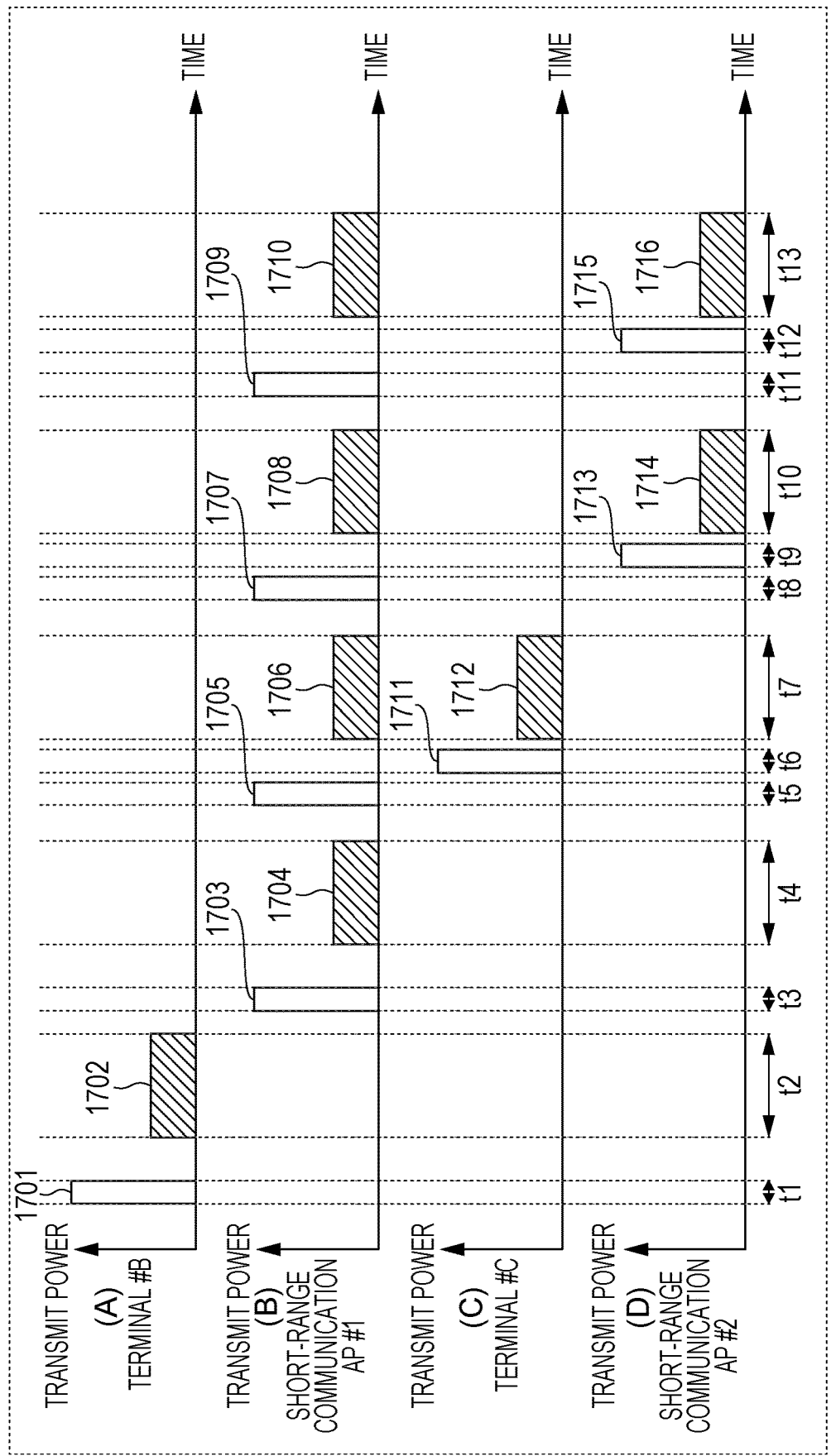
FIG. 17 illustrates an example frame structure of a modulated signal transmitted by the appliance that performs short-range communication according to the first embodiment (when one terminal transmits a large-transmit-power symbol)

In FIG. 17, FIG. 17(A) illustrates one example frame structure of a modulated signal transmitted by the terminal #B (104) illustrated in FIG. 16, FIG. 17(B) illustrates one example frame structure of a modulated signal transmitted by the short-range communication AP #1 (103) illustrated in FIG. 16, FIG. 17(C) illustrates one example frame structure of a modulated signal transmitted by the terminal #C (106) illustrated in FIG. 16, and FIG. 17(D) illustrates one example frame structure of a modulated signal transmitted by the short-range communication AP #2 (105) illustrated in FIG. 16.

In FIGS. 17(A) to 17(D), the horizontal axis represents time, and the vertical axis represents a transmit power.

Also, in FIG. 17, the terminal #B (104) is assumed to be a terminal that can transmit both a short-range communication modulated signal and a long-range communication modulated signal (e.g., see FIG. 3).

Also, in FIG. 17, the terminal #B (104), the short-range communication AP #1 (103), the terminal #C (106), and the short-range communication AP #2 (105) transmit modulated signals by using the same frequency (frequency band).

As illustrated in FIG. 17(A), the terminal #B (104) transmits a large-transmit-power symbol 1701 in a time period (time period) t1 and transmits a short-range communication symbol 1702 in a time period t2.

As illustrated in FIG. 17(B), the short-range communication AP #1 (103) transmits a large-transmit-power symbol 1703 in a time period t3 and transmits a short-range communication symbol 1704 in a time period t4. In addition, the short-range communication AP #1 (103) transmits a large-transmit-power symbol 1705 in a time period t5 and transmits a short-range communication symbol 1706 in a time period t7. Additionally, the short-range communication AP #1 (103) transmits a large-transmit-power symbol 1707 in a time period t8, transmits a short-range communication symbol 1708 in a time period t10, transmits a large-transmit-power symbol 1709 in a time period t11, and transmits a short-range communication symbol 1710 in a time period t13.

As illustrated in FIG. 17(C), the terminal #C (106) transmits a large-transmit-power symbol 1711 in a time period t6 and transmits a short-range communication symbol 1712 in the time period t7.

As illustrated in FIG. 17(D), the short-range communication AP #2 (105) transmits a large-transmit-power symbol 1713 in a time period t9, transmits a short-range communication symbol 1714 in the time period t10, transmits a large-transmit-power symbol 1715 in a time period t12, and transmits a short-range communication symbol 1716 in the time period t13.

Since the relationships between the large-transmit-power symbols and the short-range communication symbols in FIGS. 17(A) to 17(D) are substantially the same as those described above using FIGS. 6 to 10, expressions (1) to (6), and so on, descriptions thereof are not given hereinafter.

A characteristic point in FIG. 17 will be described below.

In the time period t7, the short-range communication AP #1 and the terminal #C transmit the short-range communication symbols 1706 and 1712, respectively; in the time period t10, the short-range communication APs #1 and #2 transmit the short-range communication symbols 1708 and 1714, respectively; and in the time period t13, the short-range communication APs #1 and #2 transmit the short-range communication symbols 1710 and 1716, respectively.

That is, in FIG. 17, in the same time periods (t7, t10, and t13), the plurality of appliances transmit the short-range communication symbols. As described above, even when the terminal #C and the short-range communication AP #2 transmit short-range communication symbols in a time period in which the terminal #B and the short-range communication AP #1 are performing short-range communication, the possibility that the modulated signals interfere with each other is low, when the spatial distance reached by the short-range communication symbols is considered.

Thus, since a plurality of appliances can simultaneously transmit short-range communication symbols at the same frequency (frequency band) and in the same time period, it is possible to obtain an advantage in that the data transmission efficiency in the system improves.

Another characteristic point in FIG. 17 will be described next.

In FIG. 17, control is performed so that a plurality of large-transmit-power symbols are not transmitted in the same time period.

For example, in FIG. 17, time intervals (the time periods t5 and t6) for time-dividing two or more short-range communication symbols exist between the short-range communication symbol 1704 and the short-range communication symbol 1706. In other words, time intervals (guard sections) in which two or more sets of large-transmit-power symbols can be arranged without overlapping in a time domain exist between the short-range communication symbol 1704 and the short-range communication symbol 1706. For example, the frame structure between the short-range communication symbol 1704 and the short-range communication symbol 1706 is such that two sets of large-transmit-power symbols can be transmitted.

This allows two or more appliances to transmit large-transmit-power symbols between the short-range communication symbol 1704 and the short-range communication symbol 1706. For example, in FIG. 17, in the time period t5, the short-range communication AP #1 transmits the large-transmit-power symbol 1705 between the short-range communication symbol 1704 and the short-range communication symbol 1706, and in the time period t6, the terminal #C transmits the large-transmit-power symbol 1711 between the short-range communication symbol 1704 and the short-range communication symbol 1706. That is, the short-range communication AP #1 and the terminal #C transmit respective large-transmit-power symbols without interference.

That is, a plurality of time segments in which a certain number (two in FIG. 17) of large-transmit-power symbols can be transmitted are provided between adjacent time segments in which short-range communication symbols are transmitted. The plurality of large-transmit-power symbols transmitted from the respective communication apparatuses (the terminal and the short-range communication AP) that perform short-range communication are transmitted in different time segments in the plurality of time segments.

As illustrated in FIG. 17, when appliances transmit large-transmit-power symbols without overlapping each other in a time domain, a larger number of appliances can receive the large-transmit-power symbols, thus making it possible to reduce the possibility that each appliance transmits a modulated signal that can cause interference. This makes it possible to obtain an advantage in that the data transmission efficiency in the system improves.

Also, as illustrated in FIGS. 17(A) to 17(D), the large-transmit-power symbols are transmitted from communication apparatuses (the short-range communication AP and the terminal) that transmit short-range communication symbols. In this case, the AP 101 and the terminal #A (102) illustrated in FIG. 16 receive, for example, large-transmit-power symbols transmitted by the appliances illustrated in FIG. 17 and determine that long-range communication symbols are not to be transmitted in the time periods t1 to t13 illustrated in FIG. 17.

Figure 18:
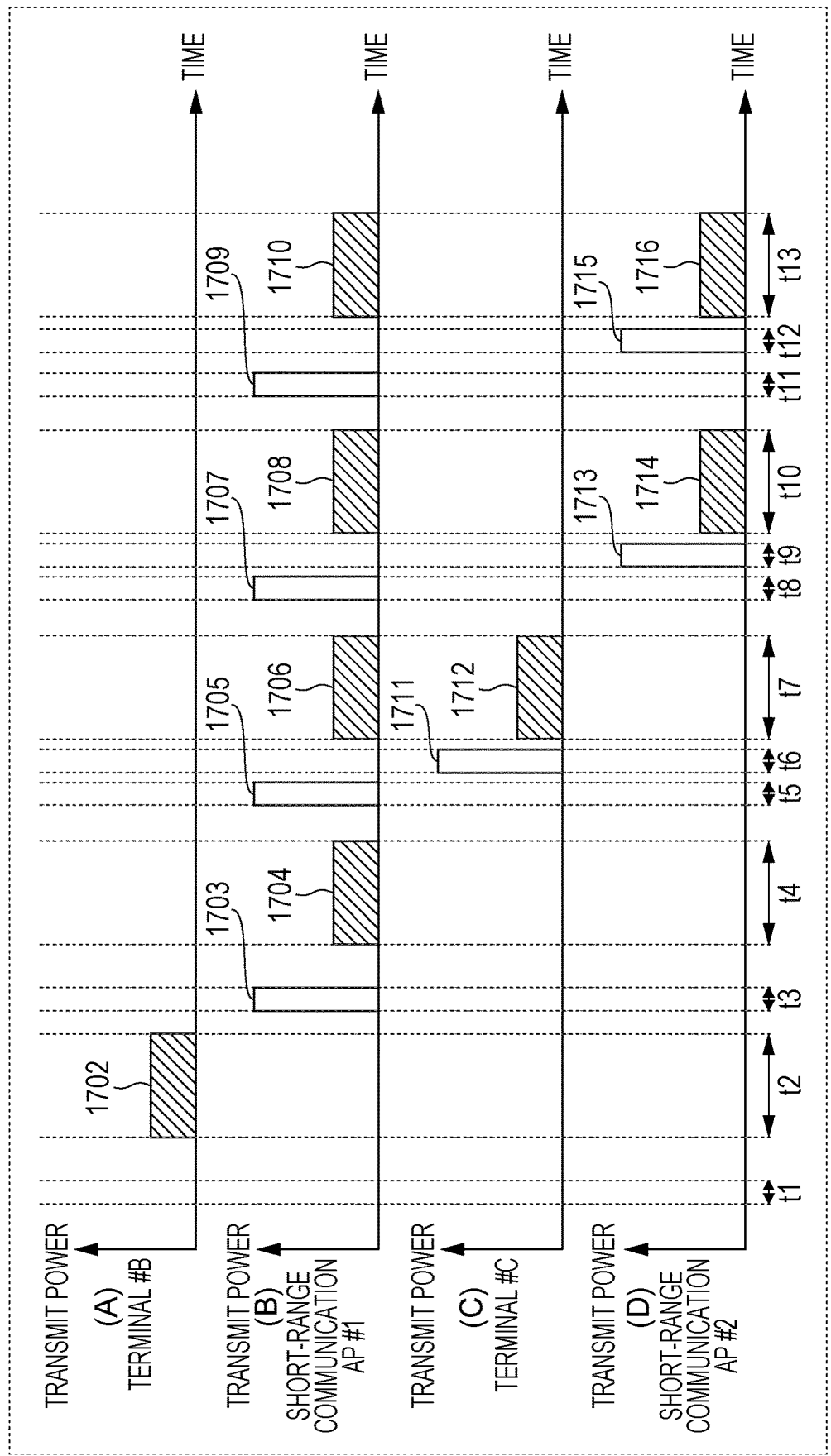
FIG. 18 illustrates an example frame structure of a modulated signal transmission by the appliance that performs short-range communication according to the first embodiment (when the terminal does not transmit a large-transmit-power symbol)

FIG. 18 is a diagram illustrating an example of a communication method for improving the data transmission efficiency in the communication system, the example being different from that in FIG. 17. In FIG. 18, operations that are substantially the same as those in FIG. 17 are denoted by the same reference numerals, and descriptions thereof are not given hereinafter.

Specifically, the terminal #B (104) in FIG. 17 is a terminal that can transmit both a short-range communication modulated signal and a long-range communication modulated signal, whereas the terminal #B (104) in FIG. 18 is a terminal (e.g., see FIG. 4) that can transmit only a short-range communication modulated signal.

That is, as illustrated in FIG. 18(A), the terminal #B does not transmit a large-transmit-power symbol in the time period t1 and transmits only the short-range communication symbol 1702 in the time period t2.

In FIG. 18, the plurality of appliances transmit the short-range communication symbols in the same time periods (t7, t10, and t13), as in FIG. 17. Thus, since a plurality of appliances can simultaneously transmit short-range communication symbols at the same frequency (frequency band) and in the same time period, it is possible to obtain an advantage in that the data transmission efficiency in the system improves.

In FIG. 18, control is performed so that a plurality of large-transmit-power symbols are not transmitted in the same time period, as in FIG. 17. As illustrated in FIG. 18, when appliances transmit large-transmit-power symbols without overlapping each other in a time domain, a larger number of appliances can receive the large-transmit-power symbols, thus making it possible to reduce the possibility that each appliance transmits a modulated signal that can cause interference. This makes it possible to obtain an advantage in that the data transmission efficiency in the system improves.

An example in which a plurality of appliances transmit short-range communication symbols is not limited to FIGS. 17 and 18. For example, two short-range communication APs may transmit short-range communication symbols in the same time period, two terminals may transmit short-range communication symbols in the same time period, or a short-range communication AP and a terminal may transmit short-range communication symbols in the same time period. Also, the number of appliances that transmit short-range communication symbols in the same time period may be three or more. As described above, by receiving and demodulating a large-transmit-power symbol and making a determination, each appliance determines whether or not a short-range communication symbol is to be transmitted.

Although the short-range communication symbols 1706 and 1712 exist in the time period t7 illustrated in FIGS. 17 and 18, for example, the frame structure may be such that the short-range communication symbol 1706 exists throughout the time period t7 and the short-range communication symbol 1712 exists throughout a time interval that is included in the range of the time period t7 and that is shorter than the time interval of the short-range communication symbol 1706. That is, a time resource occupied by the short-range communication symbol 1706 and a time resource occupied by the short-range communication symbol 1712 do not necessarily have to be the same. In other words, the time interval used by the short-range communication symbol 1706 and the time interval used by the short-range communication symbol 1712 do not necessarily have to be the same. In this respect, a similar structure may also be used when a plurality of short-range communication symbols exist at the same time.

Second Embodiment

The description in the first embodiment has been given of a case in which, as illustrated in FIGS. 17 and 18, a plurality of appliances transmit large-transmit-power symbols between adjacent two short-range communication symbols so that the large-transmit-power symbols do not overlap each other in a time domain.

In contrast, a description in the present embodiment will be given of a case in which only one of a plurality of appliances transmits a large-transmit-power symbol between adjacent two short-range communication symbols.

Since the appliances according to the present embodiment have basic configurations that are the same as or similar to those of the appliances according to the first embodiment, a description will be given using FIGS. 2, 12, and 14. One example of a communication system according to the present embodiment will be described with reference to FIG. 16 used in the first embodiment.

The communication state of each appliance after the terminal #B (104) and the short-range communication AP #1 (103) start communicating with each other will now be described as one example with reference to FIG. 19.

Figure 19:
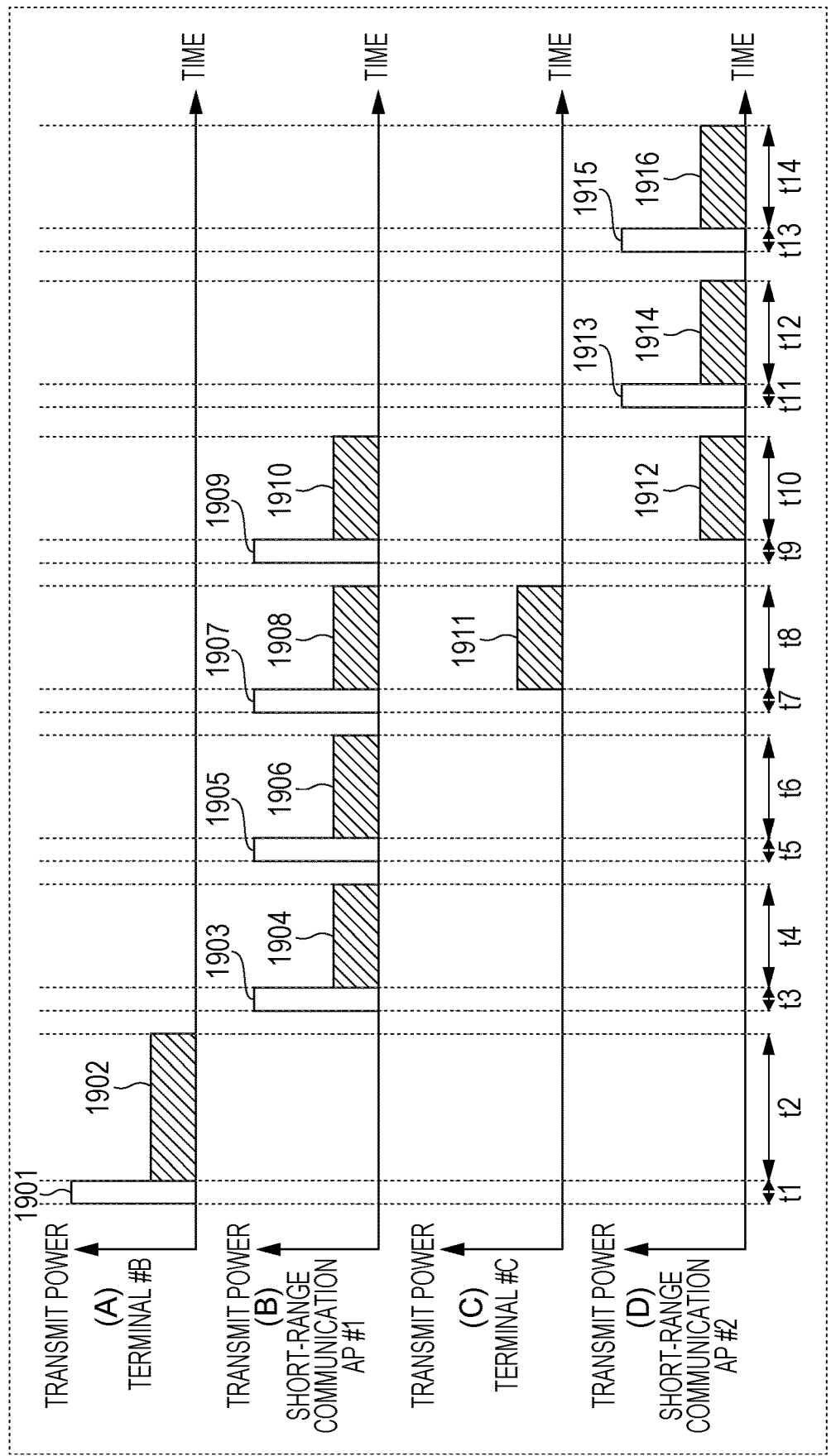
FIG. 19 illustrates an example frame structure of a modulated signal transmitted by the appliance that performs short-range communication according to a second embodiment (when the terminal transmits a large-transmit-power symbol)

In FIG. 19, FIG. 19(A) illustrates one example frame structure of a modulated signal transmitted by the terminal #B (104) illustrated in FIG. 16, FIG. 19(B) illustrates one example frame structure of a modulated signal transmitted by the short-range communication AP #1 (103) illustrated in FIG. 16, FIG. 19(C) illustrates one example frame structure of a modulated signal transmitted by the terminal #C (106) illustrated in FIG. 16, and FIG. 19(D) illustrates one example frame structure of a modulated signal transmitted by the short-range communication AP #2 (105) illustrated in FIG. 16.

In FIGS. 19(A) to 19(D), the horizontal axis represents time, and the vertical axis represents a transmit power.

Also, in FIG. 19, the terminal #B (104) is assumed to be a terminal that can transmit both a short-range communication modulated signal and a long-range communication modulated signal (e.g., see FIG. 3).

Also, in FIG. 19, the terminal #B (104), the short-range communication AP #1 (103), the terminal #C (106), and the short-range communication AP #2 (105) transmit modulated signals by using the same frequency (frequency band).

As illustrated in FIG. 19(A), the terminal #B (104) transmits a large-transmit-power symbol 1901 in a time period t1 and transmits a short-range communication symbol 1902 in a time period t2.

As illustrated in FIG. 19(B), the short-range communication AP #1 (103) transmits a large-transmit-power symbol 1903 in a time period t3 and transmits a short-range communication symbol 1904 in a time period t4. In addition, the short-range communication AP #1 (103) transmits a large-transmit-power symbol 1905 in a time period t5, transmits a short-range communication symbol 1906 in a time period t6, transmits a large-transmit-power symbol 1907 in a time period t7, and transmits a short-range communication symbol 1908 in a time period t8. Additionally, the short-range communication AP #1 (103) transmits a large-transmit-power symbol 1909 in a time period t9 and transmits a short-range communication symbol 1910 in a time period t10.

As illustrated in FIG. 19(C), the terminal #C (106) transmits a short-range communication symbol 1911 in the time period t8.

As illustrated in FIG. 19(D), the short-range communication AP #2 (105) transmits a short-range communication symbol 1912 in the time period t10, transmits a large-transmit-power symbol 1913 in a time period t11, transmits a short-range communication symbol 1914 in a time period t12, transmits a large-transmit-power symbol 1915 in a time period t13, and transmits a short-range communication symbol 1916 in a time period t14.

Since the relationships between the large-transmit-power symbols and the short-range communication symbols in FIGS. 19(A) to 19(D) are substantially the same as those described above using FIGS. 6 to 10, expressions (1) to (6), and so on, descriptions thereof are not given hereinafter.

A characteristic point in FIG. 19 will be described below.

In the time period t8, the short-range communication AP #1 and the terminal #C transmit the short-range communication symbols 1908 and 1911, respectively; and in the time period t10, the short-range communication APs #1 and #2 transmit the short-range communication symbols 1910 and 1912, respectively.

That is, in FIG. 19, the plurality of appliances transmit the short-range communication symbols in the same time periods (t8 and t10). As described above in the first embodiment, even when the terminal #C and the short-range communication AP #2 transmit short-range communication symbols in a time period in which the terminal #B and the short-range communication AP #1 are performing short-range communication, the possibility that the modulated signals interfere with each other is low, when the spatial distance reached by the short-range communication symbols is considered.

Thus, as in the first embodiment, since a plurality of appliances can simultaneously transmit short-range communication symbols at the same frequency (frequency band) and at the same time, it is possible to obtain an advantage in that the data transmission efficiency in the system improves.

Another characteristic point in FIG. 19 will be described next.

In FIG. 19, control is performed so that a plurality of large-transmit-power symbols do not exist in the same time period.

Specifically, in FIG. 19, a single time segment in which one large-transmit-power symbol can be transmitted is provided between adjacent time segments in which short-range communication symbols are transmitted. Then, in the single time segment, a large-transmit-power symbol is transmitted from one of the communication apparatuses (the terminal and the short-range communication AP) that perform short-range communication.

For example, in FIG. 19, only the large-transmit-power symbols 1903, 1905, 1907, and 1909 transmitted from the short-range communication AP #1 exist in the time periods t3, t5, t7, and t9. Also, in FIG. 19, only the large-transmit-power symbols 1913 and 1915 transmitted from the short-range communication AP #2 exist in the time periods t11 and t13.

That is, in the time periods t3, t5, t7, t9, t11, and t13 illustrated in FIG. 19, only one of the plurality of appliances that perform short-range communication transmits a large-transmit-power symbol. This makes it possible to avoid a plurality of large-transmit-power symbols interfering with each other and allows a larger number of appliances to receive large-transmit-power symbols. Thus, it is possible to reduce the possibility that each appliance transmits a modulated signal that can cause interference. This makes it possible to obtain an advantage in that the data transmission efficiency in the system improves.

More specifically, the purpose of transmitting the large-transmit-power symbol is to notify, for example, the AP (101), the terminal #A (102), the short-range communication AP #1 (103), the terminal #B (104), the short-range communication AP #2 (105), the terminal #C (106), the short-range communication AP #3 (107), and the terminal #D (108) in FIG. 16 as to whether each appliance is performing short-range communication or long-range communication, as described in the first embodiment.

That is, it is sufficient that a notification indicating that short-range communication is being performed in the time periods t1 to t14 illustrated in FIG. 19 be issued to the AP (101) and the terminal #A (102).

Hence, it is sufficient that the large-transmit-power symbol for giving a notification indicating that short-range communication is being performed in a certain time period be transmitted from at least one of a plurality of appliances that perform short-range communication, as illustrated in FIG. 19.

For example, in FIG. 19, in a state in which neither short-range communication nor long-range communication is performed, first, the terminal #B (104) performs short-range communication. That is, the terminal #B (104) transmits the large-transmit-power symbol 1901 and the short-range communication symbol 1902 to the short-range communication AP #1 (103) that is a communication partner. In this case, the AP (101) and the terminal #A (102) detect the large-transmit-power symbol 1901 in the time period t1 to thereby stop transmission of long-range communication symbols. Thus, the time segment of the time periods t1 and t2 is allocated (reserved) as a segment for short-range communication.

Next, after receiving the large-transmit-power symbol 1901 and the short-range communication symbol 1902, the short-range communication AP #1 (103) transmits the large-transmit-power symbol 1903 in the time period t3 and transmits the short-range communication symbol 1904 in the time period t4. In addition, the short-range communication AP #1 (103) transmits the large-transmit-power symbol 1905 in the time period t5, transmits the short-range communication symbol 1906 in the time period t6, transmits the large-transmit-power symbol 1907 in the time period t7, and transmits the short-range communication symbol 1908 in the time period t8. Additionally, the short-range communication AP #1 (103) transmits the large-transmit-power symbol 1909 in the time period t9 and transmits the short-range communication symbol 1910 in the time period t10.

In this case, the AP (101) and the terminal #A (102) detect the large-transmit-power symbols 1903, 1905, 1907, and 1909 in the time periods t3, t5, t7, and t9 to thereby stop transmission of long-range communication symbols. In this manner, the time segment of the time periods t3 to t10 is allocated (reserved) as a segment for short-range communication.

In this case, it is assumed that the terminal #C (106) enters a state in which it needs to transmit the short-range communication symbol 1911 in the time period t8.

At this point in time, since the short-range communication AP #1 (103) transmits the large-transmit-power symbols in the time periods t3 to t10, the terminal #C (106) does not transmit a large-transmit-power symbol in the time period t7.

Also, since the time periods t3 to t10 are already allocated as a data transmission segment for short-range communication (i.e., as a segment in which the short-range communication AP #1 (103) transmits short-range communication data), the terminal #C (106) transmits the short-range communication symbol 1911 in the time period t8.

That is, it is assumed that, in order to transmit a short-range communication symbol, any (which is assumed to be an "appliance #1", by way of example) of the appliances has reserved a time segment #A by transmitting a large-transmit-power symbol. In this case, another appliance (which is assumed to be an "appliance #2", by way of example) recognizes that the appliance #1 is transmitting the large-transmit-power symbol. A structure example of the large-transmit-power symbol in this case is described later. Subsequently, when the appliance #2 needs to transmit a short-range communication symbol in the time segment #A, the appliance #2 transmits the short-range communication symbol without transmitting a large-transmit-power symbol.

Similarly, in FIG. 19, the short-range communication AP #2 (105) receives the short-range communication symbol 1911, transmits the short-range communication symbol 1912 in the time period t10, transmits the large-transmit-power symbol 1913 in the time period t11, transmits the short-range communication symbol 1914 in the time period t12, transmits the large-transmit-power symbol 1915 in the time period t13, and transmits the short-range communication symbol 1916 in the time period t14.

In this case, since the short-range communication AP #1 (103) transmits the large-transmit-power symbols in the segment of the time periods t3 to t10, the short-range communication AP #2 (105) does not transmit a large-transmit-power symbol in the time period t9.

Also, since the time periods t3 to t10 are already allocated as a data transmission segment for short-range communication (i.e., as a segment in which the short-range communication AP #1 (103) transmits short-range communication data), the short-range communication AP #2 (105) transmits the short-range communication symbol 1912 in the time period t10.

Also, it is assumed that, in the time periods t11 to t14 illustrated in FIG. 19, the short-range communication AP #1 (103) and the terminal #B (104) do not transmit a modulated signal, and appliances other than the short-range communication AP #2 (105) do not transmit a short-range communication symbol. In this case, the short-range communication AP #2 (105) transmits the large-transmit-power symbol 1913 in the time period t11. In this case, the AP (101) and the terminal #A (102) detect the large-transmit-power symbol 1901 in the time period t11 to thereby stop transmission of long-range communication symbols. Thus, the time segment of the time periods t11 and t12 is allocated (reserved) as a segment for short-range communication.

That is, an appliance that is to transmit a short-range communication symbol determines whether or not a large-transmit-power symbol transmitted from another appliance is present, and then determines that a large-transmit-power symbol is to be transmitted, when a large-transmit-power symbol from another appliance is not present.

In FIG. 19, the short-range communication AP #2 (105) transmits the short-range communication symbol 1914 in the time period t12, transmits the large-transmit-power symbol 1915 in the time period t13, and then transmits the short-range communication symbol 1916 in the time period t14.

In order to realize the operations of the appliances illustrated in FIG. 19, for example, it is necessary that the large-transmit-power symbol 1909 that the short-range communication AP #1 (103) transmits in the time period t9 be recognized by other appliances as the last large-transmit-power symbol that is to be transmitted when the short-range communication AP #1 (103) transmits the series of short-range communication symbols (1904, 1906, 1908, and 1910).

Accordingly, for example, during transmission of the series of short-range communication symbols, the large-transmit-power symbol 1909 may include information indicating that it is the last large-transmit-power symbol to be transmitted.

Also, another possible method is a method in which a large-transmit-power symbol includes information indicating the number of frames to be transmitted and information indicating the number of a frame that is currently transmitted. For instance, the symbols transmitted by the short-range communication AP #1 illustrated in FIG. 19(B) will now be described by way of example.

In this case, in FIG. 19(B), a segment in which the large-transmit-power symbol 1903 and the short-range communication symbol 1904 are transmitted is referred to as a "first frame", a segment in which the large-transmit-power symbol 1905 and the short-range communication symbol 1906 are transmitted is referred to as a "second frame", a segment in which the large-transmit-power symbol 1907 and the short-range communication symbol 1908 is transmitted is referred to as a "third frame", and a segment in which the large-transmit-power symbol 1909 and the short-range communication symbol 1910 are transmitted is referred to as a "fourth frame".

In this case, the large-transmit-power symbol 1903 includes information indicating that the number of frames to be transmitted is "4" and information indicating that the number of a frame that is being transmitted is "1". The large-transmit-power symbol 1905 also includes information indicating that the number of frames to be transmitted is "4" and information indicating that the number of a frame that is being transmitted is "2". Similarly, the large-transmit-power symbol 1907 includes information indicating that the number of frames to be transmitted is "4" and information indicating that the number of a frame that is being transmitted is "3", and the large-transmit-power symbol 1909 includes information indicating that the number of frames to be transmitted is "4" and information indicating that the number of a frame that is being transmitted is "4".

Other appliances receive such a large-transmit-power symbol including information indicating the number of frames to be transmitted and information indicating the number of each frame.

With this processing, for example, the terminal #C (106) receives the large-transmit-power symbol transmitted by the short-range communication AP #1 (103) in the time period t3 or t5 and refers to the information included in the received large-transmit-power symbol to thereby recognize that short-range communication symbols are to be transmitted from the short-range communication AP #1 (103) in the time periods t3 to t10. Thus, the terminal #C (106) transmits the short-range communication symbol 1911 in the time period t8 without transmitting a large-transmit-power symbol in the time period t7.

Similarly, the short-range communication AP #2 (105) receives the large-transmit-power symbol transmitted by the short-range communication AP #1 (103) in the time periods t3, t5, or t7 and refers to the information included in the large-transmit-power symbol to thereby recognize that short-range communication symbols are to be transmitted from the short-range communication AP #1 (103) in the time period t3 to t10. Thus, the short-range communication AP #2 (105) transmits the short-range communication symbol 1912 in the time period t10 without transmitting a large-transmit-power symbol in the time period t9. Also, the short-range communication AP #2 (105) transmits the large-transmit-power symbol 1913 in the time period t11 and transmits the short-range communication symbol 1914 in the time period t12. Similarly, the short-range communication AP #2 (105) transmits the large-transmit-power symbol 1915 in the time period t13 and transmits the short-range communication symbol 1916 in the time period t14.

As described above, in the present embodiment, only one of the plurality of appliances that perform short-range communication transmits a large-transmit-power symbol in each frame. With this arrangement, a time segment provided for transmitting a large-transmit-power symbol can be minimized in each frame.

For example, in the first embodiment (e.g., see FIGS. 17 and 18), a time segment for transmitting two large-transmit-power symbols is provided between two adjacent short-range communication symbols. In contrast, in the present embodiment (e.g., see FIG. 19), it is sufficient that a time segment for transmitting one large-transmit-power symbol be provided between two short-range communication symbols.

Thus, since, in the present embodiment, a larger amount of resources that can be allocated to short-range communication symbols can be reserved, compared with the first embodiment, thus making it possible to obtain an advantage of increasing the throughput.

Figure 20:
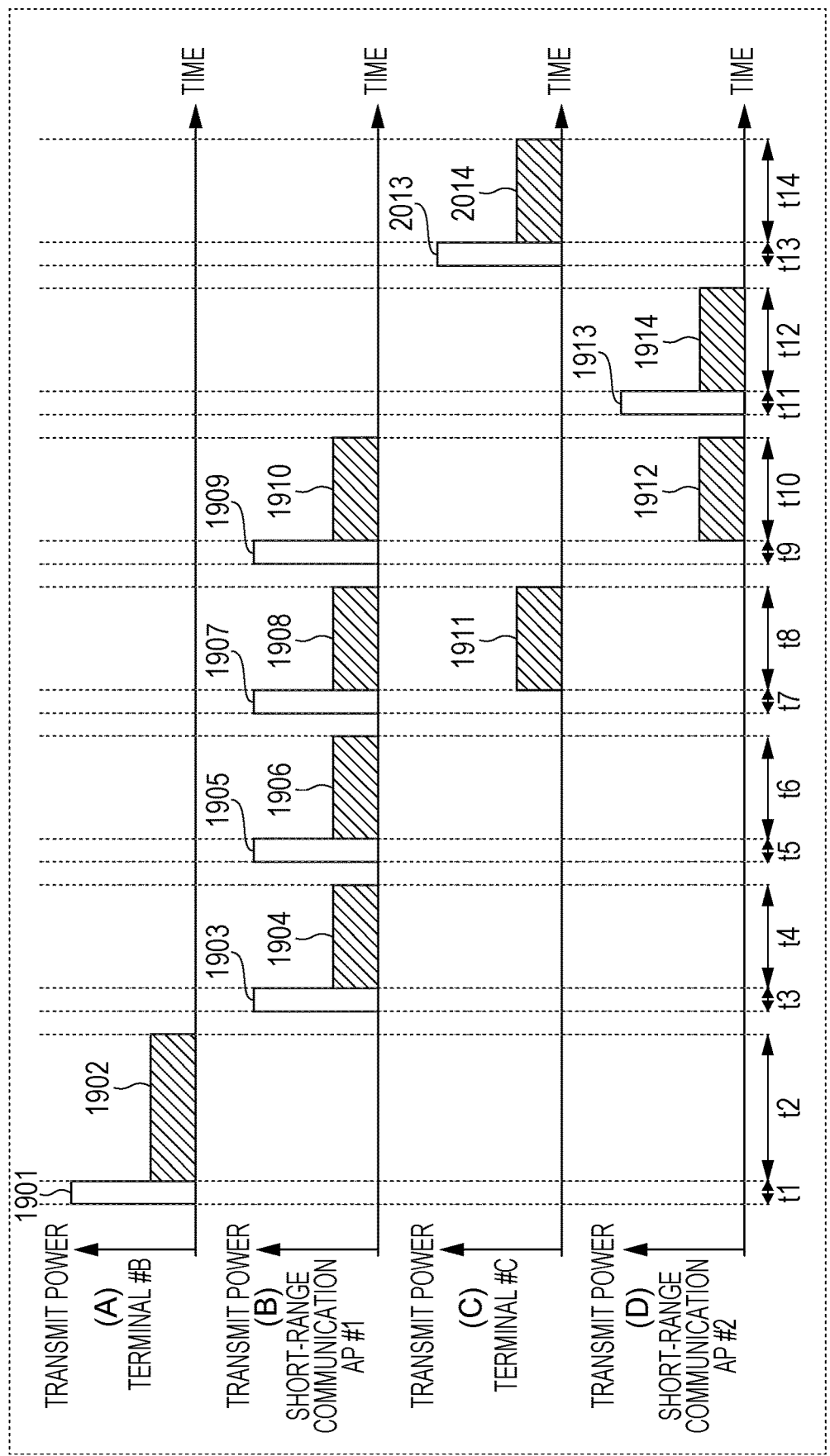
FIG. 20 is an example frame structure of a modulated signal transmitted by the appliance that performs short-range communication according to the second embodiment (when the terminal transmits a large-transmit-power symbol)

FIG. 20 is a diagram illustrating an example of the communication method according to the present embodiment, the example being different from that in FIG. 19. In FIG. 20, operations that are substantially the same as those in FIG. 19 are denoted by the same reference numerals, and descriptions thereof are not given hereinafter.

Specifically, the short-range communication AP #1 (103) transmits the large-transmit-power symbol 1915 and the short-range communication symbol 1916 in the time periods t13 and t14 in FIG. 19, whereas the terminal #C (106) transmits a large-transmit-power symbol 2013 and a short-range communication symbol 2014 in the time periods t13 and t14 in FIG. 20.

In FIG. 20, in the time periods t1, t3, t5, t7, t9, t11, and t13, only one of the plurality of appliances that perform short-range communication transmits a large-transmit-power symbol, as in FIG. 19. This makes it possible to avoid a plurality of large-transmit-power symbols interfering with each other and allows a larger number of appliances to receive large-transmit-power symbols. Thus, it is possible to reduce the possibility that each appliance transmits a modulated signal that can cause interference. This makes it possible to obtain an advantage in that the data transmission efficiency in the system improves. It is also possible to minimize the time segment for transmitting large-transmit-power symbols, and it is possible to reserve a larger amount of resources that can be allocated to short-range communication symbols, thus making it possible to obtain an advantage of increasing the throughput, as in FIG. 19.

Figure 21:
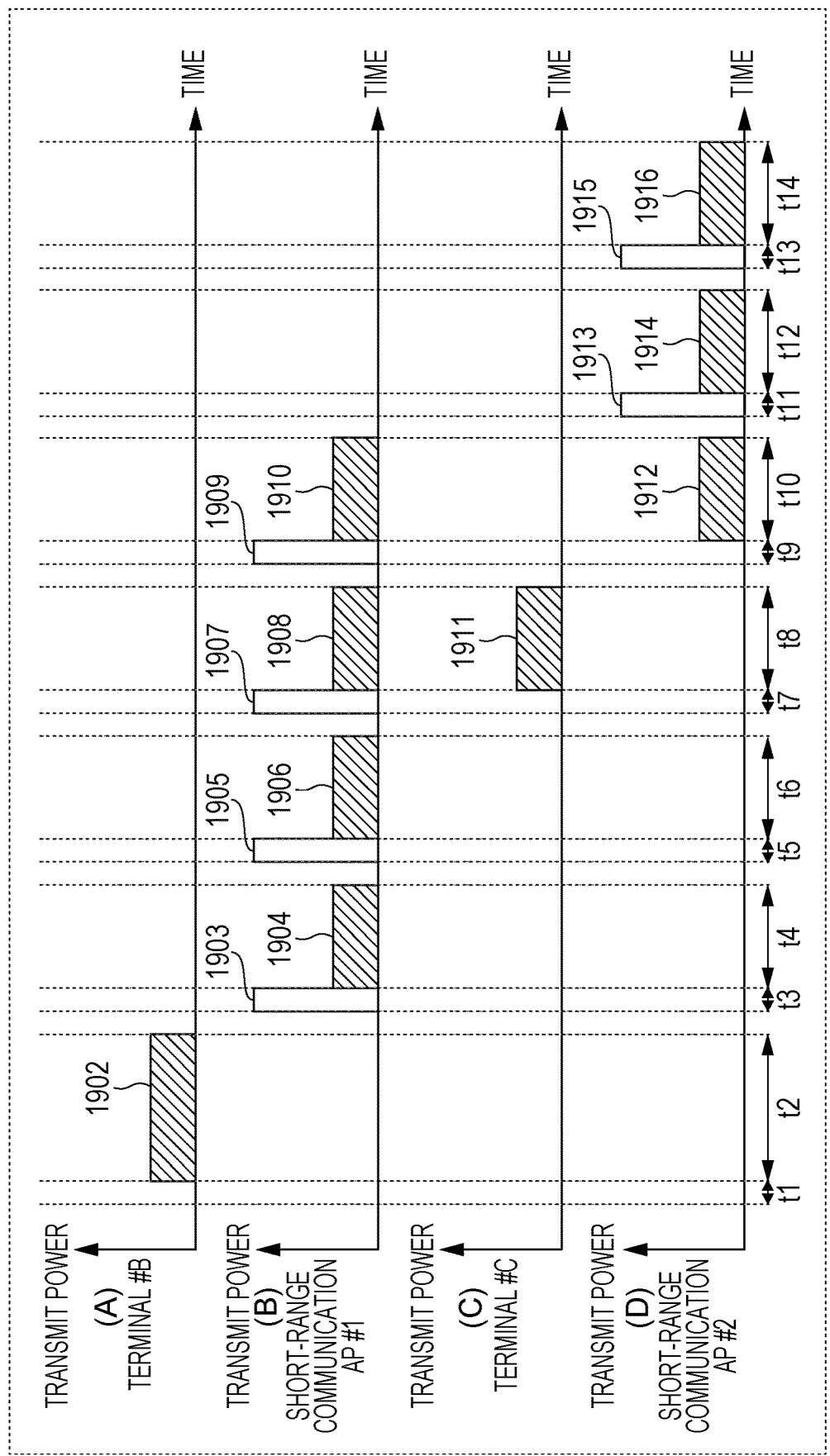
FIG. 21 illustrates an example frame structure of a modulated signal transmitted by the appliance that performs short-range communication according to the second embodiment (when the terminal does not transmit a large-transmit-power symbol)

FIG. 21 is a diagram illustrating an example of the communication method according to the present embodiment, the example being different from that illustrated in FIGS. 19 and 20. In FIG. 21, operations that are substantially the same as those in FIG. 19 are denoted by the same reference numerals, and descriptions thereof are not given hereinafter.

Specifically, the terminal #B (104) in FIG. 19 is a terminal that can transmit both a short-range communication modulated signal and a long-range communication modulated signal, whereas the terminal #B (104) in FIG. 21 is a terminal (e.g., see FIG. 4) that can transmit only a short-range communication modulated signal.

That is, as illustrated in FIG. 21(A), in a state in which neither short-range communication nor long-range communication is performed, the terminal #B transmits only the short-range communication symbol 1902 in the time period t2 without transmitting a large-transmit-power symbol in the time period t1.

In FIG. 21, in the time periods t3, t5, t7, t9, t11, and t13, only one of the plurality of appliances that perform short-range communication transmits a large-transmit-power symbol. This makes it possible to avoid a plurality of large-transmit-power symbols interfering with each other and allows a larger number of appliances to receive large-transmit-power symbols. Thus, it is possible to reduce the possibility that each appliance transmits a modulated signal that can cause interference. This makes it possible to obtain an advantage in that the data transmission efficiency in the system improves. It is also possible to minimize the time segment for transmitting large-transmit-power symbols, and it is possible to reserve a larger amount of resources that can be allocated to short-range communication symbols, thus making it possible to obtain an advantage of increasing the throughput, as in FIG. 19.

Figure 22:
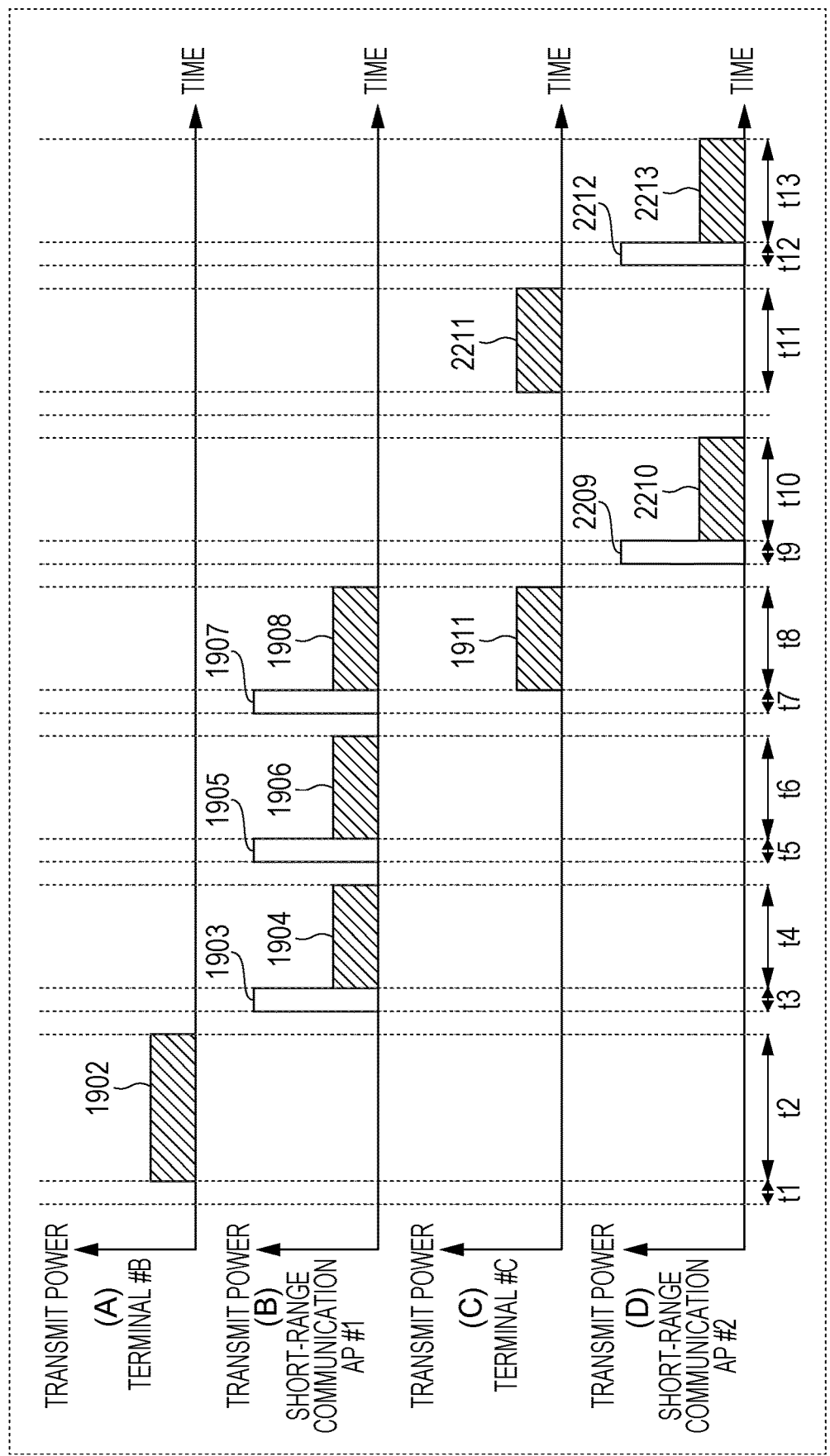
FIG. 22 illustrates an example frame structure of a modulated signal transmitted by the appliance that performs short-range communication according to the second embodiment (when the terminal does not transmit a large-transmit-power symbol)

FIG. 22 illustrates one example of the communication method according to the present embodiment, the example being different from that illustrated in FIGS. 19 to 21. In FIG. 22, operations that are substantially the same as those in FIG. 19 are denoted by the same reference numerals, and descriptions thereof are not given hereinafter.

Each of the terminal #B (104) and the terminal #C (106) in FIG. 19 is a terminal that can transmit both a short-range communication modulated signal and a long-range communication modulated signal, whereas each of the terminal #B (104) and the terminal #C (106) in FIG. 22 is a terminal (e.g., see FIG. 4) that can transmit only a short-range communication modulated signal.

In addition, a different point is that the short-range communication AP #1 (103) in FIG. 19 transmits the modulated signals in time periods t3 to t10, whereas the short-range communication AP #1 (103) in FIG. 22 transmits modulated signals in the time periods t3 to t8.

In addition, another different point is that, in FIG. 19, the short-range communication AP #2 (105) transmits the large-transmit-power symbol 1913 and the short-range communication symbol 1914 in the time periods t11 and t12, whereas in FIG. 22, the terminal #C (106) transmits a short-range communication symbol in the time period t11.

Specifically, after the time period t9 illustrated in FIG. 22, the terminal #C (106) transmits a short-range communication symbol 2211 in the time period t11, as illustrated in FIG. 22(C). Also, as illustrated in FIG. 22(D), the short-range communication AP #2 (105) transmits a large-transmit-power symbol 2209 in the time period t9, transmits a short-range communication symbol 2210 in the time period t10, transmits a large-transmit-power symbol 2212 in the time period t12, and transmits a short-range communication symbol 2213 in the time period t13.

In this case, the reason why the terminal #C (106) does not transmit a large-transmit-power symbol at a timing immediately before the time period t11, as illustrated in FIG. 22(C), is that the terminal #C does not support long-range communication.

In FIG. 22, in the time periods t3, t5, t7, t9, and t12, one of the plurality of short-range communication APs transmits a large-transmit-power symbol. This makes it possible to avoid a plurality of large-transmit-power symbols interfering with each other and allows a larger number of appliances to receive large-transmit-power symbols. Thus, it is possible to reduce the possibility that each appliance transmits a modulated signal that can cause interference. This makes it possible to obtain an advantage in that the data transmission efficiency in the system improves. It is also possible to minimize the time segment for transmitting large-transmit-power symbols, and it is possible to reserve a larger amount of resources that can be allocated to short-range communication symbols, thus making it possible to obtain an advantage of increasing the throughput.

An example in which a plurality of appliances transmit short-range communication symbols is not limited to FIGS. 19 to 22. For example, two short-range communication APs may transmit short-range communication symbols in the same time period, two terminals may transmit short-range communication symbols at the same time, or a short-range communication AP and a terminal may transmit short-range communication symbols in the same time period. Also, the number of appliances that transmit short-range communication symbols in the same time period may be three or more. As described above, by receiving and demodulating a large-transmit-power symbol and making a determination, each appliance determines whether or not a short-range communication symbol is to be transmitted.

Also, although the short-range communication symbols 1908 and 1911 exist in the time period t8 illustrated in FIGS. 19 to 22, for example, the frame structure may be such that the short-range communication symbol 1908 exists throughout the time period t8 and the short-range communication symbol 1911 having a shorter time interval than that of the short-range communication symbol 1908 exists in the range of the time period t8. That is, a time resource occupied by the short-range communication symbol 1908 and a time resource occupied by the short-range communication symbol 1911 do not necessarily have to be the same. In other words, the time interval used by the short-range communication symbol 1908 and the time interval used by the short-range communication symbol 1911 do not necessarily have to be the same. In this respect, a similar structure may also be used when a plurality of short-range communication symbols exist at the same time.

Third Embodiment

Since the appliances according to the present embodiment have basic configurations that are the same as or similar to those of the appliances according to the first embodiment, a description will be given using FIGS. 2, 12, and 14. One example of a communication system according to the present embodiment will be described with reference to FIG. 16 used in the first embodiment.

Figure 23:
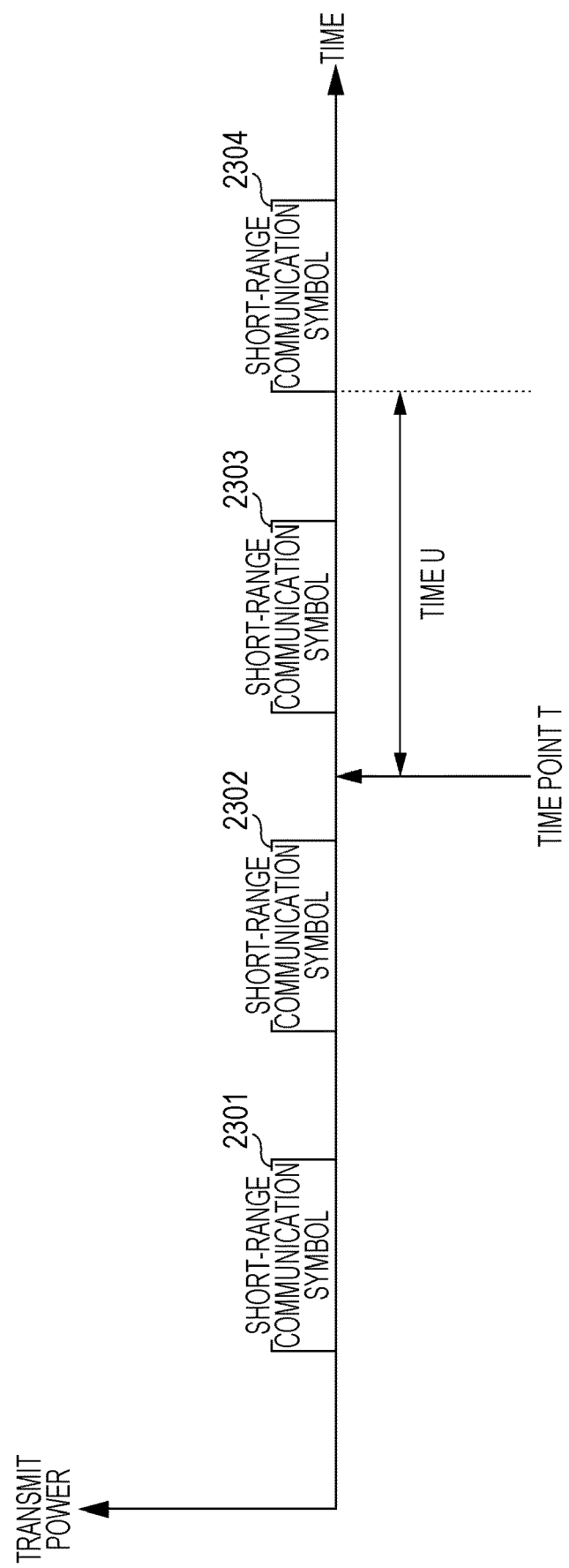
FIG. 23 illustrates an example frame structure when short-range communication symbols according to a third embodiment are transmitted for a long period of time.

FIG. 23 illustrates one example frame structure of a modulated signal transmitted by the terminal #B (104) that supports short-range communication. In FIG. 23, the horizontal axis represents time, and the vertical axis represents a transmit power.

In FIG. 23, symbols 2301, 2302, 2303, and 2304 are short-range communication symbols. That is, the terminal #B (104) transmits short-range communication symbols throughout time segments for the symbols 2301 to 2304.

Now, it is assumed that, at a time point T illustrated in FIG. 23, it becomes necessary for the terminal #A (102) or the AP (101) to transmit a long-range communication symbol. In this case, it is assumed that the terminal #A (102) and the AP (101) monitor a radio wave situation during a period of time U, as illustrated in FIG. 23, and transmit long-range communication symbols, since no large-transmit-power symbol exists.

In this case, there is a high possibility that the reception quality of data of the short-range communication symbol 2303 deteriorates in the short-range communication AP #1 (103) owing interference of the long-range communication symbols. In order to avoid the deterioration of the reception quality, for example, there is a method in which the period of time U in which the terminal #A (102) and the AP (101) monitor the radio wave situation is set to be long. With this method, however, time resources are not efficiently utilized when no short-range communication is performed in the period of time U.

Accordingly, in the present embodiment, a description will be given of a method for avoiding deterioration of the reception quality and a reduction in the resource use efficiency in short-range communication, the deterioration and the reduction being caused by long-range communication symbols.

First, a communication method when the terminal #B (104) supports only short-range communication (i.e., does not support long-range communication) will be described with reference to FIG. 24.

Figure 24:
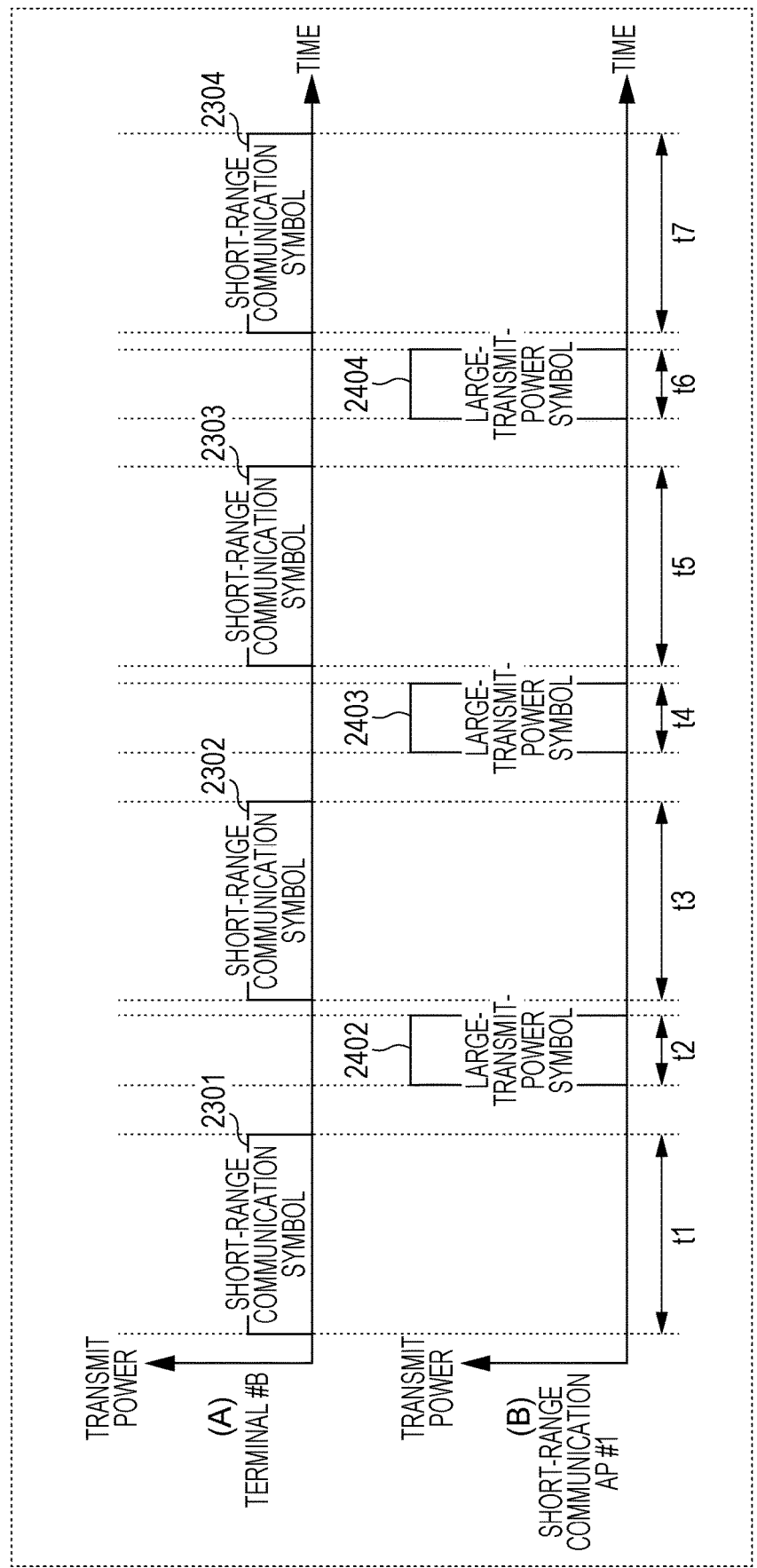
FIG. 24 illustrates an example frame structure of modulated signals transmitted by a terminal and a short-range communication AP according to the third embodiment.

In FIG. 24, FIG. 24(A) illustrates one example frame structure of a modulated signal transmitted by the terminal #B (104), and FIG. 24(B) illustrates one example frame structure of a modulated signal transmitted by the short-range communication AP #1 (103) that is a communication partner of the terminal #B (104). In FIGS. 24(A) and 24(B), the horizontal axis represents time, and the vertical axis represents a transmit power. In FIG. 24, structures that are the same as or similar to those in FIG. 23 are denoted by the same reference numbers.

First, in a time period t1, the terminal #B (104) transmits a short-range communication symbol 2301. The short-range communication AP #1 (103) then receives the short-range communication symbol 2301 to obtain data (information) for short-range communication and also recognizes that the terminal #B (104) is to transmit a short-range communication symbol also in and after a time period t3.

Accordingly, the short-range communication AP #1 (103) transmits a large-transmit-power symbol 2402 in a time period t2 between the time segment in which the short-range communication symbol 2301 is transmitted and the time segment in which a short-range communication symbol 2302 is transmitted.

Similarly, in the time period t3, the terminal #B (104) transmits the short-range communication symbol 2302. The short-range communication AP #1 (103) then receives the short-range communication symbol 2302 to obtain data (information) for short-range communication and also recognizes that the terminal #B (104) is to transmit a short-range communication symbol also in and after a time period t5.

Accordingly, the short-range communication AP #1 (103) transmits a large-transmit-power symbol 2403 in a time period t4 between the time segment in which the short-range communication symbol 2302 is transmitted and the time segment in which the short-range communication symbol 2303 is transmitted.

Also, in the time period t5, the terminal #B (104) transmits the short-range communication symbol 2303. The short-range communication AP #1 (103) then receives the short-range communication symbol 2303 to obtain data (information) for short-range communication and also recognizes that the terminal #B (104) is to transmit a short-range communication symbol also in and after a time period t7.

Accordingly, the short-range communication AP #1 (103) transmits a large-transmit-power symbol 2404 in a time period t6 between the time segment in which the short-range communication symbol 2303 is transmitted and the time segment in which the short-range communication symbol 2304 is transmitted.

Since the large-transmit-power symbols and the short-range communication symbols in FIG. 24 are substantially the same as those described in the first embodiment by using FIGS. 6 to 10, expressions (1) to (6), and so on, descriptions thereof are not given hereinafter.

As described above, a large-transmit-power symbol, which is not transmitted from a terminal that performs short-range communication, is instead transmitted from a short-range communication AP that is a communication partner. That is, when a terminal that supports only short-range communication transmits a short-range communication symbol, a large-transmit-power symbol is transmitted from a short-range communication AP that is a communication partner of the terminal.

As a result, even when the terminal continuously transmits a series of short-range communication symbols, and the period of time occupied by the short-range communication symbols increases, a large-transmit-power symbol transmitted by the short-range communication AP exists between the short-range communication symbols transmitted by the terminal.

In a time segment occupied by short-range communication symbols transmitted from a terminal, appliances (the AP (101) and the terminal #A (102)) that perform long-range communication detects a large-transmit-power symbol transmitted from the short-range communication AP and thus does not transmit a long-range communication symbol. Hence, an appliance that performs short-range communication can avoid deterioration of the data reception quality which is caused by a long-range communication symbol.

In addition, an appliance that performs long-range communication can monitor transmission of a short-range communication symbol by receiving a large-transmit-power symbol transmitted between time segments in which short-range communication symbols are transmitted. Hence, it is not necessary to set a long time for the period of time U (e.g., see FIG. 23) in which the appliances that perform long-range communication monitor the radio wave situation, thus making it possible to avoid a reduction in the efficiency of using time resources.

In FIG. 24, for example, the short-range communication symbol 2301 transmitted by the terminal #B (104) needs to include a short-range communication control symbol (e.g., see FIG. 3) indicating information for notifying the short-range communication AP #1 (103) that the terminal #B (104) is to transmit the short-range communication symbol 2302 in next transmission.

Thus, by using the short-range communication control symbol, the terminal #B (104) transmits information indicating whether or not a short-range communication symbol is also transmitted in next and subsequent frames. In this case, the terminal #B (104) may transmit, for example, information indicating the number of frames for short-range communication symbols to be transmitted in next and subsequent frames or may transmit information indicating whether or not a short-range communication symbol is to be transmitted in the next frame.

Next, a communication method when the terminal #B (104) supports both short-range communication and long-range communication will be described with reference to FIG. 25.

In this case, a similar problem arises as in the terminal #B (104) that supports only transmission of short-range communication symbols. Specifically, when the time segment for short-range communication symbols is sufficiently long, a terminal that supports transmission of both large-transmit-power symbols and short-range communication symbols suffers deterioration of the reception quality and a reduction in the resource use efficiency in short-range communication, the deterioration and the reduction being caused by long-range communication symbols, as in the case in FIG. 23.

Figure 25:
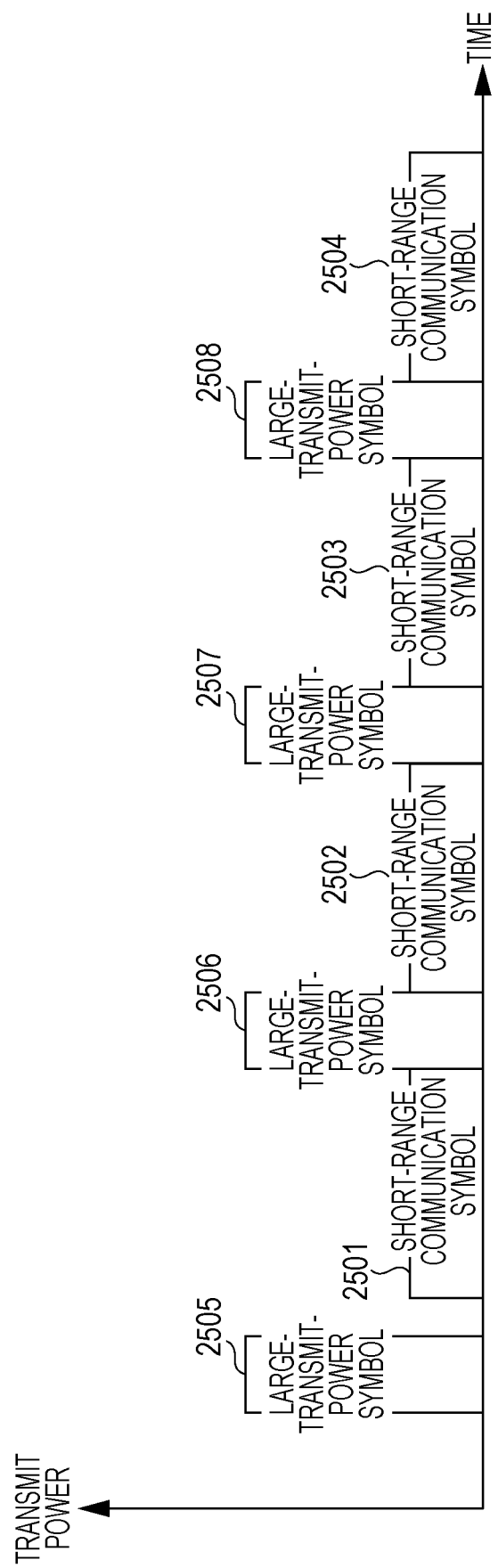
FIG. 25 illustrates an example frame structure of a modulated signal transmission by the terminal according to the third embodiment.

FIG. 25 illustrates an example structure of one frame transmitted by the terminal #B (104). In FIG. 25, the horizontal axis represents time, and the vertical axis represents a transmit power.

Symbols 2501, 2502, 2503, and 2504 illustrated in FIG. 25 are short-range communication symbols. That is, the terminal #B (104) transmits short-range communication symbols over relatively long time segments for the symbols 2501 to 2504.

Symbols 2505, 2506, 2507, 2508 illustrated in FIG. 25 are large-transmit-power symbols. In this case, it is assumed that at least the large-transmit-power symbols 2505 have substantially the same structure as, for example, the large-transmit-power symbols 301 illustrated in FIG. 3.

Also, the large-transmit-power symbols 2506, 2507, and 2508 are symbols transmitted in the middle of frames in which the short-range communication symbols are transmitted, and may have the same structure as that of the large-transmit-power symbols 2505 or may have a structure that is different therefrom. For example, when the large-transmit-power symbols 2506, 2507, and 2508 have a structure that is different from that of the large-transmit-power symbols 2505, a synchronization symbol and/or an AGC symbol do not necessarily have to exist in the large-transmit-power symbols 2506, 2507, and 2508.

Since the large-transmit-power symbols and the short-range communication symbols in FIG. 25 are substantially the same as those described in the first embodiment by using FIGS. 6 to 10, expressions (1) to (6), and so on, descriptions thereof are not given hereinafter.

Even when the terminal #B (104) transmits the short-range communication symbols in relatively large time segments, and the amount of time occupied by the short-range communication symbols increases as described above, a large-transmit-power symbol exists between the short-range communication symbols.

Thus, in the time segment occupied by the short-range communication symbols transmitted from the terminal, the appliance (AP (101) and the terminal #A (102)) that perform long-range communication detect a large-transmit-power symbol transmitted from the terminal and thus does not transmit a long-range communication symbol. Hence, an appliance that performs short-range communication can avoid deterioration of the data reception quality which is caused by a long-range communication symbol.

In addition, by receiving a large-transmit-power symbol transmitted between adjacent time segments in which short-range communication symbols are transmitted, an appliance that performs long-range communication can monitor transmission of the short-range communication symbols. Hence, it is not necessary to set a long time for the period of time U (e.g., see FIG. 23) in which the appliances that perform long-range communication monitor the radio wave situation, thus making it possible to avoid a reduction in the efficiency of using time resources.

Next, a description will be given of example operations 1 and 2 of the appliances that perform short-range communication when the communication method illustrated in FIG. 24 is applied to the appliances.

<Example Operation 1>

A communication state of each appliance after the terminal #B (104) and the short-range communication AP #1 (103) start communication will be described as one example with reference to FIG. 26.

Figure 26:
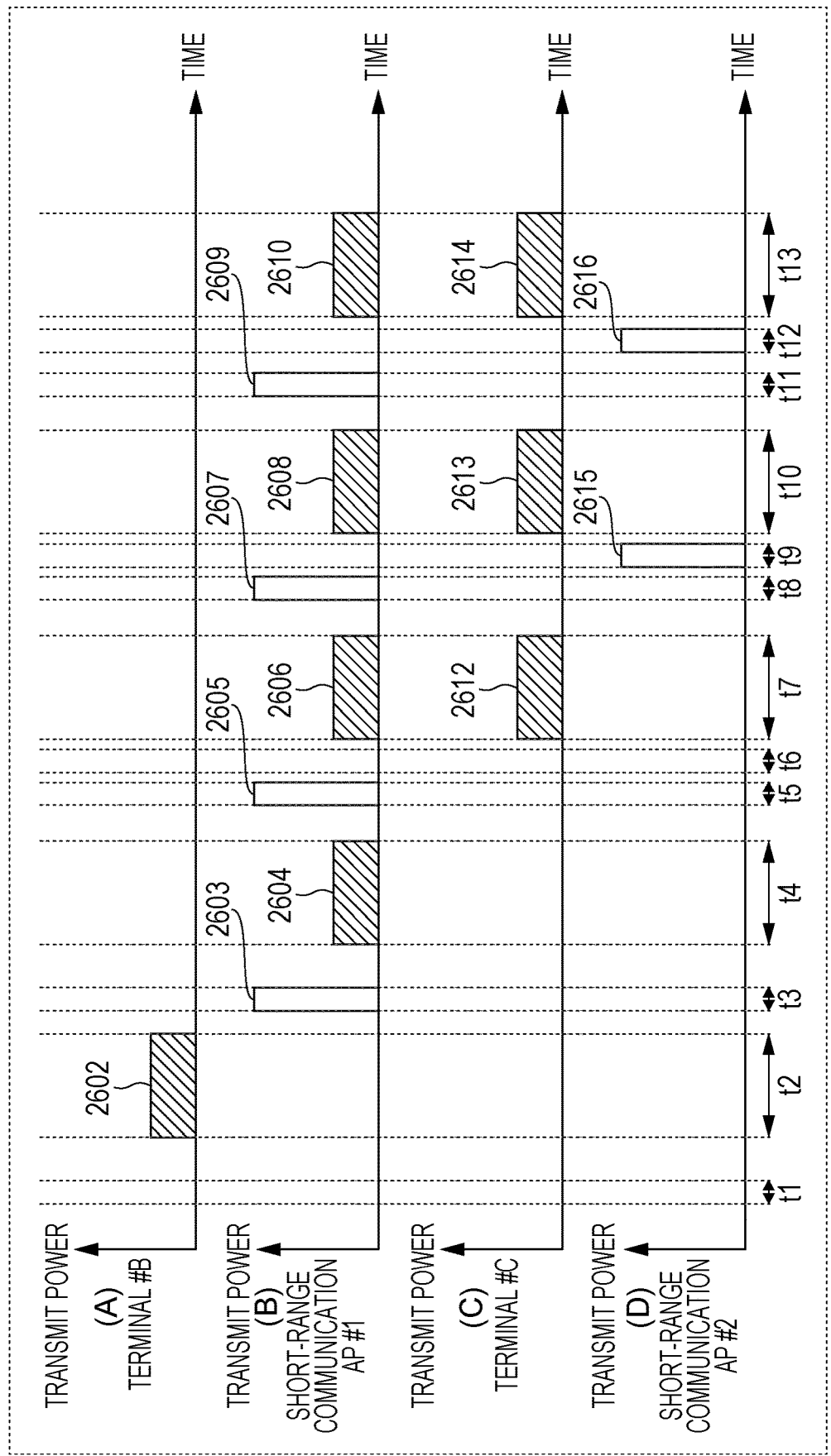
FIG. 26 illustrates an example frame structure of modulated signals transmitted by the appliances that perform short-range communication according to the third embodiment (when a guard section is reserved, and the terminal does not transmit a large-transmit-power symbol)

In FIG. 26, FIG. 26(A) illustrates one example frame structure of a modulated signal transmitted by the terminal #B (104) illustrated in FIG. 16, FIG. 26(B) illustrates one example frame structure of a modulated signal transmitted by the short-range communication AP #1 (103) illustrated in FIG. 16, FIG. 26(C) illustrates one example frame structure of a modulated signal transmitted by the terminal #C (106) illustrated in FIG. 16, and FIG. 26(D) illustrates one example frame structure of a modulated signal transmitted by the short-range communication AP #2 (105) illustrated in FIG. 16.

In FIGS. 26(A) to 26(D), the horizontal axis represents time, and the vertical axis represents a transmit power.

Also, in FIG. 26, the terminal #B (104), the short-range communication AP #1 (103), the terminal #C (106), and the short-range communication AP #2 (105) transmit modulated signals by using the same frequency (frequency band).

As illustrated in FIG. 26(A), the terminal #B (104) transmits a short-range communication symbol 2602 in a time period t2.

As illustrated in FIG. 26(B), the short-range communication AP #1 (103) transmits a large-transmit-power symbol 2603 in a time period t3, transmits a short-range communication symbol 2604 in a time period t4, transmits a large-transmit-power symbol 2605 in a time period t5, transmits a short-range communication symbol 2606 in a time period t7, transmits a large-transmit-power symbol 2607 in a time period t8, transmits a short-range communication symbol 2608 in a time period t10, transmits a large-transmit-power symbol 2609 in a time period t11, and transmits a short-range communication symbol 2610 in a time period t13.

As described above, upon recognizing that the terminal #B that is a communication partner is not transmitting a large-transmit-power symbol, the short-range communication AP #1 transmits a large-transmit-power symbol. That is, the short-range communication AP #1 receives a short-range communication symbol transmitted by the terminal #B and determines that the short-range communication AP #1 is to transmit a large-transmit-power symbol and a short-range communication symbol.

As illustrated in FIG. 26(C), the terminal #C (106) transmits a short-range communication symbol 2612 in the time period t7, transmits a short-range communication symbol 2613 in the time period t10, and transmits a short-range communication symbol 2614 in the time period t13.

As illustrated in FIG. 26(D), the short-range communication AP #2 (105) transmits a large-transmit-power symbol 2615 in a time period t9 and transmits a large-transmit-power symbol 2616 in a time period t12.

As described above, upon recognizing that the terminal #C that is a communication partner is transmitting a short-range communication symbol, the short-range communication AP #2 transmits a large-transmit-power symbol. That is, the short-range communication AP #2 receives the short-range communication symbol transmitted by the terminal #C and determines that the short-range communication AP #2 is to transmit a large-transmit-power symbol.

That is, upon determining that short-range communication is to be continued, each of the short-range communication AP #1 and the short-range communication AP #2 illustrated in FIG. 26 transmits a large-transmit-power symbol.

Since the large-transmit-power symbols and the short-range communication symbols illustrated in FIGS. 26(A) to 26(D) are substantially the same as those described, for example, in the first embodiment by using FIGS. 6 to 10, expressions (1) to (6), and so on, descriptions thereof are not given hereinafter.

A characteristic point in FIG. 26 will be described below.

In the time period t7, the short-range communication AP #1 and the terminal #C transmit the short-range communication symbols 2606 and 2612, respectively; in the time period t10, the short-range communication AP #1 and the terminal #C transmit the short-range communication symbols 2608 and 2613, respectively; and in the time period t13, the short-range communication AP #1 and the terminal #C transmit the short-range communication symbols 2610 and 2614, respectively.

That is, in FIG. 26, the plurality of appliances transmit the short-range communication symbols in the same time periods (t7, t10, and t13), as in the first embodiment (e.g., see FIG. 17). As described above in the first embodiment, even when the terminal #C transmits a short-range communication symbol in a time period in which the terminal #B and the short-range communication AP #1 are performing short-range communication, the possibility that the modulated signals interfere with each other is low, when the spatial distance reached by the short-range communication symbols is considered.

Hence, the plurality of appliances can transmit short-range communication symbols at the same frequency (frequency band) and in the same time period, thus making it possible to obtain an advantage in that the data transmission efficiency in the system increases.

Another characteristic point in FIG. 26 will be described next.

In FIG. 26, control is performed so that a plurality of large-transmit-power symbols do not exist in the same time period, as in the first embodiment (e.g., see FIG. 17).

For example, in FIG. 26, time intervals (the time periods t8 and t9) in which two or more short-range communication symbols can be time-divided exist between the short-range communication symbol 2606 and the short-range communication symbol 2608. In other words, time intervals in which two or more large-transmit-power symbols are arranged without overlapping each other in a time domain exist between the short-range communication symbol 2606 and the short-range communication symbol 2608. For example, the frame structure between the short-range communication symbol 2606 and the short-range communication symbol 2608 is such that two large-transmit-power symbols can be transmitted.

Thus, two or more appliances can transmit large-transmit-power symbols between the short-range communication symbol 2606 and the short-range communication symbol 2608. For example, in FIG. 26, in the time period t8, the short-range communication AP #1 transmits the large-transmit-power symbol 2607 between the short-range communication symbol 2606 and the short-range communication symbol 2608, and in the time period t9, the short-range communication AP #2 transmits the large-transmit-power symbol 2615 between the short-range communication symbol 2606 and the short-range communication symbol 2608. That is, the short-range communication AP #1 and the short-range communication AP #2 transmit the large-transmit-power symbols without interference.

As illustrated in FIG. 26, when appliances transmit large-transmit-power symbols without overlapping each other in a time domain, a larger number of appliances can receive the large-transmit-power symbols, thus making it possible to reduce the possibility that each appliance transmits a modulated signal that can cause interference. This makes it possible to obtain an advantage in that the data transmission efficiency in the system improves.

Also, in FIG. 26, a large-transmit-power symbol, which is not transmitted from a terminal that performs short-range communication, is transmitted from the short-range communication AP that is a communication partner. As a result, even when the terminal or the short-range communication AP continuously transmits a series of short-range communication symbols, and the period of time occupied by the short-range communication symbols increases, a large-transmit-power symbol transmitted by the short-range communication AP exists between the short-range communication symbols.

For example, the terminal #B (104) transmits the short-range communication symbol 2602 in the time period t2, as illustrated in FIG. 26(A), and the short-range communication AP #1 transmits the short-range communication symbols 2604, 2606, 2608, and 2610 in the time periods t4, t7, t10, and t13, as illustrated in FIG. 26(B). Accordingly, as illustrated in FIG. 26(B), the short-range communication AP #1 transmits the large-transmit-power symbols 2603, 2605, 2607, and 2609 in the time periods t3, t5, t8, and t11 in order to notify other appliances that the short-range communication symbols are transmitted in the time periods t2, t4, t7, t10, and t13.

Also, for example, the short-range communication AP #2 (105) transmits the large-transmit-power symbols 2615 and 2616 in the time periods t9 and t12, as illustrated in FIG. 26(D), in order to notify other appliances that the terminal #C (106) transmit the short-range communication symbols 2612, 2613, and 2614 in the time periods t7, t10, and t13, as illustrated in FIG. 26(C).

Thus, in the time segment occupied by the short-range communication symbols, the appliances (AP (101) and the terminal #A (102)) that perform long-range communication detect the large-transmit-power symbols and thus do not transmit long-range communication symbols. The AP 101 and the terminal #A (102) receive, for example, the large-transmit-power symbols (illustrated in FIG. 26) respectively transmitted by the short-range communication AP #1 and the short-range communication AP #2 and determine that long-range communication symbols are not to be transmitted in the segment of the time periods t2 to t13 illustrated in FIG. 26.

Hence, an appliance that performs short-range communication can avoid deterioration of the data reception quality which is caused by a long-range communication symbol. In addition, by receiving a large-transmit-power symbol transmitted between adjacent time segments in which short-range communication symbols are transmitted, an appliance that performs long-range communication can monitor transmission of the short-range communication symbols. Hence, it is not necessary to set a long time for the period of time U (e.g., see FIG. 23) in which the appliances that perform long-range communication monitor the radio wave situation, thus making it possible to avoid a reduction in the efficiency of using time resources.

An example in which a plurality of appliances transmit short-range communication symbols is not limited to FIG. 26. For example, two short-range communication APs may transmit short-range communication symbols at the same time, two terminals may transmit short-range communication symbols at the same time, or a short-range communication AP and a terminal may transmit short-range communication symbols at the same time. Also, the number of appliances that transmit short-range communication symbols at the same time may be three or more. As described above, by receiving and demodulating a large-transmit-power symbol and making a determination, each appliance determines whether or not a short-range communication symbol is to be transmitted.

Also, although the short-range communication symbols 2606 and 2612 exist in the time period t7 illustrated in FIG. 26, for example, the frame structure may be such that the short-range communication symbol 2606 exists throughout the time period t7 and the short-range communication symbol 2612 having a time interval that is shorter than the time interval of the short-range communication symbol 2606 exists in the range of the time period t7. That is, a time resource occupied by the short-range communication symbol 2606 and a time resource occupied by the short-range communication symbol 2612 do not necessarily have to be the same. In other words, the time interval used by the short-range communication symbol 2606 and the time interval used by the short-range communication symbol 2612 do not necessarily have to be the same. In this respect, a similar structure may also be used when a plurality of short-range communication symbols exist at the same time.

<Example Operation 2>

A communication state of each appliance after the terminal #B (104) and the short-range communication AP #1 (103) start communication will be described as one example with reference to FIG. 27.

Figure 27:
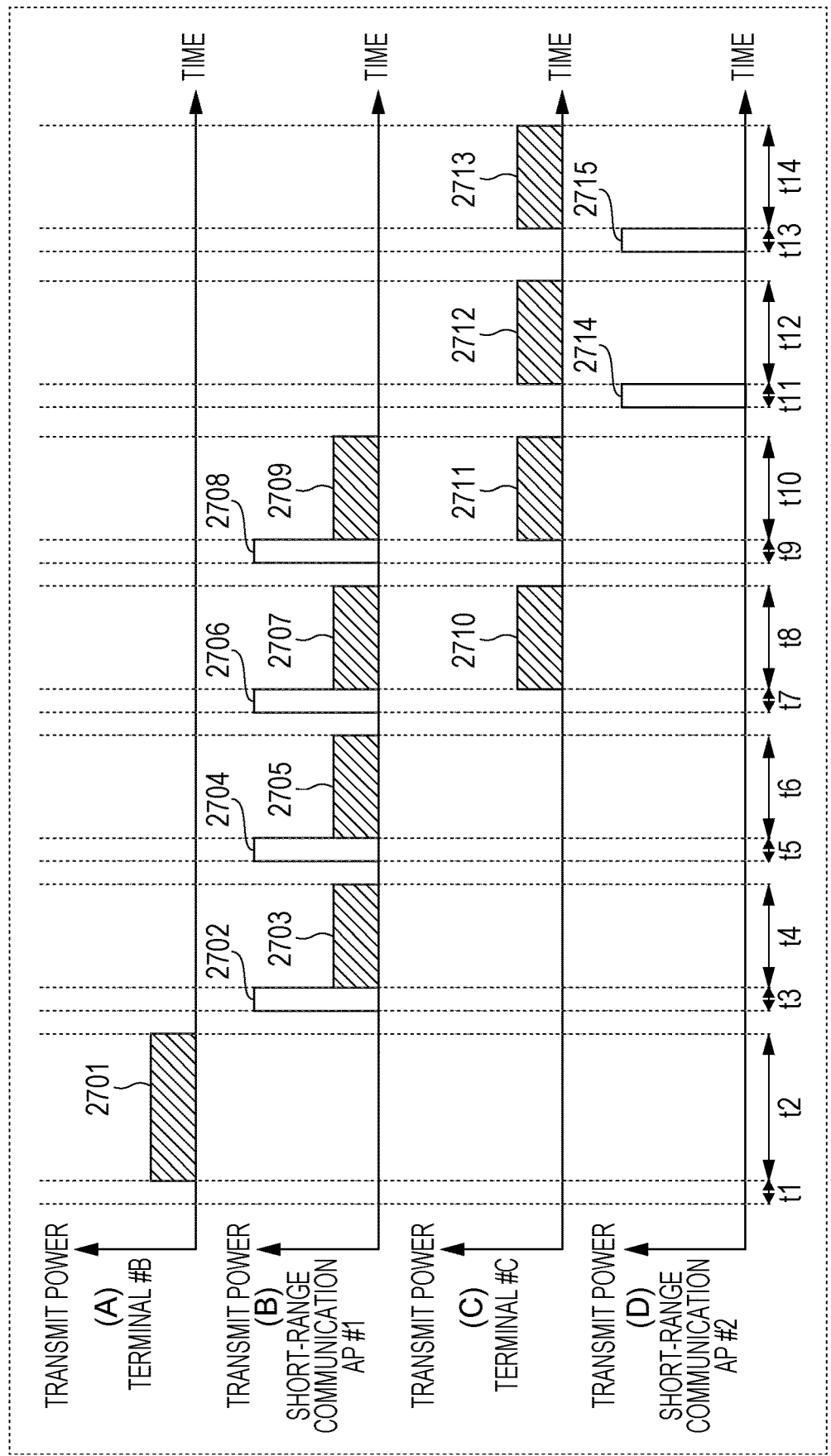
FIG. 27 illustrates an example frame structure of modulated signals transmitted by the appliances that perform short-range communication according to the third embodiment (when no guard section is reserved, and the terminal does not transmit a large-transmit-power symbol).

In FIG. 27, FIG. 27(A) illustrates one example frame structure of a modulated signal transmitted by the terminal #B (104) illustrated in FIG. 16, FIG. 27(B) illustrates one example frame structure of a modulated signal transmitted by the short-range communication AP #1 (103) illustrated in FIG. 16, FIG. 27(C) illustrates one example frame structure of a modulated signal transmitted by the terminal #C (106) illustrated in FIG. 16, and FIG. 27(D) illustrates one example frame structure of a modulated signal transmitted by the short-range communication AP #2 (105) illustrated in FIG. 16.

In FIGS. 27(A) to 27(D), the horizontal axis represents time, and the vertical axis represents a transmit power.

Also, in FIG. 27, the terminal #B (104), the short-range communication AP #1 (103), the terminal #C (106), and the short-range communication AP #2 (105) transmit modulated signals by using the same frequency (frequency band).

As illustrated in FIG. 27(A), the terminal #B (104) transmits a short-range communication symbol 2701 in a time period t2.

As illustrated in FIG. 27(B), the short-range communication AP #1 (103) transmits a large-transmit-power symbol 2702 in a time period t3, transmits a short-range communication symbol 2703 in a time period t4, transmits a large-transmit-power symbol 2704 in a time period t5, transmits a short-range communication symbol 2705 in a time period t6, transmits a large-transmit-power symbol 2706 in a time period t7, transmits a short-range communication symbol 2707 in a time period t8, transmits a large-transmit-power symbol 2708 in a time period t9, and transmits a short-range communication symbol 2709 in a time period t10.

As described above, upon recognizing that the terminal #B that is a communication partner is not transmitting a large-transmit-power symbol, the short-range communication AP #1 transmits a large-transmit-power symbol. That is, the short-range communication AP #1 receives a short-range communication symbol transmitted by the terminal #B and determines that the short-range communication AP #1 is to transmit a large-transmit-power symbol and a short-range communication symbol.

As illustrated in FIG. 27(C), the terminal #C (106) transmits a short-range communication symbol 2710 in the time period t8, transmits a short-range communication symbol 2711 in the time period t10, transmits a short-range communication symbol 2712 in a time period t12, and transmits a short-range communication symbol 2713 in a time period t14.

As illustrated in FIG. 27(D), the short-range communication AP #2 (105) transmits a large-transmit-power symbol 2714 in a time period t11 and transmits a large-transmit-power symbol 2715 in a time period t13.

As described above, upon recognizing that the terminal #C that is a communication partner is transmitting a short-range communication symbol, the short-range communication AP #2 transmits a large-transmit-power symbol. That is, the short-range communication AP #2 receives the short-range communication symbol transmitted by the terminal #C and determines that the short-range communication AP #2 is to transmit a large-transmit-power symbol.

That is, upon determining that short-range communication is to be continued, each of the short-range communication AP #1 and the short-range communication AP #2 illustrated in FIG. 27 transmits a large-transmit-power symbol.

Since the large-transmit-power symbols and the short-range communication symbols in FIGS. 27(A) to 27(D) are substantially the same as those described using FIGS. 6 to 10, expressions (1) to (6), and so on, descriptions thereof are not given hereinafter.

A characteristic point in FIG. 27 will be described below.

In the time period t8, the short-range communication AP #1 and the terminal #C transmit the short-range communication symbols 2707 and 2710, and in the time period t10, the short-range communication AP #1 and the terminal #C transmit the short-range communication symbols 2709 and 2711.

That is, in FIG. 27, in the same time periods (t8 and t10), the plurality of appliances transmit the short-range communication symbols. As described above in the first embodiment, even when the terminal #C transmits short-range communication symbols in a time period in which the terminal #B and the short-range communication AP #1 are performing short-range communication, the possibility that the modulated signals interfere with each other is low, when the spatial distance reached by the short-range communication symbols is considered.

Hence, as in the second embodiment (see FIG. 19), the plurality of appliances can transmit short-range communication symbols at the same frequency (frequency band) and in the same time period, thus making it possible to obtain an advantage in that the data transmission efficiency in the system increases.

Another characteristic point in FIG. 27 will be described next.

In FIG. 27, control is performed so that a plurality of large-transmit-power symbols do not exist in the same time period, as in the second embodiment (see FIG. 19).

For example, in FIG. 27, only the large-transmit-power symbols 2702, 2704, 2706, and 2708 transmitted from the short-range communication AP #1 exist in the time periods t3, t5, t7, and t9, respectively. Also, in FIG. 27, only the large-transmit-power symbols 2714 and 2715 transmitted from the short-range communication AP #2 exist in the time periods t11 and t13.

That is, only one of the plurality of appliances that perform short-range communication transmits the large-transmit-power symbol in each of the time periods t3, t5, t7, t9, t11, and t13 illustrated in FIG. 27. This makes it possible to avoid a plurality of large-transmit-power symbols interfering with each other and allows a larger number of appliances to receive large-transmit-power symbols. Thus, it is possible to reduce the possibility that each appliance transmits a modulated signal that can cause interference. This makes it possible to obtain an advantage in that the data transmission efficiency in the system improves.

More specifically, the purpose of transmitting the large-transmit-power symbol is to notify other appliances as to whether each appliance is performing short-range communication or long-range communication, as described above in the first embodiment. Examples of the other appliances include the AP (101), the terminal #A (102), the short-range communication AP #1 (103), the terminal #B (104), the short-range communication AP #2 (105), the terminal #C (106), the short-range communication AP #3 (107), and the terminal #D (108) in FIG. 16.

That is, it is sufficient that the AP (101) and the terminal #A (102) be notified that short-range communication is being performed in the segment of the time periods t2 to t14 illustrated in FIG. 27.

Hence, it is sufficient that the large-transmit-power symbol for giving a notification indicating that short-range communication is being performed in a certain time period be transmitted from at least one of a plurality of appliances that perform short-range communication, as illustrated in FIG. 27.

For example, in FIG. 27, in a state in which neither short-range communication nor long-range communication is performed, first, the terminal #B (104) performs short-range communication. That is, the terminal #B (104) transmits the short-range communication symbol 2701 to the short-range communication AP #1 (103) that is a communication partner. Thus, the time segment of the time periods t2 is allocated (reserved) as a segment for short-range communication. However, since the terminal #B (104) is a terminal that does not support transmission of a large-transmit-power symbol, the AP (101) and the terminal #A (102) do not detect a large-transmit-power symbol in the time period t2.

Subsequently, the short-range communication AP #1 (103) receives the short-range communication symbol 2701, transmits the large-transmit-power symbol 2702 in the time period t3, transmits the short-range communication symbol 2703 in the time period t4, transmits the large-transmit-power symbol 2704 in the time period t5, transmits the short-range communication symbol 2705 in the time period t6, transmits the large-transmit-power symbol 2706 in the time period t7, transmits the short-range communication symbol 2707 in the time period t8, transmits the large-transmit-power symbol 2708 in the time period t9, and transmits the short-range communication symbol 2709 in the time period t10.

In this case, the AP (101) and the terminal #A (102) detect the large-transmit-power symbols 2702, 2704, 2706, and 2708 in the time periods t3, t5, t7, and t9 to thereby stop transmission of long-range communication symbols. Thus, the time segment of the time periods t3 to t10 is allocated (reserved) as a segment for short-range communication.

In this case, it is assumed that the terminal #C (106) enters a state in which it needs to transmit the short-range communication symbol 2710 in the time period t8.

At this point in time, since the short-range communication AP #1 (103) transmits the large-transmit-power symbols in the segment of the time periods t3 to t10, and the terminal #C (106) is a terminal that does not support transmission of a large-transmit-power symbol, the terminal #C (106) does not transmit a large-transmit-power symbol in the time periods t7 and t9. Since the time periods t3 to t10 are already allocated as a data transmission segment for short-range communication (i.e., as a segment in which the short-range communication AP #1 (103) transmits short-range communication data), the terminal #C (106) transmits the short-range communication symbol 2710 in the time periods t8 and t10.

That is, it is assumed that, in order to transmit a short-range communication symbol, any (which is assumed to be an "appliance #1", by way of example) of the appliances has reserved a time segment #A by transmitting a large-transmit-power symbol. In this case, another appliance (which is assumed to be an "appliance #2", by way of example) recognizes that the appliance #1 is transmitting the large-transmit-power symbol. A structure example of the large-transmit-power symbol in this case is described later. Subsequently, when the appliance #2 needs to transmit a short-range communication symbol in the time segment #A, the appliance #2 transmits a short-range communication symbol without transmitting a large-transmit-power symbol.

Also, in the time periods t11 to t14 illustrated in FIG. 27, the short-range communication AP #1 (103) and the terminal #B (104) do not transmit a modulated signal, and appliances other than the short-range communication AP #2 (105) do not transmit a short-range communication symbol. In this case, since the terminal #C (106) is a terminal that does not support transmission of a large-transmit-power symbol, the terminal #C (106) does not transmit a large-transmit-power symbol in the time period t11. In the time period t12, the terminal #C (106) transmit the short-range communication symbol 2712. Similarly, the terminal #C (106) does not transmit a large-transmit-power symbol in the time period t13 and transmits the short-range communication symbol 2713 in the time period t14.

In this case, in FIG. 27, a large-transmit-power symbol, which is not transmitted from a terminal that performs short-range communication, is transmitted from the short-range communication AP that is a communication partner. As a result, even when the terminal or the short-range communication AP continuously transmits a series of short-range communication symbols, and the amount of time occupied by the short-range communication symbols increases, a large-transmit-power symbol transmitted by the short-range communication AP exists between the short-range communication symbols.

For example, the terminal #C (106) transmit the short-range communication symbols 2712 and 2713 in the time periods t12 and t14, as illustrated in FIG. 27(C). Accordingly, the short-range communication AP #2 transmits the large-transmit-power symbols 2714 and 2715 in the time periods t11 and t13, as illustrated in FIG. 27(D), in order to notify other appliances that short-range communication symbols are transmitted in the time periods t12 and t14.

Thus, in the time segment occupied by the short-range communication symbols, the appliances (AP (101) and the terminal #A (102)) that perform long-range communication detect the large-transmit-power symbols and thus do not transmit long-range communication symbols. The AP 101 and the terminal #A (102) receive, for example, the large-transmit-power symbols (illustrated in FIG. 27) respectively transmitted by the short-range communication AP #1 and the short-range communication AP #2 and determine that long-range communication symbols are not to be transmitted in the segment of the time periods t2 to t13 illustrated in FIG. 27.

Hence, an appliance that performs short-range communication can avoid deterioration of the data reception quality which is caused by a long-range communication symbol. In addition, by receiving a large-transmit-power symbol transmitted between adjacent time segments in which short-range communication symbols are transmitted, an appliance that performs long-range communication can monitor transmission of the short-range communication symbols. Hence, it is not necessary to set a long time for the period of time U (e.g., see FIG. 23) in which the appliances that perform long-range communication monitor the radio wave situation, thus making it possible to avoid a reduction in the efficiency of using time resources.

In order to realize the operations of the appliances illustrated in FIG. 27, for example, it is necessary that the large-transmit-power symbol 2708 that the short-range communication AP #1 (103) transmits in the time period t9 be recognized by other appliances as the last large-transmit-power symbol that is to be transmitted when the short-range communication AP #1 (103) transmits the series of short-range communication symbols (2703, 2705, 2707, and 2709).

Accordingly, for example, during transmission of the series of short-range communication symbols, the large-transmit-power symbol 2708 may include information indicating that it is the last large-transmit-power symbol to be transmitted.

Also, another possible method is a method in which a large-transmit-power symbol includes information indicating the number of frames to be transmitted and information indicating the number of a frame that is currently transmitted. For instance, symbols to be transmitted by the short-range communication AP #1 illustrated in FIG. 27(B) will now be described as one example.

In this case, in FIG. 27(B), a segment in which the large-transmit-power symbol 2702 and the short-range communication symbol 2703 are transmitted is referred to as a "first frame", a segment in which the large-transmit-power symbol 2704 and the short-range communication symbol 2705 are transmitted is referred to as a "second frame", a segment in which the large-transmit-power symbol 2706 and the short-range communication symbol 2707 are transmitted is referred to as a "third frame", and a segment in which the large-transmit-power symbol 2708 and the short-range communication symbol 2709 are transmitted is referred to as a "fourth frame".

In this case, the large-transmit-power symbol 2702 includes information indicating that the number of frames to be transmitted is "4" and information indicating that number of a frame that is being transmitted is "1". The large-transmit-power symbol 2704 also includes information indicating that the number of frames to be transmitted is "4" and information indicating that the number of a frame that is being transmitted is "2". The large-transmit-power symbol 2706 includes information indicating that the number of frames to be transmitted is "4" and information indicating that the number of a frame that is being transmitted is "3", and the large-transmit-power symbol 2708 includes information indicating that the number of frames to be transmitted is "4" and information indicating that the number of a frame that is being transmitted is "4".

Other appliances receive such a large-transmit-power symbol including information indicating the number of frames to be transmitted and information indicating the number of each frame.

With this processing, for example, the terminal #C (106) receives the large-transmit-power symbol transmitted by the short-range communication AP #1 (103) in the time period t3 or t5 and refers to the information included in the received large-transmit-power symbol to thereby recognize that short-range communication symbols are to be transmitted from the short-range communication AP #1 (103) in the time periods t3 to t10. Thus, the terminal #C (106) that is a terminal that does not transmit a large-transmit-power symbol does not transmit a large-transmit-power symbol in the time period t7, transmits the short-range communication symbol 2710 in the time period t8, does not transmit a large-transmit-power symbol in the time period t9, and transmits the short-range communication symbol 2711 in the time period t10.

An example in which a plurality of appliances transmit short-range communication symbols is not limited to that in FIG. 27. For example, two short-range communication APs may transmit short-range communication symbols at the same time, two terminals may transmit short-range communication symbols in the same time period, or a short-range communication AP and a terminal may transmit short-range communication symbols at the same time. Also, the number of appliances that transmit short-range communication symbols in the same time period may be three or more. As described above, by receiving and demodulating a large-transmit-power symbol and making a determination, each appliance determines whether or not a short-range communication symbol is to be transmitted.

Also, although the short-range communication symbols 2707 and 2710 exist in the time period t8 illustrated in FIG. 27, for example, the frame structure may be such that the short-range communication symbol 2707 exists throughout the time period t8 and the short-range communication symbol 2710 having a time interval that is shorter than the time interval of the short-range communication symbol 2707 exists in the range of the time period t8. That is, a time resource occupied by the short-range communication symbol 2707 and a time resource occupied by the short-range communication symbol 2710 do not necessarily have to be the same. In other words, the time interval used by the short-range communication symbol 2707 and the time interval used by the short-range communication symbol 2710 do not necessarily have to be the same. In this respect, a similar structure may also be used when a plurality of short-range communication symbols exist at the same time.

Some embodiments of the present disclosure have been described above.

Naturally, the embodiments described hereinabove may be implemented by a combination of other modes.

The embodiments and the other modes are merely examples, and for example, even when a modulation system, an error-correction encoding system (e.g., error correction coding, a code length, and a coding rate that are used), control information, and so on have been exemplified above, other "modulation system, error-correction encoding system (e.g., error correction coding, a code length, and a coding rate that are used), control information, and so on can also be used to implement the present disclosure with a configuration that is the same as or similar to that described above.

Even when a modulation system other than the modulation system described herein is used, it is possible to realize the embodiments described hereinabove and the other modes. For example, the modulation system may be implemented by amplitude and phase-shift keying (APSK; e.g., 16APSK, 64APSK, 128APSK, 256APSK, 1024APSK, or 4096APSK), pulse-amplitude modulation (PAM; e.g., 4PAM, 8PAM, 16PAM, 64 PAM, 128PAM, 256PAM, 1024PAM, or 4096PAM), phase-shift keying (PSK; e.g., BPSK, QPSK, 8PSK, 16PSK, 64PSK, 128PSK, 256PSK, 1024PSK, or 4096PSK), or quadrature amplitude modulation (QAM; e.g., 4QAM, 8QAM, 16QAM, 64QAM, 128QAM, 256QAM, 1024QAM, or 4096QAM). Uniform mapping or non-uniform mapping may also be employed in each modulation system.

A method for arranging signal points in an I-Q plane (a modulation system using two, four, eight, 16, 64, 128, 256, or 1024 signal points) is not limited to the signal point arranging method based on the modulation system described hereinabove.

Herein, data and information obtained by the receiver in each terminal or base station (AP) is converted into video and sound, the video may be displayed on a display (monitor), and the sound may be output from a speaker. In addition, the data or information obtained by the receiver may be (or may not be) subjected to signal processing for video or sound, and may be output from RCA terminals (a video terminal and a sound terminal), Universal Serial Bus (USB®, High-Definition Multimedia Interface (HDMI®), a digital terminal, or the like included in the receiver.

Herein, what is equipped with the transmitter is thought to be, for example, a communication and broadcast appliance, such as a broadcast station, a base station, an access point, a terminal, or a mobile phone, and what is equipped with the receiver is thought to be, for example, a communication appliance, such as a television, a radio, a terminal, a personal computer, a mobile phone, an access point, or a base station. Another possible configuration is that each of the transmitter and the receiver in the present disclosure is a constituent element that has a communication function and that is connectable to an apparatus (such as a television, a radio, a personal computer, a mobile phone) for executing an application via some type of interface.

In the present embodiment, symbols other than the data symbols, for example, pilot symbols (such as preamble, unique word, postamble, and reference symbols) and symbols for control information may be arranged in frames in any manner. Although the symbols other than the data symbols are, in this case, termed the "pilot symbols" and the "symbols for control information", they may be given any terms, and the functions thereof are important.

The pilot symbols may be, for example, known symbols modulated by a transceiver through use of PSK modulation (or symbols that are transmitted by a transmitter and that can be known by a receiver through synchronization performed by the receiver), and by using the symbols, the receiver performs frequency synchronization, time synchronization, channel estimation (channel state information (CSI) estimation) of each modulated signal, signal detection, and so on.

The symbols for control information are symbols for realizing communication other than communication of data (of an application and so on) and for transmitting information (e.g., a coding rate in a modulation system, an error-correction encoding system, or an error-correction encoding system, and setting information in an upper layer) that needs to be transmitted to a communication partner.

A case in which the AGC symbol, the short-range communication AGC symbol, and the long-range communication AGC symbol are not included in a frame is also possible in the frame structures illustrated in FIGS. 3, 4, 5, 13, 15, and so on. In such a case, the function of the AGC symbol (i.e., the function with which a receiving apparatus perform gain adjustment on a received signal) may be provided in symbols, such as synchronization symbols or control symbols, and the receiving apparatus may perform gain adjustment on a received signal by using the symbols, such as synchronization symbols or control symbols.

In addition, the present disclosure is not limited to each embodiment and can be implemented in various modifications. For example, although, in each embodiment, the present disclosure has been described above as being implemented by a communication apparatus, the present disclosure is not limited thereto, and this communication method can also be implemented using software in cooperation with hardware.

Also, for example, a program for executing the above-described communication method may be pre-stored in a read-only memory (ROM), and a central processing unit (CPU) may run the program.

Also, the program for executing the above-described communication method may be stored in a computer-readable storage medium, the program stored in the storage medium may be recorded in a random-access memory (RAM) in the computer, and the computer may operate in accordance with the program.

Also, the individual functional blocks used in the above-described embodiments may be typically realized as a large-scale integration (LSI), which is an integrated circuit. The integrated circuit may control the individual functional blocks used in the description of the embodiments and may have an input and an output. The functional blocks may be individually integrated into single chips or may be integrated into a single chip so as to include some or all of the constituent elements in each embodiment. Although the functional blocks are implemented as an LSI in this case, they may also be called an integrated circuit (IC), a system LSI, a super LSI, or an ultra LSI depending on a difference in the degree of integration. The scheme for implementing an integrated circuit is not limited to the LSI and may be realized with a dedicated circuit or a general-purpose processor. A field programmable gate array (FPGA) that can be programmed after manufacture of an LSI or a reconfigurable processor that allows reconfiguration of connections and settings of circuit cells inside an LSI may also be used.

In addition, when a technology for circuit integration that replaces LSI becomes available with the advancement of a semiconductor technology or another derivative technology, such a technology may also naturally be used to integrate the functional blocks. For example, biotechnology is applicable.

A transmission method according to the present disclosure is directed to a transmission method for a communication system in which communications using a plurality of communication methods having different transmission parameters are performed in frequency bands that at least partially overlap with each other. The transmission method includes: generating a first symbol group that includes a control symbol for causing a communication partner apparatus to recognize that communication using a first communication method is to be performed, and a second symbol group that includes a data symbol for the first communication method; transmitting the first symbol group at a first transmit power; and transmitting the second symbol group at a second transmit power that is smaller than the first transmit power.

In the transmission method according to the present disclosure, the first symbol group may include a first gain control (AGC) symbol for a receiving apparatus to adjust a received-signal level based on with the first transmit power; and the second symbol group may include a second AGC symbol for the receiving apparatus to adjust the received-signal level based on the second transmit power.

In the transmission method according to the present disclosure, the first symbol group may include another control symbol indicating which of the first communication method and a second communication method is to be performed, the second communication method allowing longer range communication than the first communication method.

In the transmission method according to the present disclosure, a relationship given by expression (6) noted above may be satisfied between a first average electric power of signal points in an in-phase/quadrature-phase plane for each symbol of the first symbol group and a second average electric power of signal points in the in-phase/quadrature-phase plane for each symbol in the second symbol group. In this case, M denotes a number of signal points in the in-phase/quadrature-phase plane for the first symbol group, N denotes a number of signal points in the in-phase/quadrature-phase plane for the second symbol group, Ia,j denotes an in-phase component of each signal point in the first symbol group, Qa,j denotes a quadrature component of each signal point in the first symbol group, Ib,j denotes an in-phase component of each signal point in the second symbol group, and Qb,j denotes a quadrature component of each signal point in the second symbol group.

In the transmission method according to the present disclosure, a plurality of time segments in which a certain number of the first symbol groups are transmittable may be provided between adjacent time segments in which the second symbol group is transmitted; and communication apparatuses that support the first communication method may respectively transmit the first symbol groups in mutually different time segments within the plurality of time segments.

In the transmission method according to the present disclosure, a single time segment in which the first symbol group is transmittable may be provided between adjacent time segments in which the second symbol group is transmitted; and in the single time segment, the first symbol group may be transmitted from one of a plurality of communication apparatuses that support the first communication method.

In the transmission method according to the present disclosure, the first symbol group may be transmitted from a communication apparatus that transmits the second symbol group and that supports the first communication system.

In the transmission method according to the present disclosure, the communication using the first communication method may be performed between a terminal and a base station, and when the terminal transmits the second symbol group, the first symbol group may be transmitted from the base station that is a communication partner of the terminal.

A transmission control method according to the present disclosure is directed to a transmission control method for a communication system in which communications using a plurality of communication methodss having different transmission parameters are performed in frequency bands that at least partially overlap with each other. The transmission control method includes: receiving a modulated signal transmitted from a communication partner apparatus, wherein the modulated signal includes a first symbol group including a control symbol for recognizing that communication using a first communication method is to be performed or a second symbol group including a data symbol for the first communication method, the first symbol group is transmitted at a first transmit power, and the second symbol group is transmitted at a second transmit power that is smaller than the first transmit power; and stopping communication using a second communication method in which the first transmit power is used for data transmission, when the first symbol group is received, and executing the communication using the second communication method, when the first symbol group is not received.

A communication apparatus according to the present disclosure is directed to a communication apparatus for a communication system in which communications using a plurality of communication methods having different transmission parameters are performed in frequency bands that at least partially overlap with each other. The communication apparatus includes: a generator that generates a first symbol group including a control symbol for causing a communication partner apparatus to recognize that communication using a first communication method is to be performed and a second symbol group including a data symbol for the first communication method; and a transmitter that transmits the first symbol group at a first transmit power and that transmits the second symbol group at a second transmit power that is smaller than the first transmit power.

A communication apparatus according to the present disclosure is directed to a communication apparatus for a communication system in which communications using a plurality of communication methods having different transmission parameters are performed in frequency bands that at least partially overlap with each other. The communication apparatus includes: a receiver that receives a modulated signal transmitted from a communication partner apparatus, wherein the modulated signal includes a first symbol group including a control symbol for acknowledging that communication using a first communication method is to be performed or a second symbol group including a data symbol for the first communication method, the first symbol group is transmitted at a first transmit power, and the second symbol group is transmitted at a second transmit power that is smaller than the first transmit power; and a controller that stops communication using a second communication method in which the first transmit power is used for data transmission, when the received modulated signal includes the first symbol group, and that executes communication using the second communication method, when the received modulated signal does not include the first symbol group.

One aspect of the present disclosure is useful for a mobile communications system.

What is claimed is:

1. A transmission method comprising:
   generating a first symbol group that includes a control symbol for causing a communication partner apparatus to recognize that a short-range communication is to be performed, and a second symbol group that includes a data symbol for the short-range communication;
   transmitting the first symbol group at a first transmit power, wherein the first symbol group includes the control symbol and a first gain control (AGC) symbol; and
   transmitting the second symbol group at a second transmit power that is smaller than the first transmit power, wherein the second symbol group includes the data symbol and a second AGC symbol.

2. The transmission method according to claim 1, wherein the first symbol group includes another control symbol indicating which of a first communication method for short-range communication and a second communication method for long-range communication is to be performed.

3. The transmission method according to claim 1, wherein a relationship given by expression (1) is satisfied between a first average electric power of signal points in an in-phase/quadrature-phase plane for each symbol of the first symbol group and a second average electric power of signal points in the in-phase/quadrature-phase plane for each symbol in the second symbol group, $$\frac{1}{M}\sum_{j=1}^{M}(I_{a,j}^2+Q_{a,j}^2) > \frac{1}{N}\sum_{j=1}^{N}(I_{b,j}^2+Q_{b,j}^2) \quad (1)$$

where M denotes a number of signal points in the in-phase/quadrature-phase plane for the first symbol group, N denotes a number of signal points in the in-phase/quadrature-phase plane for the second symbol group, Ia,j denotes an in-phase component of each signal point in the first symbol group, Qa,j denotes a quadrature component of each signal point in the first symbol group, Ib,j denotes an in-phase component of each signal point in the second symbol group, and Qb,j denotes a quadrature component of each signal point in the second symbol group.

4. The transmission method according to claim 1, wherein a plurality of time segments in which a certain number of the first symbol groups are transmittable are provided between adjacent time segments in which the second symbol group is transmitted; and communication apparatuses that support a first communication method for short-range communication respectively transmit the first symbol groups in mutually different time segments within the plurality of time segments.

5. The transmission method according to claim 1, wherein a single time segment in which the first symbol group is transmittable is provided between adjacent time segments in which the second symbol group is transmitted, and in the single time segment, the first symbol group is transmitted from one of a plurality of communication apparatuses that support a first communication method for short-range communication.

6. The transmission method according to claim 1, wherein the communication using a first communication method for short-range communication is performed between a terminal and a base station, and when the terminal transmits the second symbol group, the first symbol group is transmitted from the base station that is a communication partner of the terminal.

7. A communication apparatus comprising:

symbol generation circuitry that generates a first symbol group including a control symbol for causing a communication partner apparatus to recognize that a short-range communication is to be performed and a second symbol group including a data symbol for the short-range communication; and transmission circuitry that transmits the first symbol group at a first transmit power, wherein the first symbol group includes the control symbol and a first gain control (AGC) symbol, and that transmits the second symbol group at a second transmit power that is smaller than the first transmit power, wherein the second symbol group includes the data symbol and a second AGC symbol.

* * * * *